US008484383B2

(12) United States Patent
Hartwich et al.

(10) Patent No.: US 8,484,383 B2
(45) Date of Patent: Jul. 9, 2013

(54) FLEXRAY COMMUNICATION CONTROLLER

(75) Inventors: Florian Hartwich, Reutlingen (DE); Thomas Wagner, Reutlingen (DE); Christian Horst, Dusslingen (DE); Franz Bailer, Reutlingen (DE); Markus Ihle, Jettenburg (DE)

(73) Assignee: Robert Bosch GmbH, Stuttgart (DE)

( * ) Notice: Subject to any disclaimer, the term of this patent is extended or adjusted under 35 U.S.C. 154(b) by 784 days.

(21) Appl. No.: 11/659,259

(22) PCT Filed: Aug. 4, 2005

(86) PCT No.: PCT/EP2005/053833
§ 371 (c)(1),
(2), (4) Date: Dec. 16, 2008

(87) PCT Pub. No.: WO2006/013212
PCT Pub. Date: Feb. 9, 2006

(65) Prior Publication Data
US 2009/0125592 A1  May 14, 2009

(30) Foreign Application Priority Data

Aug. 5, 2004 (EP) .................................... 04103778

(51) Int. Cl.
*G06F 15/16* (2006.01)
(52) U.S. Cl.
USPC ........................................................ 709/250
(58) Field of Classification Search
USPC .......................... 709/220, 228–229, 250, 252
See application file for complete search history.

(56) References Cited

U.S. PATENT DOCUMENTS

| 5,432,909 | A  | * | 7/1995  | Cok ............................. 709/251 |
| 5,768,625 | A  |   | 6/1998  | Muramatsu et al. |
| 6,397,282 | B1 |   | 5/2002  | Hashimoto et al. |
| 7,769,906 | B2 | * | 8/2010  | Hartwich et al. ............. 709/250 |
| 8,095,740 | B2 | * | 1/2012  | Hartwich et al. ............. 711/147 |
| 2004/0081079 | A1 | * | 4/2004 | Forest et al. .................. 370/216 |
| 2005/0254518 | A1 | * | 11/2005 | Fujimori ....................... 370/466 |

(Continued)

FOREIGN PATENT DOCUMENTS

| EP | 1085722 | 3/2001 |
| EP | 1355456 A1 * | 10/2003 |

(Continued)

OTHER PUBLICATIONS

Robert Bosch GmbH, TTCAN IP Module User's Manual Revision 1.6, Nov. 2002, 77 pages.*

(Continued)

*Primary Examiner* — Imad Hussain
(74) *Attorney, Agent, or Firm* — Kenyon & Kenyon LLP

(57) ABSTRACT

FlexRay communication controller for connecting FlexRay communication lines to a FlexRay network member assigned to the FlexRay communication controller, whereby said FlexRay communication controller encloses some parts as there are at least a message handler, a message memory, a first buffer memory structure for connecting said message memory to said FlexRay network member and a second buffer memory structure for connecting said message memory to said FlexRay communication lines, whereby all the parts are functioning together to connect said FlexRay communication lines to said FlexRay network member and said FlexRay communication controller is constructed in such a way that said functioning is controlled by the contents of a variety of registers located onto said FlexRay communication controller.

17 Claims, 11 Drawing Sheets

E-Ray block diagram

U.S. PATENT DOCUMENTS

| | | | |
|---|---|---|---|
| 2006/0282640 A1* | 12/2006 | Fuhrmann | 711/171 |
| 2007/0230484 A1* | 10/2007 | Hu et al. | 370/401 |
| 2008/0137679 A1* | 6/2008 | Horst et al. | 370/428 |
| 2008/0140949 A1 | 6/2008 | Hartwich et al. | |
| 2009/0041047 A1* | 2/2009 | Augustin et al. | 370/402 |
| 2009/0144445 A1* | 6/2009 | Van Wageningen et al. | 709/239 |
| 2009/0175290 A1* | 7/2009 | Newald et al. | 370/428 |
| 2009/0292844 A1* | 11/2009 | Ihle et al. | 710/110 |
| 2010/0281131 A1* | 11/2010 | HesselBarth et al. | 709/213 |

FOREIGN PATENT DOCUMENTS

| | | |
|---|---|---|
| FR | 2 867 001 | 9/2002 |
| JP | 2007 524317 | 8/2007 |
| JP | 2008508826 | 3/2008 |
| WO | WO 01/45239 | 6/2001 |
| WO | WO 2006/015913 | 2/2006 |

OTHER PUBLICATIONS

FlexRay Consortium. "FlexRay Communications System Protocol Specificiation Version 2.0". Jun. 30, 2004. pp. 1-224.*

Ralph Belschner et al.: "FlexRay Requirements Specification" NN, May 16, 2002, XP002270307.

* cited by examiner

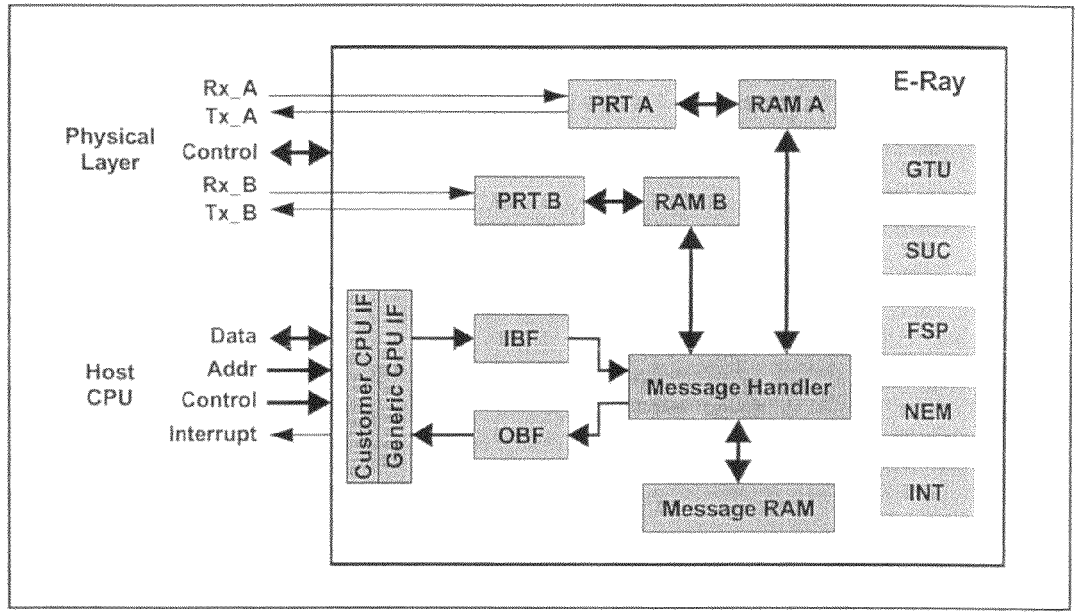
Figure 1: E-Ray block diagram
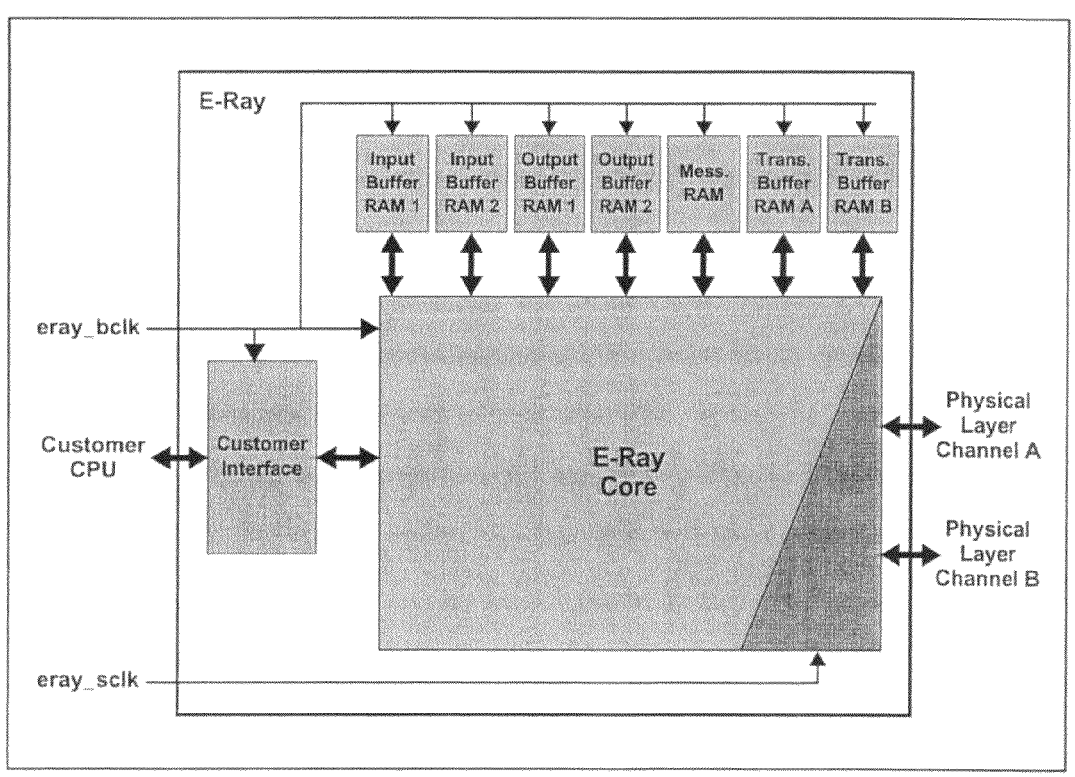
Figure 2: Generic interface of E-Ray core

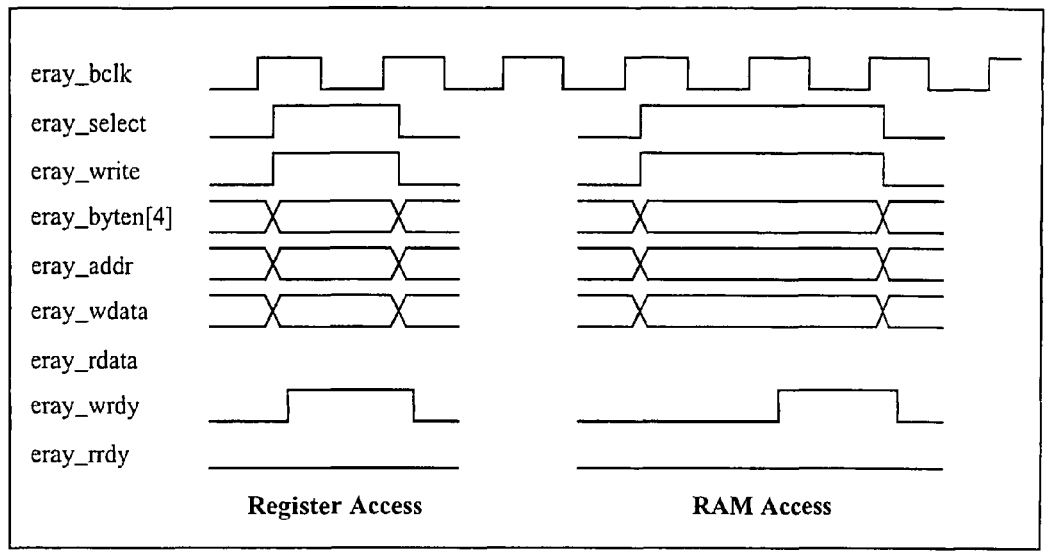
Figure 3: Write access to E-Ray registers and Input/Output Buffer RAM
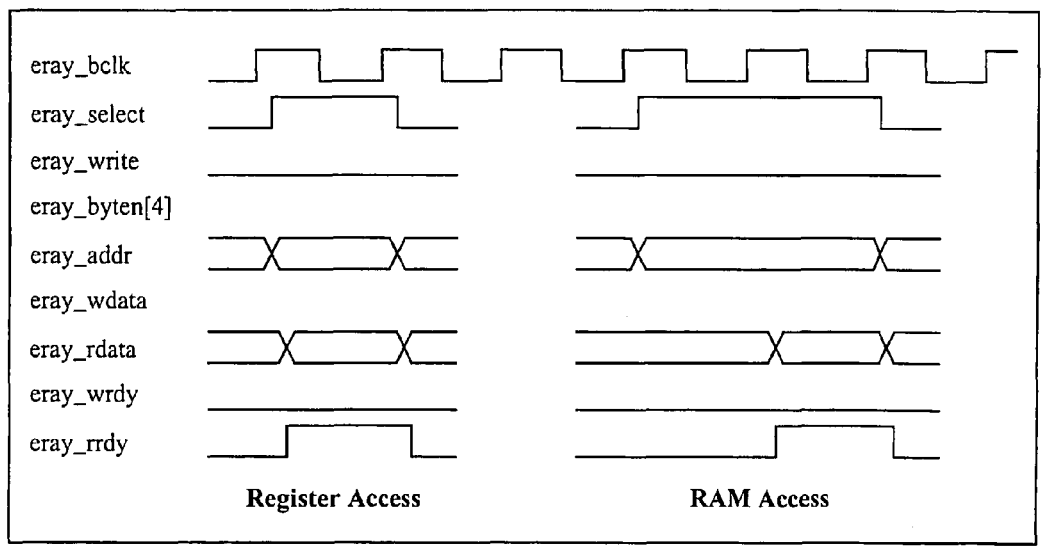
Figure 4: Read access to E-Ray registers and Input/Output Buffer RAM

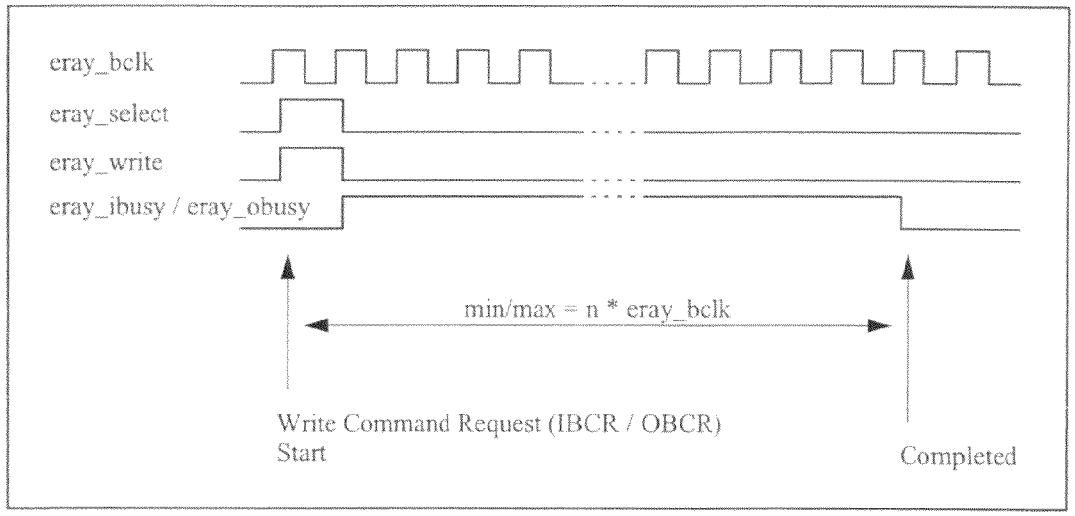
Figure 5: Data transfer from Input Buffer RAM to Message RAM and Message RAM to Output Buffer RAM
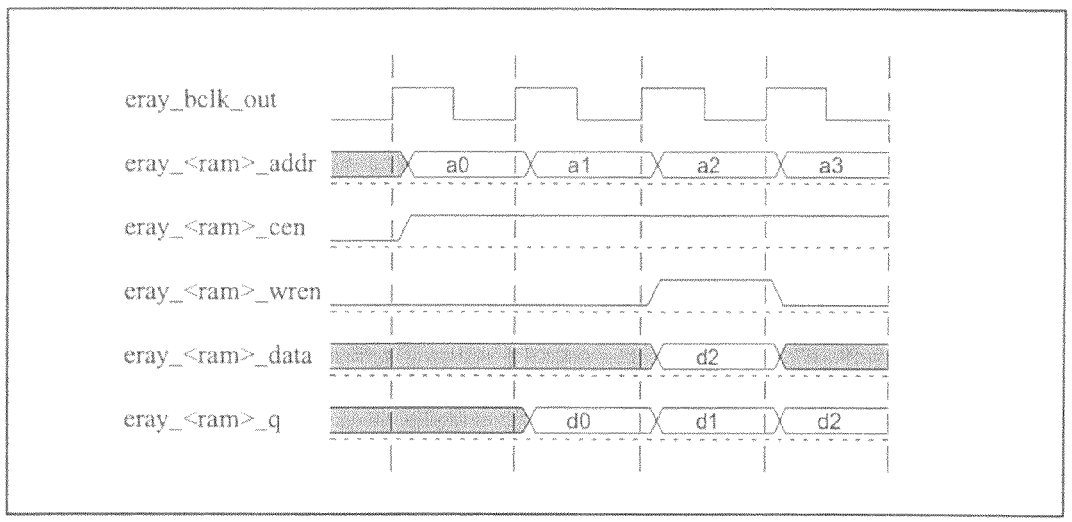
Figure 6: Synchronous read/write access to embedded RAM blocks

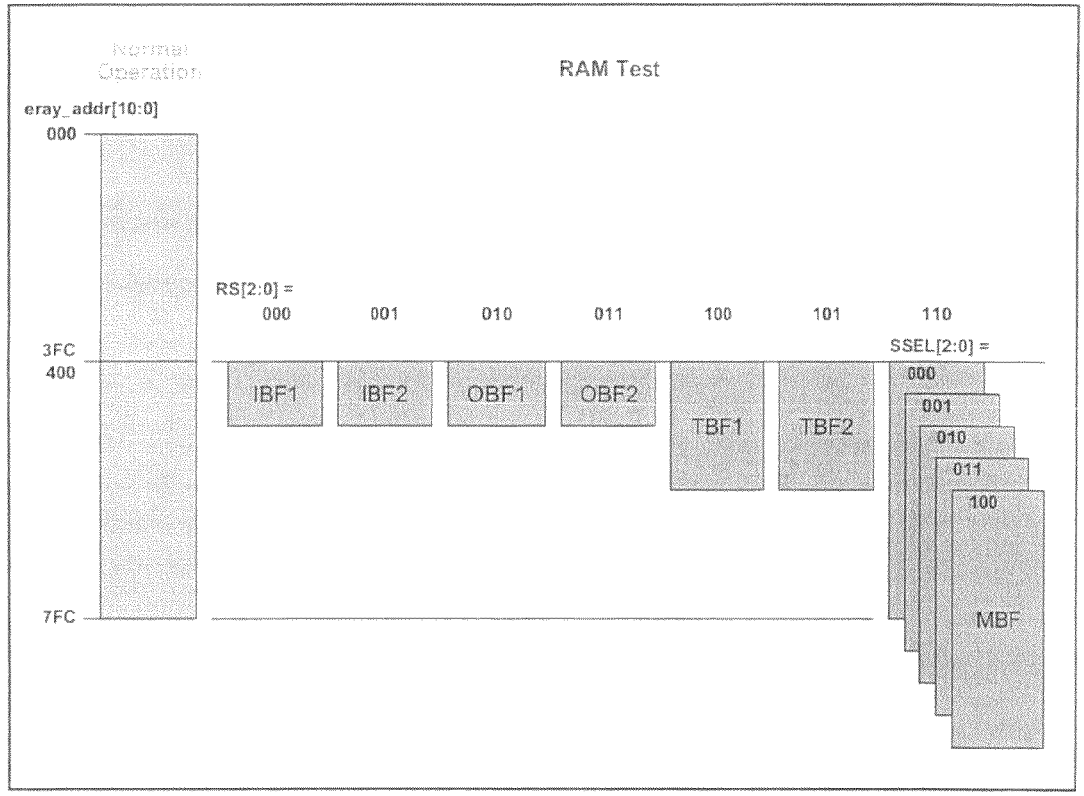
Figure 7: Test mode access to E-Ray RAM blocks
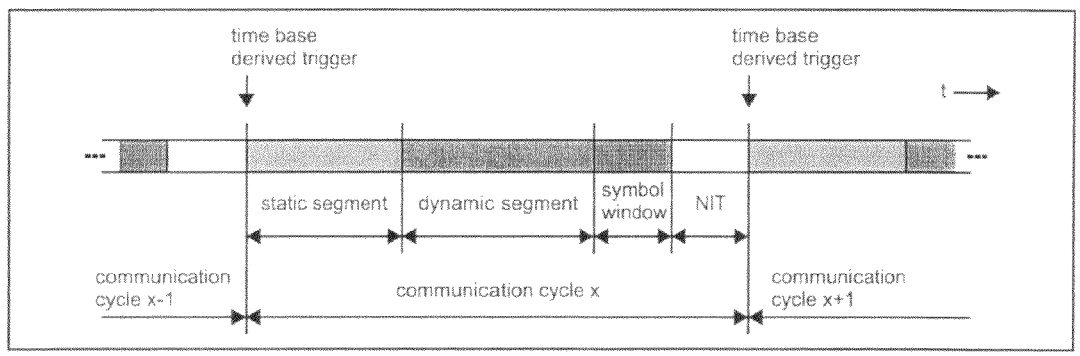
Figure 8: Structure of communication cycle

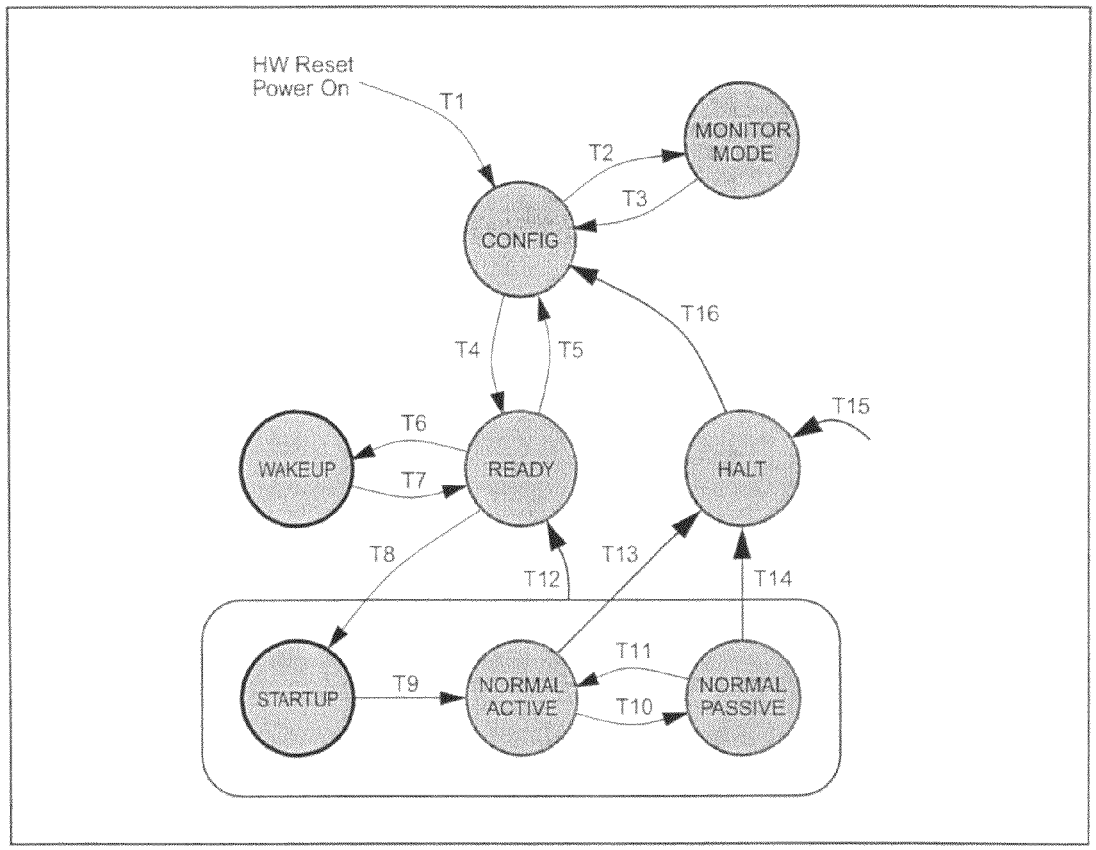
Figure 9: Overall state diagramm of E-Ray communication controller
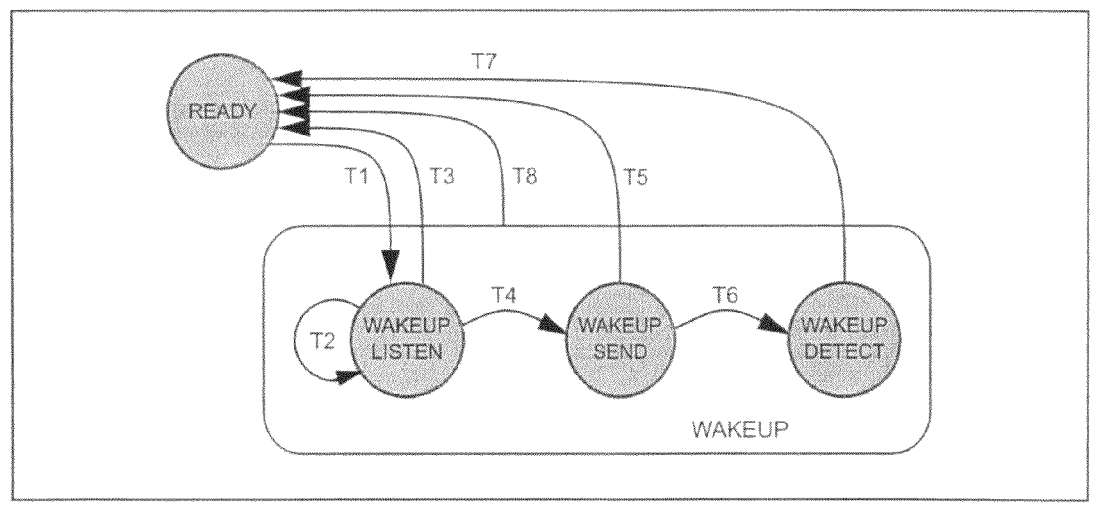
Figure 10: Structure of POC state WAKEUP

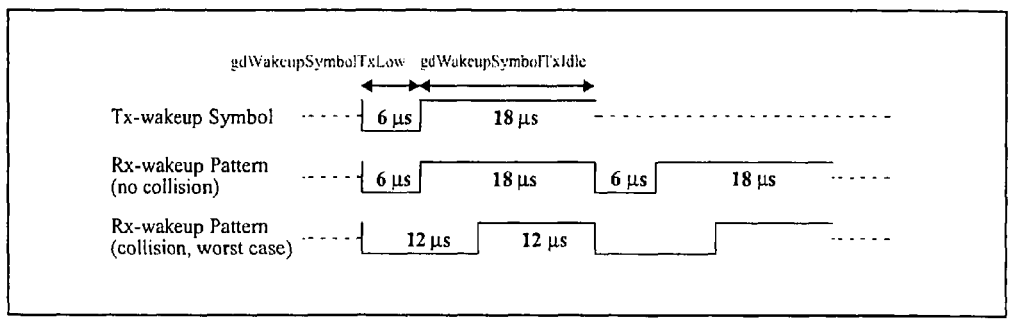
Figure 11: Timing of wakeup pattern

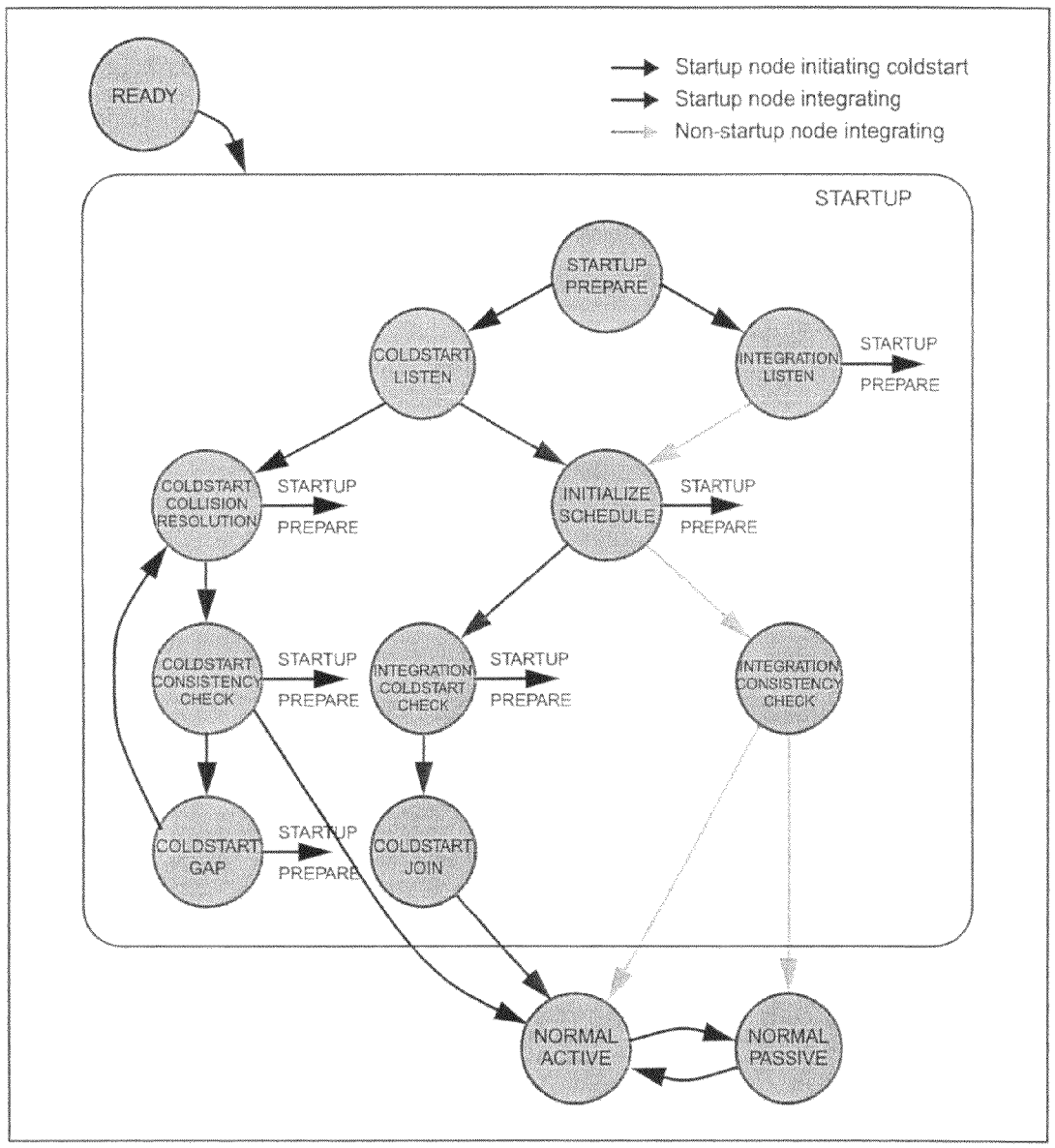
Figure 12: State diagram time-triggered startup

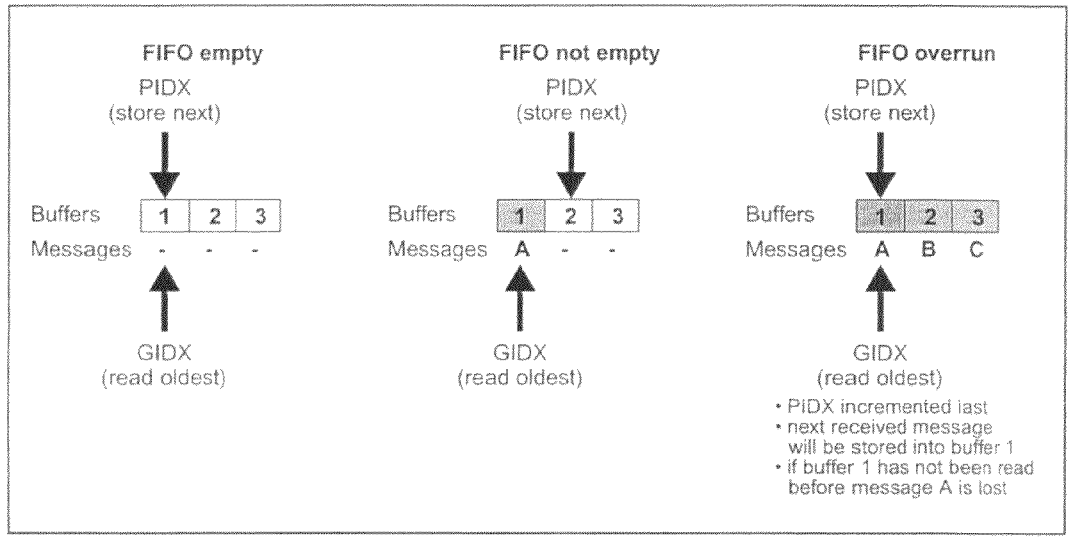
Figure 13: FIFO buffer status: empty, not empty, overrun
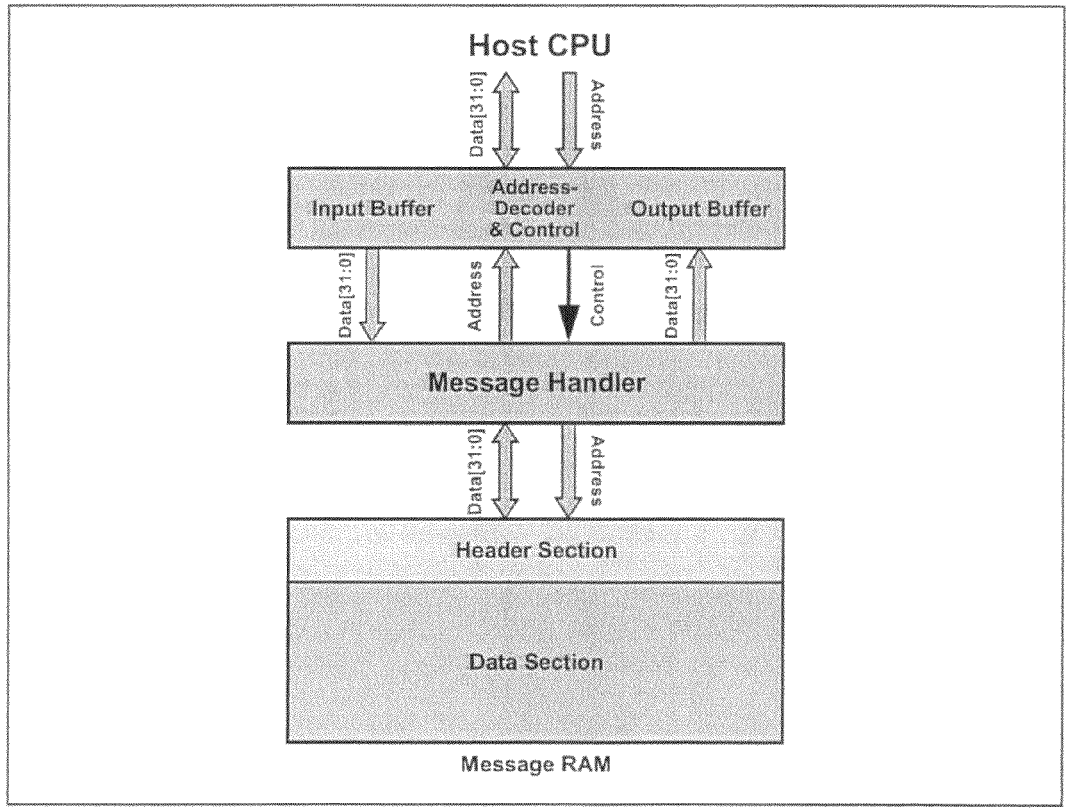
Figure 14: CPU access to Message Buffers

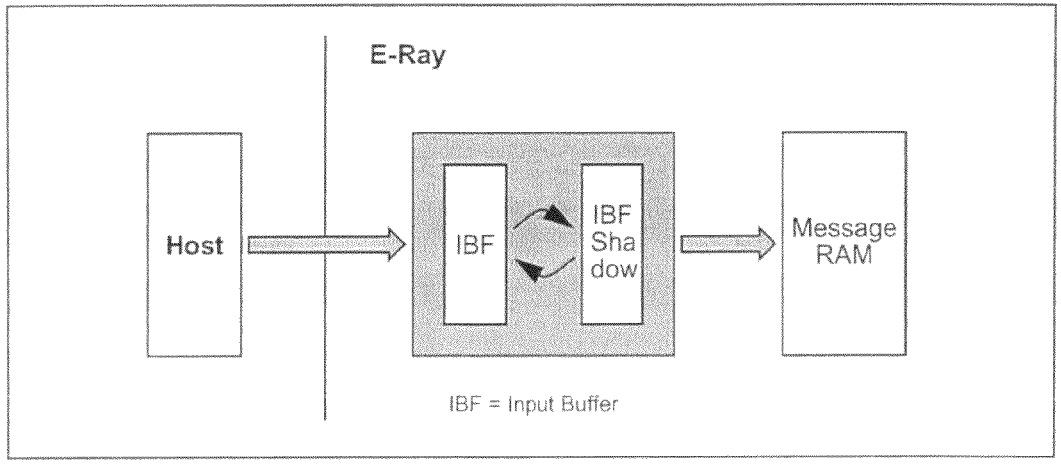
Figure 15: Double buffer structure Input Buffer
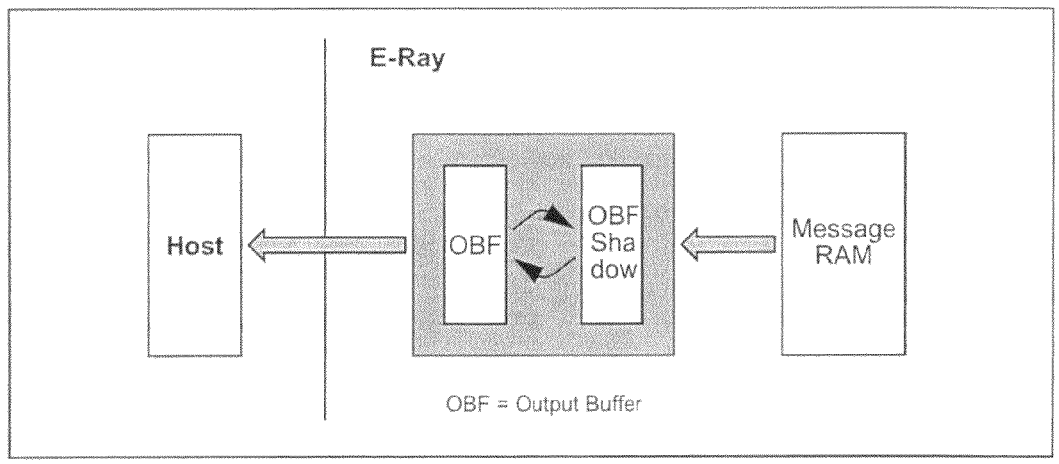
Figure 16: Double buffer structure Output Buffer

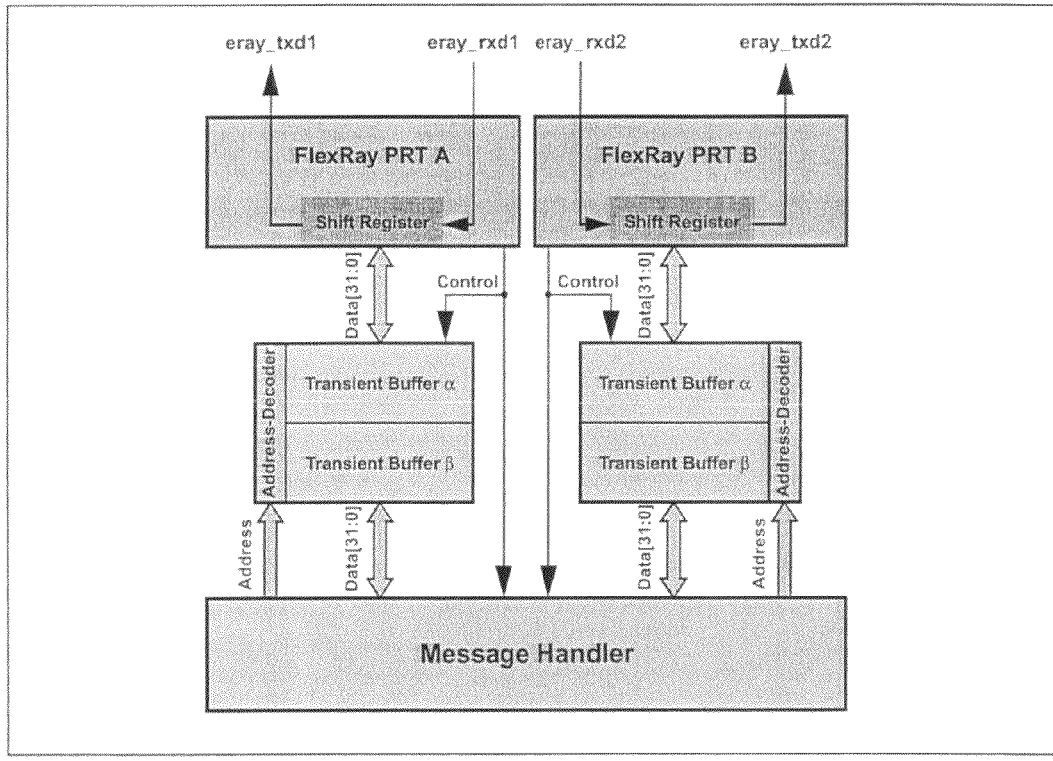
Figure 17: Acceess to Transient Buffer RAMs
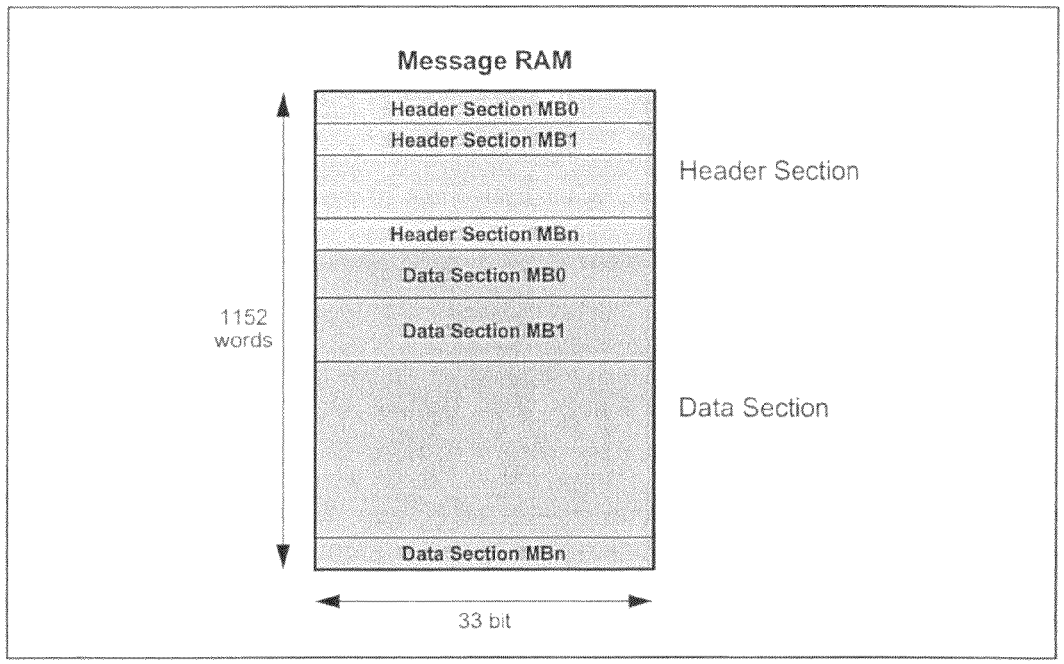
Figure 18: Structure of Message RAM

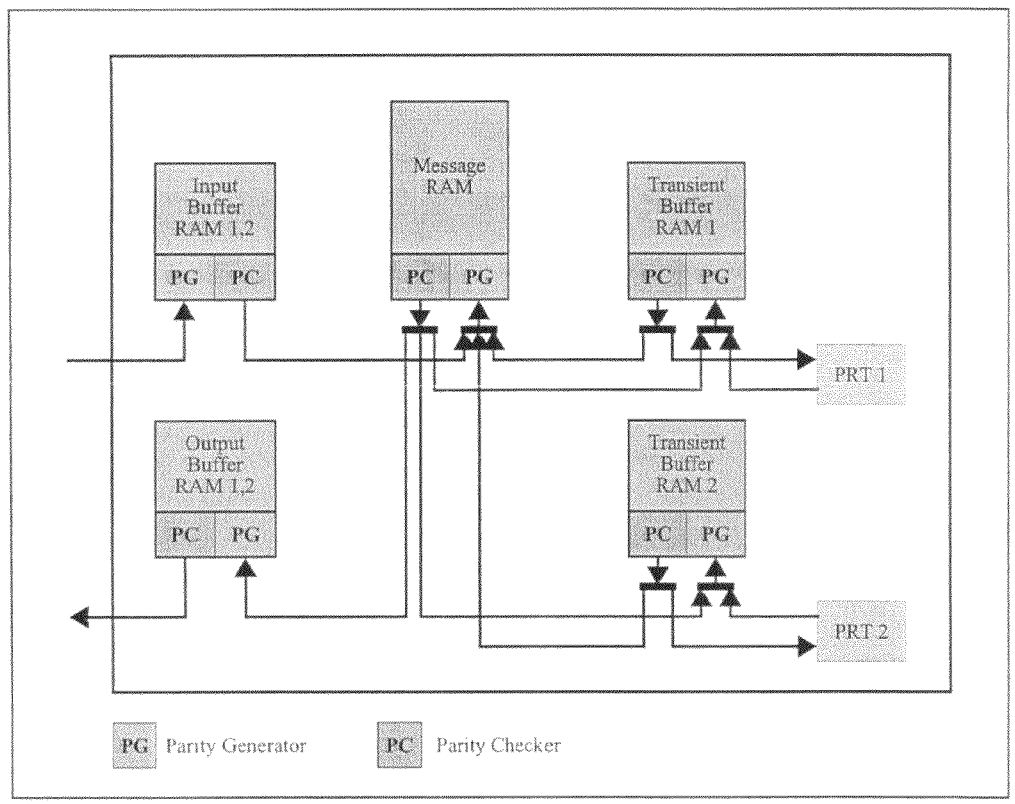
Figure 19: Parity generation and check

FLEXRAY COMMUNICATION CONTROLLER

1. ABOUT THIS DOCUMENT

1.1 Change Control

1.1.1 Current Status

Revision 0.62

1.1.2 Change History

| Issue | Date | By | Change |
|---|---|---|---|
| Revision 0.1 | 18.09.02 | C. Horst | First Draft |
| Revision 0.2 | 19.03.03 | C. Horst | Adapted to PWD 0.8 |
| Revision 0.3 | 12.08.03 | C. Horst | Chapters 3, 5, 6 completed |
| Revision 0.4 | 10.10.03 | C. Horst | Adapted to actual state of protocol development |
| Revision 0.5 | 19.12.03 | C. Horst | Adapted to actual state of protocol development |
| Revision 0.51 | 12.02.04 | C. Horst | Adapted to actual state of protocol development |
| Revision 0.52 | 12.03.04 | C. Horst | Adapted to actual state of protocol development |
| Revision 0.53 | 07.05.04 | C. Horst | Adapted to actual state of protocol development |
| Revision 0.6 | 21.05.04 | C. Horst | Adapted to actual state of protocol development |
| Revision 0.61 | 24.06.04 | C. Horst | Adapted to actual state of protocol development |
| Revision 0.62 | 19.07.04 | C. Horst | Adapted to actual state of protocol development |

1.2 Conventions

The following conventions are used within this User's Manual:

| | |
|---|---|
| Helvetica bold | Names of bits and signals |
| *Helvetica italic* | States of bits and signals |

1.3 Scope

This document describes the E-Ray FlexRay IP-module and its features from the application programmer's point of view. All information necessary to integrate the E-Ray module into an user-defined ASIC is located in the Module Integration Guide. Information about a specific Customer CPU Interface can be found in the respective Customer CPU Interface Specification document.

This documents reflects the actual state of the E-Ray IP-module under development. There is no compatibility guaranteed to future versions of the E-Ray IP-module specification.

1.4 References

This document refers to the following documents:

| Ref | Author(s) | Title |
|---|---|---|
| 1 | FlexRay Group | FlexRay Communication System Protocol Specification v2.0 |

1.5 Terms and Abbreviations

This document uses the following terms and abbreviations:

| Term | Meaning |
|---|---|
| AP | Action Point |
| BCA | Bit Clock Alignment |
| BD | Bus Driver |
| BDe | Electrical Bus Driver |
| BDo | Optical Bus Driver |
| BG | Bus Guardian |
| BGE | Capitalize guardian and enable |
| BGSME | Bus Guardian Schedule Monitor Error (error signal) |
| BGSM | Bus Guardian Schedule Monitor |
| BGT | Capitalize guardian and tick, add the word signal |
| BSD | Bit Stream Decoding |
| BSE | Bit Stream Encoding |
| BSS | Byte Start Sequence |
| CAS | Collision Avoidance Symbol |
| CC | Communication Controller |
| CCFC | Clock Correction Failed Counter |
| CCLR | Clock Correction Limit Reached (error signal) |
| CCMS | Coldstart Count Maximum Signal (error signal) |
| CE | Communication Element |
| CHI | Controller Host Interface |
| CHIRP | Channel Idle Recognition Point |
| CRC | Cyclic Redundancy Check |
| CSEI | Channel Status and Error Information |
| DTS | Dynamic Trailing Sequence |
| ECU | Electronic Control Unit. Same as node. |
| EMC | Electro Magnetic Compatibility |
| ERRN | Error Not signal |
| FES | Frame End Sequence |
| FIFO | First In, First Out (data buffer structure) |
| FSEI | Frame Status and Error Information |
| FSP | Frame and Symbol Processing |
| FSS | Frame Start Sequence |
| FTA | Fault Tolerant Average. |
| FTDMA | Flexible Time Division Multiple Access (media access method). |
| FTM | Fault Tolerant Midpoint |
| IBF | Input Buffer |
| ICW | Initial Check Window |
| IFG | Inter Frame Gap |
| INH | Inhibit signal |
| ISG | Inter-slot gap |
| LLI | Logical Line Interface |
| MAC | Media Access Control. |
| MAS | Media Access Scheme |
| MOCS | Missing Offset Correction Signal (error signal) |
| MRCS | Missing Rate Correction Signal (error signal) |
| MT | Macrotick |
| MTS | Media Access Test Symbol |
| NCT | Network Communication Time |
| NIT | Network Idle Time |
| NM | Network Management |
| NRZ | Non-Return to Zero (method of encoding) |
| OBF | Output Buffer |
| SDL | Specification and Description Language |
| SMMS | Startup Majority Missed Signal (error signal) |
| SPI | Serial Peripheral Interface |
| STBN | Standby Not signal |
| SW | Symbol Window |
| TBD | To Be Determined |
| TDMA | Time Division Multiple Access (media access method) |
| TRP | Time Reference Point |
| TSS | Transmission Start Sequence |
| TT-D | Time Triggered Distributed Synchronization (protocol mode) |
| TT-M | Time Triggered Master Controlled Synchronization (protocol mode) |
| TxEN | Transmit enable signal from CC |
| μT | Microtick |
| VCW | Validation Check Window |
| WDT | Watchdog disable time |
| WU | Wakeup |
| WUS | Wakeup Symbol |

2. OVERVIEW

The E-Ray module is a FlexRay IP-module that can be integrated as stand-alone device or as part of an ASIC. It is described in VHDL on RTL level, prepared for synthesis. The E-Ray IP-module performs communication according to the FlexRay protocol specification v2.0. The bitrate can be programmed to values up to 10 MBit/s. For connection to the physical layer additional Bus Guardian (BG) and Bus Driver (BD) hardware is required.

For communication on a FlexRay network, individual message buffers with up to 254 data bytes are configured. The message storage consists of a single-ported Message RAM that holds up to 64 message buffers. All functions concerning the handling of messages are implemented in the Message Handler. Those functions are the acceptance filtering, the transfer of messages between the two FlexRay Protocol Controllers and the Message RAM, maintaining the transmission schedule as well as providing message status information.

The register set of the E-Ray IP-module can be accessed directly by an external CPU via the modules Host interface. These registers are used to control/configure/monitor the FlexRay Protocol Controllers, Message Handler, Global Timing Unit, System Universal Control, Frame and Symbol Processing, Network Management, Interrupt Control, and to access the Message RAM via Input/Output Buffer.

The E-Ray IP-module can be connected to a wide range of customer-specific Host CPUs via its 8/16/32-bit Generic CPU Interface.

The E-Ray IP-module supports the following features:
Conform with FlexRay protocol specification v2.0
Data rates of up to 10 Mbit/s on each channel
Up to 64 message buffers configurable
4.6 Kbyte of Message RAM for storage of e.g. 64 messages buffers with max. 56 byte data field or up to 16 messages with 254 byte data field
Configuration of message buffers with different payload lengths also possible
One configurable Receive FIFO
Each message buffer can be configured as Receive Buffer, as Transmit Buffer or as part of the Receive FIFO
Host access to message buffers via Input and Output Buffer.
Input Buffer: holds message to be transferred to the Message RAM
Output Buffer: holds message read from Message RAM
Filtering for frame ID, channel ID, and cycle counter
Maskable module interrupt
Network Management supported
8/16/32-bit Generic CPU Interface, connectable to a wide range of customer-specific Host CPUs

BRIEF DESCRIPTION OF THE DRAWINGS

FIG. 1 shows E-Ray block diagram.
FIG. 2 shows generic interface of E-Ray core.
FIG. 3 shows write access to E-Ray registers and Input/Output Buffer RAM.
FIG. 4 shows read access to E-Ray registers and Input/Output Buffer RAM.
FIG. 5 shows data transfer from Input Buffer RAM to Message RAM and Message RAM to Output Buffer RAM.
FIG. 6 shows synchronous read/write access to embedded RAM blocks.
FIG. 7 shows test mode access to E-ray RAM blocks.
FIG. 8 shows structure of communication cycle.
FIG. 9 shows overall state diagram of E-Ray communication controller.
FIG. 10 shows structure of POC state WAKEUP.
FIG. 11 shows timing of wakeup pattern.
FIG. 12 shows state diagram time-triggered startup.
FIG. 13 shows FIFO buffer status: empty, not empty, overrun.
FIG. 14 shows CPU access to Message Buffers.
FIG. 15 shows double buffer structure Input Buffer.
FIG. 16 shows double buffer structure Output Buffer.
FIG. 17 shows access to Transient Buffer RAMS.
FIG. 18 shows structure of Message RAM.
FIG. 19 shows parity generation and check.

2.1 Block Diagram
FIG. 1: E-Ray Block Diagram
Customer CPU Interface (CIF)
Connects a Customer specific Host CPU to the E-Ray IP-module via the Generic CPU Interface.
Generic CPU Interface (GIF)
The E-Ray IP-module is provided with a 8/16/32-bit Generic CPU Interface prepared for the connection to a wide range of customer-specific Host CPUs. Configuration registers, status registers, and interrupt registers are attached to the respective blocks and can be accessed via the Generic CPU Interface.
Input Buffer (IBF)
For write access to the message buffers configured in the Message RAM, the Host CPU can write the header and data section for a specific message buffer to the Input Buffer. The Message Handler then transfers the data from the Input Buffer to the selected message buffer in the Message RAM.
Output Buffer (OBF)
For read access to a message buffer configured in the Message RAM the Message Handler transfers the selected message buffer to the Output Buffer. After the transfer has completed the Host CPU can read the header and data section of the transferred message buffer from the Output Buffer.
Message Handler (MHD)
The E-Ray Message Handler controls data transfers between the following components:
Input/Output Buffer and Message RAM
Transient Buffer RAMs of the two FlexRay Protocol Controllers and Message RAM
Message RAM
The Message RAM consists of a single-ported RAM that stores up to 64 FlexRay message buffers E together with the related configuration data (header and data section).
RAM A/B
Transient Buffer RAMs. Buffer the last received messages or messages to be transmitted next. Store the data section of two complete messages.
PRT A/B
The FlexRay Protocol Controllers consist of shift register and FlexRay protocol FSM. They are connected to the Transient Buffer RAMs for intermediate message storage and to the physical layer via Bus Guardian (BG) and Bus Driver (BD)
They perform the following functionality:
Control of bit timing
reception/transmission of FlexRay frames and symbols
check of header CRC
generation/check of frame CRC
interfacing to Bus Guardian and Bus Driver
The FlexRay Protocol Controllers have interfaces to:
Physical Layer (Bus Guardian and Bus Driver)
Transient Buffer RAM.

Message Handler
Global Time Unit
System Universal Control
Frame and Symbol Processing
Network and Error Management
Interrupt Control
Global Time Unit (GTU)
The Timing Unit performs the following functions:
generation of microtick
generation of macrotick
fault tolerant clock synchronization by FTM algorithm
    rate correction
        offset correction
cycle counter
timing control of static segment
timing control of dynamic segment (mini slotting)
support of external clock correction
System Universal Control (SUC)
The System Universal Control controls the following functions:
Wakeup
Startup
Normal Operation
Passive Operation
Frame and Symbol Processing (FSP)
The Frame and Symbol Processing controls the following functions:
checks the correct timing of frames and symbols
tests the syntactical and semantical correctness of received frames
sets the slot status flags
Network Management (NEM)
The Network Management performs the following functions:
handling of the network management vector
Interrupt Control (INT)
The Interrupt Controller performs the following functions:
holds error and status interrupt flags
controls enable/disable of interrupt sources
controls assignment of interrupt sources to the two module interrupt lines
enable/disable of the two module interrupt lines
holds the two interrupt timers

3. GENERIC INTERFACE

The Generic Interface encapsulates the synthesizable code of the E-Ray design (E-Ray Core). All customer specific components like Customer CPU Interfaces and RAM blocks are connected to the Generic Interface. FIG. 2 shows the connection of the E-Ray Core to the external world via its Generic Interface.

FIG. 2: Generic Interface of E-Ray Core

The Generic Interface consists of Generic CPU Interface, interfaces to the embedded RAM blocks, and the Physical Layer Interface.

3.1 Generic CPU Interface

The Generic CPU Interface connects the E-Ray module to a customer specific Host CPU via the Customer CPU Interface. The Generic CPU Interface was designed for connection to a wide range of customer-specific CPUs. It supports 8/16/32 bit accesses and has the following ports:

TABLE 1

Generic Host interface

| Signal | Type | Description |
| --- | --- | --- |
| eray_sclk | I | Sample Clock, 80 MHz |
| eray_bclk | I | Bus Clock, >40 MHz |
| eray_reset | I | Module Reset |
| eray_select | I | Module Select |
| eray_addr[10:0] | I | Address Input |
| eray_byten[3:0] | I | Byte Enable |
| eray_write | I | Write/Read Control: '1' = write, '0' = read |
| eray_wdata[31:0] | I | Write Data Input |
| eray_stpwt | I | Stop Watch Trigger Input |
| eray_wrdy | O | Write Ready Output |
| eray_rrdy | O | Read Ready Output |
| eray_rdata[31:0] | O | Read Data Output |
| eray_int0 | O | Interrupt Line 0 to CPU |
| eray_int1 | O | Interrupt Line 1 to CPU |
| eray_tint0 | O | Timer Interrupt 0 Output |
| eray_tint1 | O | Timer Interrupt 1 Output |
| eray_ibusy | O | Transfer Input Buffer RAM to Message RAM busy |
| eray_obusy | O | Transfer Message RAM to Output Buffer RAM busy |

3.1.1 Host Access Via Generic Interface

FIG. 3: Write Access to E-Ray Registers and Input/Output Buffer RAM

A write access to a register takes one clock cycle. A write access to a RAM address takes two clock cycles.

FIG. 4: Read Access to E-Ray Registers and Input/Output Buffer RAM

Because of the synchronous RAM a read access from the internally RAM blocks takes two clock cycles, while data from registers are valid within one clock cycle. Signal eray_byten[4] is ignored at a read access.

FIG. 5: Data Transfer from Input Buffer RAM to Message RAM and Message RAM. To Output Buffer RAM A data transfer from Input Buffer to the Message RAM (or from Message RAM to Output Buffer) is initiated by a write access to the respective Command Request register (IBCR/OBCR). The delay time until the respective busy signal (eray_ibusy or eray_obusy) is reset depends on the payload length of the message and the actual state of the Message Handler.

3.2 Physical Layer Interface

The Physical Layer Interface connects the E-Ray module to Bus Guardian (BG) and Bus Driver (BD):

TABLE 2

Physical layer interface

| Signal | Type | Description |
| --- | --- | --- |
| eray_arm | O | Bus Guardian ARM signal, indicates the start of the communication cycle to the BG. |

TABLE 2-continued

Physical layer interface

| Signal | Type | Description |
|---|---|---|
| eray_bgt | O | Bus Guardian Tick, derived from the eray_sclk by means of a frequency divider, used by the MT watchdog of the BG. |
| eray_mt | O | Bus Guardian Macrotick, the MT signal is an accurate representation of the CC's internal corrected macrotick clock. |

Channel A

| Signal | Type | Description |
|---|---|---|
| eray_rxd1 | I | Data Receiver Input |
| eray_txd1 | O | Data Transmitter Output |
| eray_txen1_n | O | Transmit Enable signal, evaluated by the BG for supervision of the CC schedule, a schedule mismatch is detected if eray_txen1_n is active while eray_bge1 is inactive. HIGH = transmission inactive, LOW = transmission active |
| eray_bge1 | I | Bus Guardian Enable signal, controls transmit access to the communication medium, also used by the CC for supervision of the BG schedule. HIGH = transmission enabled, LOW = transmission disabled |

Channel B

| Signal | Type | Description |
|---|---|---|
| eray_rxd2 | I | Data Receiver Input |
| eray_txd2 | O | Data Transmitter Output |
| eray_txen2_n | O | Transmit Enable signal, evaluated by the BG for supervision of the CC schedule, a schedule mismatch is detected if eray_txen2_n is active while eray_bge2 is inactive. HIGH = transmission inactive, LOW = transmission active |
| eray_bge2 | I | Bus Guardian Enable signal, controls transmit access to the communication medium, also used by the CC for supervision of the BG schedule. HIGH = transmission enabled, LOW = transmission disabled |

For each of the two channels a separate Bus Driver and Bus Guardian device is required. The Bus Guardian is optional.

3.3 Interface to Embedded RAM Blocks

The seven embedded RAM blocks used by the E-Ray design are connected to the E-Ray core via the interfaces described below. The E-Ray module is designed for connection to single-ported RAM with synchronous RD/WR. The width for all RAM blocks is 33 bit; 32 data bits and one parity bit.

3.3.1 Input Buffer Interface

The Input Buffer RAM 1 interface has the following ports:

TABLE 3

Interface to Input Buffer RAM 1

| Signal | Type | Description |
|---|---|---|
| eray_bclk_out | O | Module Clock |
| eray_ibf1_addr[5:0] | O | Address Output |
| eray_ibf1_cen | O | RAM Select |
| eray_ibf1_wren | O | Write Control |
| eray_ibf1_data[32:0] | O | Write Data Output |
| eray_ibf1_q[32:0] | I | Read Data Input |

The Input Buffer RAM 2 interface has the following ports:

TABLE 4

Interface to Input Buffer RAM 2

| Signal | Type | Description |
|---|---|---|
| eray_bclk_out | O | Module Clock |
| eray_ibf2_addr[5:0] | O | Address Output |
| eray_ibf2_cen | O | RAM Select |

TABLE 4-continued

Interface to Input Buffer RAM 2

| Signal | Type | Description |
|---|---|---|
| eray_ibf2_wren | O | Write Control |
| eray_ibf2_data[32:0] | O | Write Data Output |
| eray_ibf2_q[32:0] | I | Read Data Input |

3.3.2 Output Buffer Interface

The Output Buffer RAM 1 interface has the following ports:

TABLE 5

Interface to Output Buffer RAM 1

| Signal | Type | Description |
|---|---|---|
| eray_bclk_out | O | Module Clock |
| eray_obf1_addr[5:0] | O | Address Output |
| eray_obf1_cen | O | RAM Select |
| eray_obf1_wren | O | Write Control |
| eray_obf1_data[32:0] | O | Write Data Output |
| eray_obf1_q[32:0] | I | Read Data Input |

The Output Buffer RAM 2 interface has the following ports:

TABLE 6

Interface to Output Buffer RAM 2

| Signal | Type | Description |
|---|---|---|
| eray_bclk_out | O | Module Clock |
| eray_obf2_addr[5:0] | O | Address Output |

TABLE 6-continued

| | Interface to Output Buffer RAM 2 | |
|---|---|---|
| Signal | Type | Description |
| eray_obf2_cen | O | RAM Select |
| eray_obf2_wren | O | Write Control |
| eray_obf2_data[32:0] | O | Write Data Output |
| eray_obf2_q[32:0] | I | Read Data Input |

3.3.3 Message RAM Interface

The Message RAM stores header and data section of up to 64 message buffers. The Message RAM interface has the following ports:

TABLE 7

| | Interface to Message RAM | |
|---|---|---|
| Signal | Type | Description |
| eray_bclk_out | O | Module Clock |
| eray_mbf_addr[10:0] | O | Address Output |
| eray_mbf_cen | O | RAM Select |
| eray_mbf_wren | O | Write Control |
| eray_mbf_data[32:0] | O | Write Data Output |
| eray_mbf_q[32:0] | I | Read Data Input |

3.3.4 Transient Buffer RAM Interface

Each of the two FlexRay channels has a Transient Buffer RAM associated. The Transient Buffer RAM interface of channel A has the following ports:

TABLE 8

| | Interface to Transient Buffer RAM A | |
|---|---|---|
| Signal | Type | Description |
| eray_bclk_out | O | Module Clock |
| eray_tbf1_addr[6:0] | O | Address Output |
| eray_tbf1_cen | O | RAM Select |
| eray_tbf1_wren | O | Write Control |
| eray_tbf1_data[32:0] | O | Write Data Output |
| eray_tbf1_q[32:0] | I | Read Data Input |

The Transient Buffer RAM interface of channel B has the following ports:

TABLE 9

| | Interface to Transient Buffer RAM B | |
|---|---|---|
| Signal | Type | Description |
| eray_bclk_out | O | Module Clock |
| eray_tbf2_addr[6:0] | O | Address Output |
| eray_tbf2_cen | O | RAM Select |
| eray_tbf2_wren | O | Write Control |
| eray_tbf2_data[32:0] | O | Write Data Output |
| eray_tbf2_q[32:0] | I | Read Data Input |

3.3.5 Read/Write Access to Embedded RAM Blocks

FIG. 6: Synchronous Read/Write Access to Embedded RAM Blocks

4. PROGRAMMER'S MODEL

4.1 Register Map

The E-Ray module allocates an address space of 2 Kbytes (0x0000 to 0x07FF). The registers are organized as 32-bit registers. 8/16-bit accesses are also supported. Host access to the Message RAM is done via the Input and Output Buffers. They buffer data to be transferred to and from the Message RAM under control of the Message Handler, avoiding conflicts between Host accesses and message reception/transmission.

Addresses 0x0000 to 0x000F are reserved for customer specific purposes. All functions related to these addresses are located in the Customer CPU Interface. The test registers located on address 0x0010 and 0x0014 are only writeable under the conditions described in 4.3 Special Registers.

The assignment of the message buffers is done according to the scheme shown in table 10 below. The number N of available message buffers depends on the payload length of the configured message buffers and may vary from 16 (254 data bytes) to a maximum of 64 (56 data bytes) message buffers.

The message buffers are separated into three consecutive groups:

Static Buffers—Transmit/Receive Buffers for the static segment

Dynamic Buffers—Transmit/Receive Buffers for the dynamic segment

FIFO Buffers—Receive FIFO

The message buffer separation configuration can be changed in CONFIG state only by programming the Message RAM Configuration register. The set of message buffers assigned to the static segment starts at message buffer 0 and ends before the first message buffer assigned to the dynamic segment.

The message buffer that holds the key slot ID configured by SFID[9:0] in the Message Handler Configuration Register 2 is dedicated to hold the Startup/Sync frame if the node is a Startup/Sync node (configured by TXST and TXSY in the SUC Configuration Register 1) or the single slot frame.

The set of message buffers assigned to the dynamic segment starts after the last static buffer and ends before the FIFO buffer. All message buffers that are not assigned to the static segment or to the dynamic segment are concatenated into a single FIFO buffer. The FIFO buffer starts after the last dynamic buffer. There will be no FIFO buffer if all available message buffers are assigned to the static segment and/or to the dynamic segment.

TABLE 10

| Assignment of message buffers | |
|---|---|
| Message Buffer 0 | ↓Static Buffers |
| Message Buffer 1 | ↓Dynamic Buffers |
| . . . | ↓FIFO Buffers |
| Message Buffer N-1 | |
| Message Buffer N | |

TABLE 11

E-Ray register map

| Address | Symbol | Name | Page | Reset | Acc | Block |
|---|---|---|---|---|---|---|
| | | Customer Registers | | | | |
| 0x0000 | | see Customer CPU Interface Specification | | | | CIF |
| 0x0004 | | | | | | |
| 0x0008 | | | | | | |
| 0x000C | | | | | | |
| | | Special Registers | | | | |
| 0x0010 | TEST1 | Test Register 1 | 28 | 0000 0000 | r/w | GIF |
| 0x0014 | TEST2 | Test Register 2 | 31 | 0000 0000 | r/w | |
| 0x0018 | | reserved (1) | | 0000 0000 | r | |
| 0x001C | LCK | Lock Register | 33 | 0000 0000 | r/w | GIF |
| | | Interrupt Registers | | | | |
| 0x0020 | EIR | Error Interrupt Register | 34 | 0000 0000 | r/w | INT |
| 0x0024 | SIR | Status Interrupt Register | 37 | 0000 0000 | r/w | |
| 0x0028 | EILS | Error Interrupt Line Select | 40 | 0000 0000 | r/w | |
| 0x002C | SILS | Status Interrupt Line Select | 42 | 0303 1FFF | r/w | |
| 0x0030 | EIES | Error Interrupt Enable Set | 44 | 0000 0000 | r/w | |
| 0x0034 | EIER | Error Interrupt Enable Reset | 44 | 0000 0000 | r/w | |
| 0x0038 | SIES | Status Interrupt Enable Set | 46 | 0000 0000 | r/w | |
| 0x003C | SIER | Status Interrupt Enable Reset | 46 | 0000 0000 | r/w | |
| 0x0040 | ILE | Interrupt Line Enable | 47 | 0000 0000 | r/w | |
| 0x0044 | T0C | Timer 0 Configuration | 49 | 0000 0000 | r/w | |
| 0x0048 | T1C | Timer 1 Configuration | 48 | 0000 0000 | r/w | |
| 0x004C | STPW | Stop Watch Register | 50 | 0000 0000 | r/w | |
| 0x0050-0x007C | | reserved (12) | | 0000 0000 | r | |
| | | CC Control Registers | | | | |
| 0x0080 | SUCC1 | SUC Configuration Register 1 | 51 | 1800 0000 | r/w | SUC |
| 0x0084 | SUCC2 | SUC Configuration Register 2 | 54 | 0100 05A4 | r/w | |
| 0x0088 | PRTC1 | PRT Configuration Register 1 | 55 | 084C 0005 | r/w | PRT |
| 0x008C | PRTC2 | PRT Configuration Register 2 | 56 | 0F2D 0E0E | r/w | |
| 0x0090 | MHDC1 | MHD Configuration Register 1 | 57 | 0001 0000 | r/w | MHD |
| 0x0094 | MHDC2 | MHD Configuration Register 2 | 57 | 0000 0001 | r/w | |
| 0x0098 | NEMC | NEM Configuration Register | 58 | 0000 0011 | r/w | NEM |
| 0x009C | | reserved (1) | | 0000 0000 | r | |
| 0x00A0 | GTUC1 | GTU Configuration Register 1 | 59 | 0000 02D0 | r/w | GTU |
| 0x00A4 | GTUC2 | GTU Configuration Register 2 | 59 | 0002 000C | r/w | |
| 0x00A8 | GTUC3 | GTU Configuration Register 3 | 60 | 0001 0000 | r/w | |
| 0x00AC | GTUC4 | GTU Configuration Register 4 | 60 | 000A 000A | r/w | |
| 0x00B0 | GTUC5 | GTU Configuration Register 5 | 61 | 0001 0000 | r/w | |
| 0x00B4 | GTUC6 | GTU Configuration Register 6 | 61 | 0002 0000 | r/w | |
| 0x00B8 | GTUC7 | GTU Configuration Register 7 | 62 | 0002 0005 | r/w | |
| 0x00BC | GTUC8 | GTU Configuration Register 8 | 62 | 0000 0002 | r/w | |
| 0x00C0 | GTUC9 | GTU Configuration Register 9 | 63 | 0001 0101 | r/w | |
| 0x00C4 | GTUC10 | GTU Configuration Register 10 | 63 | 0002 0001 | r/w | |
| 0x00C8 | GTUC11 | GTU Configuration Register 11 | 64 | 0000 0000 | r/w | |
| 0x00CC-0x00FC | | reserved (13) | | 0000 0000 | r | |
| | | CC Status Registers | | | | |
| 0x0100 | CCSEV | CC Status and Error Vector | 65 | 0000 0000 | r | SUC |
| 0x0104-0x010C | | reserved (3) | | 0000 0000 | r | |
| 0x0110 | SCV | Slot Counter Value | 67 | 0001 0001 | r | GTU |
| 0x0114 | MTCCV | Macrotick and Cycle Counter Value | 67 | 0000 0000 | r | |
| 0x0118 | CCS1 | Clock Correction Status 1 | 68 | 0000 0000 | r | |
| 0x011C | CCS2 | Clock Correction Status 2 | 69 | 0000 0000 | r | |
| 0x0120 | SFS | Sync Frame Status | 69 | 0000 0000 | r | |
| 0x0124 | SWNIT | Symbol Window and NIT Status | 70 | 0000 0000 | r | |
| 0x0128 | ACS | Aggregated Channel Status | 71 | 0000 0000 | r/w | |
| 0x012C | | reserved (1) | | 0000 0000 | r | |
| 0x0130-0x016C | ESIDn | Even Sync ID [0 ... 15] | 72 | 0000 0000 | r | |
| 0x0170-0x01AC | OSIDn | Odd Sync ID [0 ... 15] | 73 | 0000 0000 | r | |
| 0x01B0-0x01EC | EAABn | Even Arrival Channel A, B [0 ... 15] | 73 | 0000 0000 | r | |
| 0x01F0-0x022C | OAABn | Odd Arrival Channel A, B [0 ... 15] | 74 | 0000 0000 | r | |
| 0x0230-0x0238 | NMVn | Network Management Vector [1 ... 3] | 74 | 0000 0000 | r | NEM |
| 0x023C-0x02FC | | reserved (49) | | 0000 0000 | r | |
| | | Message Buffer Control Registers | | | | |
| 0x0300 | MRC | Message RAM Configuration | 75 | 0000 0000 | r/w | MHD |
| 0x0304 | FRF | FIFO Rejection Filter | 76 | 0000 0000 | r/w | |
| 0x0308 | FRFM | FIFO Rejection Filter Mask | 76 | 0000 0000 | r/w | |
| 0x030C | | reserved (1) | | 0000 0000 | r | |

TABLE 11-continued

E-Ray register map

| Address | Symbol | Name | Page | Reset | Acc | Block |
|---|---|---|---|---|---|---|
| | | Message Buffer Status Registers | | | | |
| 0x0310 | TXRQ1 | Transmission Request Register 1 | 77 | 0000 0000 | r | MHD |
| 0x0314 | TXRQ2 | Transmission Request Register 2 | 77 | 0000 0000 | r | |
| 0x0318-0x031C | | reserved (2) | | 0000 0000 | r | |
| 0x0320 | NDAT1 | New Data Register 1 | 78 | 0000 0000 | r | |
| 0x0324 | NDAT2 | New Data Register 2 | 78 | 0000 0000 | r | |
| 0x0328-0x032C | | reserved (2) | | 0000 0000 | r | |
| 0x0330 | MHDS | Message Handler Status | 79 | 0000 0000 | r/w | |
| 0x0334-0x03FC | | reserved (51) | | 0000 0000 | r | |
| | | Input Buffer | | | | |
| 0x0400-0x04FC | WRDSn | Write Data Section [1 … 64] | 80 | undefined | r/w | IBF |
| 0x0500 | WRHS1 | Write Header Section 1 | 81 | 0000 0000 | r/w | |
| 0x0504 | WRHS2 | Write Header Section 2 | 82 | 0000 0000 | r/w | |
| 0x0508 | WRHS3 | Write Header Section 3 | 82 | 0000 0000 | r/w | |
| 0x050C | | reserved (1) | | 0000 0000 | r/w | |
| 0x0510 | IBCR | Input Buffer Command Request | 83 | 0000 0000 | r/w | |
| 0x0514 | IBCM | Input Buffer Command Mask | 84 | 0000 0000 | r/w | |
| 0x0518-0x05FC | | reserved (58) | | 0000 0000 | r | |
| | | Output Buffer | | | | |
| 0x0600-0x06FC | RDDSn | Read Data Section [1 … 64] | 85 | undefined | r | OBF |
| 0x0700 | RDHS1 | Read Header Section 1 | 85 | 0000 0000 | r | |
| 0x0704 | RDHS2 | Read Header Section 2 | 87 | 0000 0000 | r | |
| 0x0708 | RDHS3 | Read Header Section 3 | 87 | 0000 0000 | r | |
| 0x070C | MBS | Message Buffer Status | 88 | 0000 0000 | r | |
| 0x0710 | OBCR | Output Buffer Command Request | 90 | 0000 0000 | r/w | |
| 0x0714 | OBCM | Output Buffer Command Mask | 91 | 0000 0000 | r/w | |
| 0x0718-0x07FC | | reserved (58) | | 0000 0000 | r | |

4.2 Customer Registers

The address space from 0x0000 to 0x000F is reserved for customer-specific registers. These registers, if implemented, are located in the Customer CPU Interface block. A description can be found in the specific Customer CPU Interface specification document.

4.3 Special Registers

4.3.1 Test Register 1 (TEST1)

The Test Register 1 holds the control bits to configure the test modes of the E-Ray module. Write access to this register is only possible if the WRTEN bit is set.

TMC[2:0] Test Mode Control

000=Normal operation mode, default

001=RAM Test mode—All RAM blocks of the E-Ray module are directly accessible by the Host CPU. This mode is intended to enable testing of the embedded RAM blocks during production testing.

010=Loop Back mode—In Loop Back mode, the E-Ray module works in Asynchronous Transmit mode and treats its own transmitted messages as received messages and stores them (if they pass acceptance filtering) into the first matching Receive Buffer.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| TEST1 R | 0 | 0 | 0 | 0 | 0 | MT | BGT | ARM | BGEB | BGEA | TXENB | TXENA | TXB | TXA | RXB | RXA |
| 0x0010 W | | | | | | MT | BGT | ARM | | | TXENB | TXENA | TXB | TXA | | |
| Reset | 0 | 0 | 0 | 0 | 0 | 0 | 0 | 0 | 0 | 0 | 0 | 0 | 0 | 0 | 0 | 0 |
| Bit | 15 | 14 | 13 | 12 | 11 | 10 | 9 | 8 | 7 | 6 | 5 | 4 | 3 | 2 | 1 | 0 |
| R | 0 | 0 | 0 | 0 | 0 | 0 | 0 | 0 | 0 | TMC2 | TMC1 | TMC0 | 0 | 0 | 0 | WRTEN |
| W | | | | | | | | | | TMC2 | TMC1 | TMC0 | | | | WRTEN |
| Reset | 0 | 0 | 0 | 0 | 0 | 0 | 0 | 0 | 0 | 0 | 0 | 0 | 0 | 0 | 0 | 0 |

WRTEN Write Test Register Enable

Enables write access to the test registers. To set the bit from '0' to '1' the test mode key has to be written as defined in section 4.3.3 Lock Register (LCK). The unlock sequence is not required when WRTEN is kept at '1' while other bits of the register are changed. The bit can be reset to '0' at any time.

1=Write access to the Test Register is enabled

0=Write access to the Test Register is disabled

011=I/O Test mode—The output pins eray_txd1, eray_txd2, eray_txen1_n, eray_txen2_n, eray_arm, eray_bgt, eray_mt are driven to the values defined by bits TXA, TXB, TXENA, TXENB, ARM, BGT, MT. The values applied to the input pins eray_rxd1, eray_rxd2, eray_bge1, eray_bge2 can be read from register bits RXA, RXB, BGEA, BGEB 100..111=unused—mapped to normal operation mode.

The following Test Register 1 bits are used to test the interface to the physical layer (connectivity test) by driving/reading the respective pins.

RXA Monitor Channel A Receive Pin
0=eray_rxd1='0'
1=eray_rxd1='1'
RXB Monitor Channel B Receive Pin
0=eray_rxd2='0'
1=eray_rxd2='1'
TXA Control of Channel A Transmit Pin
0=eray_txd1 pin drives a '0'
1=eray_txd1 pin drives a '1'
TXB Control of Channel B Transmit Pin
0=eray_txd2 pin drives a '0'
1=eray_txd2 pin drives a '1'
TXENA Control of Channel A Transmit Enable Pin
0=eray_txen1_n pin drives a '0'
1=eray_txen1_n pin drives a '1'
TXENB Control of Channel B Transmit Enable Pin
0=eray_txen2_arm pin drives a '0'
1=eray_txen2_arm pin drives a '1'
BGEA Monitor Channel A Bus Guardian Enable Pin
0=eray_bge1='0'
1=eray_bge1='1' the Input Buffer Command Mask register is set to '1'. In this mode wakeup, startup, and clock synchronization are bypassed.

Loop Back Mode

The Loop Back mode state is entered by writing "1101" to the CHI Command Vector CMD[3:0] in the SUC Configuration Register 1 (CHI command: LOOP_BACK) while the CC is in CONFIG state and bit WRTEN in the Test Register 1 is set to '1'. When called in any other state or when bit WRTEN is not set, CMD[3:0] will be reset to "0000"=command_not_valid.

Loop Back mode can be left by writing "0001" (CHI command: CONFIG) to the CHI Command Vector CMD[3:0] in the SUC Configuration Register 1. POCS[5:0] in the CC Status and Error Vector will show "00 1001" while the E-Ray module is in Loop Back mode.

>>>Description of Loop Back Mode<<<

4.3.2 Test Register 2 (TEST2)

The Test Register 2 holds all bits required for RAM test of the embedded RAM blocks of the E-Ray-module. Write access to this register is only possible when bit WRTEN in the Test Register 1 is set.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| TEST2 R | 0 | 0 | 0 | 0 | 0 | 0 | 0 | 0 | 0 | 0 | 0 | 0 | 0 | 0 | 0 | 0 |
| 0x0114 W | | | | | | | | | | | | | | | | |
| Reset | 0 | 0 | 0 | 0 | 0 | 0 | 0 | 0 | 0 | 0 | 0 | 0 | 0 | 0 | 0 | 0 |
| Bit | 15 | 14 | 13 | 12 | 11 | 10 | 9 | 8 | 7 | 6 | 5 | 4 | 3 | 2 | 1 | 0 |
| R | RDPB | | 0 | 0 | 0 | 0 | 0 | 0 | 0 | SSEL2 | SSEL1 | SSEL0 | 0 | RS2 | RS1 | RS0 |
| W | | WRPB | | | | | | | | | | | | | | |
| Reset | 0 | 0 | 0 | 0 | 0 | 0 | 0 | 0 | 0 | 0 | 0 | 0 | 0 | 0 | 0 | 0 |

BGEB Monitor Channel B Bus Guardian Enable Pin
0=eray_bge2='0'
1=eray_bge2='1'
ARM Control of Bus Guardian ARM Pin
0=eray_arm pin drives a '0'
1=eray_arm pin drives a '1'
BGT Control of Bus Guardian Tick Pin
0=eray_bgt pin drives a '0'
1=eray_bgt pin drives a '1'
MT Control of Bus Guardian Macrotick Pin
0=eray_mt pin drives a '0'
1=eray_mt pin drives a '1'
Asynchronous Transmit Mode (ATM)

The Asynchronous Transmit mode state is entered by writing "1100" to the CHI Command Vector CMD[3:0] in the SUC Configuration Register 1 (CHI command: ATM) while the CC is in CONFIG state and bit WRTEN in the Test Register 1 is set to '1'. When called in any other state or when bit WRTEN is not set, CMD[3:0] will be reset to "0000"=command_not_valid.

Asynchronous Transmit mode can be left by writing "0001" (CHI command: CONFIG) to the CHI Command Vector CMD[3:0] in the SUC Configuration Register 1. POCS[5:0] in the CC Status and Error Vector will show "00 1000" while the E-Ray module is in ATM mode.

In ATM mode transmission of a FlexRay frame is triggered by writing the number of the respective message buffer to the Input Buffer Command Request register while bit STXR in RS[2:0] RAM Select
In RAM Test mode the RAM blocks selected by RS[2:0] are mapped to module address 0x400 to 7FF (1024 byte addresses).
000=Input Buffer RAM 1
001=Input Buffer RAM 2
010=Output Buffer RAM 1
011=Output Buffer RAM 2
100=Transient Buffer RAM A
101=Transient Buffer RAM B
110=Message RAM
111=unused
SSEL[2:0] Segment Select
To enable access to the complete Message RAM (4608 byte addresses) the Message RAM is segmented.
000=access to RAM bytes 0000h to 03FFh enabled
001=access to RAM bytes 0400h to 07FFh enabled
010=access to RAM bytes 0800h to 0BFFh enabled
011=access to RAM bytes 0C00h to 0FFFh enabled
100=access to RAM bytes 1000h to 11FFh enabled
101..111=unused
WRPB Write Parity Bit
Value of parity bit to be written to the selected RAM location
RDPB Read Parity Bit
Value of parity bit read from the selected RAM location.

4.3.2.1 RAM Test Mode

In RAM Test mode (TMC[2:0]="001"), one of the seven RAM blocks can be selected for direct RD/WR access by programming RS[2:0] to the respective value.

000: IBF1=Input Buffer RAM
001: IBF2=Input Buffer Shadow RAM
010: OBF1=Output Buffer RAM
011: OBF2=Output Buffer Shadow RAM
100: TBF1=Transient Buffer RAM A
101: TBF2=Transient Buffer RAM B
110: MBF=Message RAM For external access the selected RAM block is mapped to address space 400h to 7FF (1024 byte addresses or 256 word addresses).

Because the length of the Message RAM exceeds the available address space, the Message RAM is segmented into segments of 1024 bytes. The segments can be selected by programming SSEL[2:0] in the Test Register 2.

FIG. 7: Test Mode Access to E-Ray RAM Blocks

4.3.3 Lock Register (LCK)

The Lock Register is write-only. Reading the register will return 0x0000.

interrupted by read accesses or write accesses to other locations, the CC remains in CONFIG state and the sequence has to be repeated.

First write: 0xCE=0b1100 1110
Second write: 0x31=0b0011 0001

TMK[7:0] Test Mode Key

To write bit WRTEN in the Test Register to '1', the write operation has to be directly preceded by two consecutive write accesses to the Test Mode Key. If this write sequence is interrupted by read accesses or write accesses to other locations, bit WRTEN is not set to '1' and the sequence has to be repeated.

First write: 0x75=0b0111 0101
Second write: 0x8A=0b1000 1010

4.4 Interrupt Registers.

4.4.1 Error Interrupt Register (EIR)

The flags are set when the CC detects one of the listed error conditions. They remain set until the Host clears them. A flag is cleared by writing a '1' to the corresponding bit position. Writing a '0' has no effect on the flag. A hard reset will also clear the register.

| Bit | | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|---|
| LCK | R | 0 | 0 | 0 | 0 | 0 | 0 | 0 | 0 | 0 | 0 | 0 | 0 | 0 | 0 | 0 | 0 |
| 0x011C | W | | | | | | | | | | | | | | | | |
| Reset | | 0 | 0 | 0 | 0 | 0 | 0 | 0 | 0 | 0 | 0 | 0 | 0 | 0 | 0 | 0 | 0 |

| Bit | | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| | R | 0 | 0 | 0 | 0 | 0 | 0 | 0 | 0 | 0 | 0 | 0 | 0 | 0 | 0 | 0 | 0 |
| | W | TMK7 | TMK6 | TMK5 | TMK4 | TMK3 | TMK2 | TMK1 | TMK0 | CLK7 | CLK6 | CLK5 | CLK4 | CLK3 | CLK2 | CLK1 | CLK0 |
| Reset | | 0 | 0 | 0 | 0 | 0 | 0 | 0 | 0 | 0 | 0 | 0 | 0 | 0 | 0 | 0 | 0 |

CLK[7:0] Configuration Lock Key

To leave CONFIG state by writing to CMD[3:0] in the SUC Configuration Register 1, the write operation has to be directly preceded by two consecutive write accesses to the Configuration Lock Key. If this write sequence is

| Bit | | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|---|
| EIR | R | WSCB | SMEB | SVB | USB | LMB | CCMB | SMB | BCEB | WSCA | SMEA | SVA | USA | LMA | CCMA | SMA | BCEA |
| 0x0020 | W | | | | | | | | | | | | | | | | |
| Reset | | 0 | 0 | 0 | 0 | 0 | 0 | 0 | 0 | 0 | 0 | 0 | 0 | 0 | 0 | 0 | 0 |

| Bit | | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| | R | 0 | 0 | 0 | 0 | 0 | 0 | 0 | 0 | 0 | PERR | SCE | CCF | MSF | NSF | CNV | PEMC |
| | W | | | | | | | | | | | | | | | | |
| Reset | | 0 | 0 | 0 | 0 | 0 | 0 | 0 | 0 | 0 | 0 | 0 | 0 | 0 | 0 | 0 | 0 |

PEMC POC Error Mode Changed
This flag is set whenever the error mode signalled by ERRM[1:0] in the CC Status and Error Vector register has changed.
1=Error mode has changed
0=Error mode has not changed
CNV Command Not Valid
The flag signals that the CHI command vector CMD[3:0] in the SUC Configuration Register 1 was reset to "0000" due to an illegal CHI command.
1=Illegal CHI command detected
0=No illegal CHI command detected
NSF No Sync Frame Received
This flag signals that no Sync frame was received during the last communication cycle. The minimum number of Sync frames per communication cycle is 2.
1=No Sync frame received during last communication cycle
0=One or more Sync frames received during last communication cycle
MSF Maximum Number of Sync Frames Exceeded
This flag signals that the number of received Sync frames exceeds the maximum number of Sync frames per communication cycle as configured by SNM[3:0] in the GTU Configuration Register 2.
1=More than Sync frames received than configured
0=Number of received Sync frames in the configured range
CCF Clock Correction Failure
This flag is set at the end of the cycle whenever one of the following errors occurred:
 Missing Rate Correction Signal
 Missing Offset Correction Signal
 Clock Correction Failed Counter stopped at 15
 Clock Correction Limit Reached
The clock correction status is monitored in the Clock Correction Status Register 1. A reset of CCF will also clear the CCLR flag in the Clock Correction Status Register 1.
1=Clock correction failed
0=No clock correction error
SCE Slot Configuration Error
The flag signals a slot configuration error to the Host. The flag is set by the Message Handler when it detects a slot configuration error when reading a frame ID from the Message RAM (see section 5.11 Message Handling).
1=Slot configuration error detected
0=No slot configuration error detected
PERR Parity Error
The flag signals a parity error to the Host. The flag is set by the parity logic of the CC when it detects a parity error while reading from one of the RAM blocks (see also 4.8.3 Message Handler Status (MHDS) Message Handler Status Register).
1=Parity error detected
0=No parity error detected
Channel-Specific Error Flags:
BCEA Bit Coding/CRC Error Channel A
1=Bit coding, header CRC or frame CRC error detected on channel A
0=no bit coding, header CRC or frame CRC error detected
SMA Slot Mismatch Channel A
This bit will be set when the Frame ID of a successfully received message differs from the current time slot. The error is detected in both parts of the communication cycle. In the Static Segment of the communication cycle, the time slot is the current static slot. In the Dynamic Segment of the communication cycle, the time slot is the current minislot.
1=Slot mismatch detected on channel A
0=No slot mismatch detected
CCMA Cycle Counter Mismatch Channel A
1=Cycle counter mismatch detected on channel A
0=No cycle counter mismatch detected.
LMA Length Mismatch Channel A
1=Length mismatch detected on channel A
0=No length mismatch detected.
USA Unaccepted Symbol Channel A
1=Unaccepted symbol on channel A
0=No unaccepted symbol on channel A
SVA Silence Violation Channel A
This bit will be set when a Silence Violation occurred on channel A.
1=A Silence Violation has been detected on channel A
0=No Silence Violation has been detected on channel A
SMEA BG Schedule Monitoring Error Channel A
The flag signals a bus guardian schedule monitoring violation on channel A to the Host.
1=Bus guardian schedule monitoring error detected on channel A
0=No bus guardian schedule monitoring error detected
WSCA Wakeup Symbol Collision Indicator Channel A
The flag signals a wakeup symbol collision on channel A to the Host.
1=Wakeup symbol collision detected on channel A
0=No wakeup symbol collision detected on channel A
BCEB Bit Coding/CRC Error Channel B
1=Bit coding, header CRC or frame CRC error detected on channel B
0=No bit coding, header CRC or frame CRC error detected
SMB Slot Mismatch Channel B
This bit will be set when the Frame ID of a successfully received message differs from the current time slot. The error is detected in both parts of the communication cycle. In the Static Segment of the communication cycle, the time slot is the current static slot. In the Dynamic Segment of the communication cycle, the time slot is the current minislot.
1=Slot mismatch detected on channel B
0=No slot mismatch detected
CCMB Cycle Counter Mismatch Channel B
1=Cycle counter mismatch detected on channel B
0=No cycle counter mismatch detected
LMB Length Mismatch Channel B
1=Length mismatch detected on channel B
0=No length mismatch detected
USB Unaccepted Symbol Channel B
1=Unaccepted symbol on channel B
0=No unaccepted symbol on channel B
SVB Silence Violation Channel B
This bit will be set when a Silence Violation occurred on channel B.
1=A Silence Violation has been detected on channel B
0=No Silence Violation has been detected on channel B
SMEB BG Schedule Monitoring Error Channel B
The flag signals a bus guardian schedule monitoring violation on channel B to the Host.
1=Bus guardian schedule monitoring error detected on channel B
0=No bus guardian schedule monitoring error detected
WSCB Wakeup Symbol Collision Indicator Channel B
The flag signals a wakeup symbol collision on channel B to the Host.
1=Wakeup symbol collision detected on channel B
0=No wakeup symbol collision detected on channel B

4.4.2 Status Interrupt Register (SIR)

The flags are set by the CC when a corresponding event occurs. They remain set until the Host clears them. If enabled, an interrupt is pending while one of the bits is set. A flag is cleared by writing a '1' to the corresponding bit position. Writing a '0' has no effect on the flag. A hard reset will also clear the register.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| SIR R | 0 | 0 | 0 | 0 | 0 | 0 | MTSB | WUSB | 0 | 0 | 0 | 0 | 0 | 0 | MTSA | WUSA |
| 0x0024 W | | | | | | | | | | | | | | | | |
| Reset | 0 | 0 | 0 | 0 | 0 | 0 | 0 | 0 | 0 | 0 | 0 | 0 | 0 | 0 | 0 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | 0 | 0 | 0 | SWE | TOBC | TIBC | TI1 | TI0 | NMVC | RFO | RFNE | RXI | TXI | CYCS | CAS | WST |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

WST Wakeup Status
This flag is set whenever the wakeup status vector WSV[2:0] in the CC Status and Error Vector register has changed.
1=Wakeup status changed
0=Wakeup status unchanged CAS Collision Avoidance Symbol
This flag is set by the CC when a CAS was received.
1=CAS symbol received
0=No CAS symbol received CYCS Cycle Start Interrupt
This flag is set by the CC when a communication cycle starts
1=Communication cycle started
0=No communication cycle started TXI Transmit Interrupt
This flag is set by the CC after successful frame transmission
1=At least one frame was transmitted successfully
0=No frame transmitted RXI Receive Interrupt
This flag is set by the CC when a frame was received and stored in one of the dedicated receive buffers.
1=At least one receive buffer is full
0=All receive buffers are empty RFNE Receive FIFO Not Empty
This flag is set by the CC when a frame was received and stored in the FIFO buffer.
1=Receive FIFO is not empty
0=Receive FIFO is empty RFO Receive FIFO Overrun
This flag is set by the CC when a receive FIFO overrun was detected.
1=A Receive FIFO overrun has been detected
0=No Receive FIFO overrun detected NMVC Network Management Vector Changed
This interrupt flag signals a change in the Network Management Vector visible to the Host.
1=Network management vector changed
0=No change in the network management vector TI0 Timer Interrupt 0
This flag is set whenever the conditions programmed in the Timer Interrupt 0 Configuration Register are met. A Timer Interrupt 0 is also signalled on pin eray_tint0.
1=Timer Interrupt 0 occurred
0=no Timer Interrupt 0

TI1 Timer Interrupt 1
This flag is set whenever the conditions programmed in the Timer Interrupt 1 Configuration Register are met. A Timer Interrupt 1 is also signalled on pin eray_tint1.
1=Timer Interrupt 1 occurred
0=no Timer Interrupt 1

TIBC Transfer Input Buffer Completed
This flag is set whenever a data transfer from Input Buffer to the Message RAM has completed and bit IBSYS in the Input Buffer Command Request register has been reset by the Message Handler.
1=transfer between Input Buffer and Message RAM completed
0=no transfer completed since bit was reset TOBC Transfer Output Buffer Completed
This flag is set whenever a data transfer from the Message RAM to the Output Buffer has completed and bit OBSYS in the Output Buffer Command Request register has been reset by the Message Handler.
1=transfer between Message RAM and Output Buffer completed
0=no transfer completed since bit was reset SWE Stop Watch Event
If enabled by the respective control bits located in the Stop Watch register, a detected edge on pin eray_stpwt will generate a stop watch event.
1=Stop Watch Event occurred
0=no Stop Watch Event Channel-Specific Status Flags:

WUSA Wakeup Symbol Channel A
This flag is set by the CC when a Wakeup symbol was received on channel A.
1=Wakeup symbol channel A
0=No Wakeup symbol on channel A MTSA MTS Received on Channel A (vSS!ValidMTSA)
Media Access Test symbol received on channel A during the last symbol window. Updated by the CC for each channel at the end of the symbol window.
1=MTS symbol received on channel A
0=No MTS symbol received WUSB Wakeup Symbol Channel B
This flag is set by the CC when a Wakeup symbol was received on channel B.
1=Wakeup symbol channel B
0=No Wakeup symbol on channel B MTSB MTS Received on Channel B (vSS!ValidMTSB)

Media Access Test symbol received on channel B during the last symbol window. Updated by the CC for each channel at the end of the symbol window.
1=MTS symbol received on channel B
0=No MTS symbol received

4.4.3 Error Interrupt Line Select (EILS)

The settings in the Error Interrupt Line Select register assigns an interrupt generated by a specific error interrupt flag to one of the two module interrupt lines (eray_int0 or eray_int1).

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| EILS 0x0028 R/W | WSCBL | SMEBL | SVBL | USBL | LMBL | CCMBL | SMBL | BCEBL | WSCAL | SMEAL | SVAL | USAL | LMAL | CCMAL | SMAL | BCEAL |
| Reset | 0 | 0 | 0 | 0 | 0 | 0 | 0 | 0 | 0 | 0 | 0 | 0 | 0 | 0 | 0 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | 0 | 0 | 0 | 0 | 0 | 0 | 0 | 0 | 0 | PERRL | SCEL | CCFL | MSFL | NSFL | CNVL | PEMCL |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

PEMCL POC Error Mode Changed Interrupt Line
1=Interrupt assigned to interrupt line eray_int1
0=Interrupt assigned to interrupt line eray_int0
CNVL Command Not Valid Interrupt Line
1=Interrupt assigned to interrupt line eray_int1
0=Interrupt assigned to interrupt line eray_int0
NSFL No Sync Frame Received Interrupt Line
1=Interrupt assigned to interrupt line eray_int1
0=Interrupt assigned to interrupt line eray_int0
MSFL Maximum Number of Sync Frames Exceeded Interrupt Line
1=Interrupt assigned to interrupt line eray_int1
0=Interrupt assigned to interrupt line eray_int0
CCFL Clock Correction Failure Interrupt Line
1=Interrupt assigned to interrupt line eray_int1
0=Interrupt assigned to interrupt line eray_int0
SCEL Slot Configuration Error Interrupt Line
1=Interrupt assigned to interrupt line eray_int1
0=Interrupt assigned to interrupt line eray_int0
PERRL Parity Error Interrupt Line
1=Interrupt assigned to interrupt line eray_int1
0=Interrupt assigned to interrupt line eray_int0
BCEAL Bit Coding/CRC Error Channel A Interrupt Line
1=Interrupt assigned to interrupt line eray_int1
0=Interrupt assigned to interrupt line eray_int0
SMAL Slot Mismatch Channel A Interrupt Line
1=Interrupt assigned to interrupt line eray_int1
0=Interrupt assigned to interrupt line eray_int0
CCMAL Cycle Counter Mismatch Channel A Interrupt Line
1=Interrupt assigned to interrupt line eray_int1
0=Interrupt assigned to interrupt line eray_int0
LMAL Length Mismatch Channel A Interrupt Line
1=Interrupt assigned to interrupt line eray_int1
0=Interrupt assigned to interrupt line eray_int0
USAL Unaccepted Symbol Channel A Interrupt Line
1=Interrupt assigned to interrupt line eray_int1
0=Interrupt assigned to interrupt line eray_int0
SVAL Silence Violation Channel A Interrupt Line
1=Interrupt assigned to interrupt line eray_int1
0=Interrupt assigned to interrupt line eray_int0
SMEAL BG Schedule Monitoring Error Channel A Interrupt Line
1=Interrupt assigned to interrupt line eray_int1
0=Interrupt assigned to interrupt line eray_int0
WSCAL Wakeup Symbol Collision Indicator Channel A Interrupt Line
1=Interrupt assigned to interrupt line eray_int1
0=Interrupt assigned to interrupt line eray_int0
BCEBL Bit Coding/CRC Error Channel B Interrupt Line
1=Interrupt assigned to interrupt line eray_int1
0=Interrupt assigned to interrupt line eray_int0
SMBL Slot Mismatch Channel B Interrupt Line
1=Interrupt assigned to interrupt line eray_int1
0=Interrupt assigned to interrupt line eray_int0
CCMBL Cycle Counter Mismatch Channel B Interrupt Line
1=Interrupt assigned to interrupt line eray_int1
0=Interrupt assigned to interrupt line eray_int0
LMBL Length Mismatch Channel B Interrupt Line
1=Interrupt assigned to interrupt line eray_int1
0=Interrupt assigned to interrupt line eray_int0
USBL Unaccepted Symbol Channel B Interrupt Line
1=Interrupt assigned to interrupt line eray_int1
0=Interrupt assigned to interrupt line eray_int0
SVBL Silence Violation Channel B Interrupt Line
1=Interrupt assigned to interrupt line eray_int1
0=Interrupt assigned to interrupt line eray_int0
SMEBL BG Schedule Monitoring Error Channel B Interrupt Line
1=Interrupt assigned to interrupt line eray_int1
0=Interrupt assigned to interrupt line eray_int0
WSCBL Wakeup Symbol Collision Indicator Channel B Interrupt Line
1=Interrupt assigned to interrupt line eray_int1
0=Interrupt assigned to interrupt line eray_int0

4.4.4 Status Interrupt Line Select (SILS)

The settings in the Status Interrupt Line Select register assign an interrupt generated by a specific status interrupt flag to one of the two module interrupt lines (eray_int0 or eray_int1).

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| SILS R | 0 | 0 | 0 | 0 | 0 | 0 | MTSBL | WUSBL | 0 | 0 | 0 | 0 | 0 | 0 | MTSAL | WUSAL |
| 0x002C W | | | | | | | | | | | | | | | | |
| Reset | 0 | 0 | 0 | 0 | 0 | 0 | 1 | 1 | 0 | 0 | 0 | 0 | 0 | 0 | 1 | 1 |
| Bit | 15 | 14 | 13 | 12 | 11 | 10 | 9 | 8 | 7 | 6 | 5 | 4 | 3 | 2 | 1 | 0 |
| R | 0 | 0 | 0 | SWEL | TOBCL | TIBCL | TI1L | TI0L | NMVCL | RFOL | RFNEL | RXIL | TXIL | CYCSL | CASL | WSTL |
| W | | | | | | | | | | | | | | | | |
| Reset | 0 | 0 | 0 | 1 | 1 | 1 | 1 | 1 | 1 | 1 | 1 | 1 | 1 | 1 | 1 | 1 |

WSTL Wakeup Status Interrupt Line
  1=Interrupt assigned to interrupt line eray_int1
  0=Interrupt assigned to interrupt line eray_int0
CASL Collision Avoidance Symbol Interrupt Line
  1=Interrupt assigned to interrupt line eray_int1
  0=Interrupt assigned to interrupt line eray_int0
CYCL Cycle Start Interrupt Line
  1=Interrupt assigned to interrupt line eray_int1
  0=Interrupt assigned to interrupt line eray_int0
TXIL Transmit Interrupt Line
  1=Interrupt assigned to interrupt line eray_int1
  0=Interrupt assigned to interrupt line eray_int0
RXIL Receive Interrupt Line
  1=Interrupt assigned to interrupt line eray_int1
  0=Interrupt assigned to interrupt line eray_int0
RFNEL Receive FIFO Not Empty Interrupt Line
  1=Interrupt assigned to interrupt line eray_int1
  0=Interrupt assigned to interrupt line eray_int0
RFOL Receive FIFO Overrun Interrupt Line
  1=Interrupt assigned to interrupt line eray_int1
  0=Interrupt assigned to interrupt line eray_int0
NMVCL Network Management Vector Changed Interrupt Line
  1=Interrupt assigned to interrupt line eray_int1
  0=Interrupt assigned to interrupt line eray_int0
TI0L Timer Interrupt 0 Line
  1=Interrupt assigned to interrupt line eray_int1
  0=Interrupt assigned to interrupt line eray_int0
TI1L Timer Interrupt 1 Line
  1=Interrupt assigned to interrupt line eray_int1
  0=Interrupt assigned to interrupt line eray_int0
TIBCL Transfer Input Buffer Completed Interrupt Line
  1=Interrupt assigned to interrupt line eray_int1
  0=Interrupt assigned to interrupt line eray_int0
TOBCL Transfer Output Buffer Completed Interrupt Line
  1=Interrupt assigned to interrupt line eray_int1
  0=Interrupt assigned to interrupt line eray_int0
SWEL Stop Watch Event Interrupt Line
  1=Interrupt assigned to interrupt line eray_int1
  0=Interrupt assigned to interrupt line eray_int0
WUSAL Wakeup Symbol Channel A Interrupt Line
  1=Interrupt assigned to interrupt line eray_int1
  0=Interrupt assigned to interrupt line eray_int0
MTSAL Media Access Test Symbol Channel A Interrupt Line
  1=Interrupt assigned to interrupt line eray_int1
  0=Interrupt assigned to interrupt line eray_int0
WUSBL Wakeup Symbol Channel B Interrupt Line
  1=Interrupt assigned to interrupt line eray_int1
  0=Interrupt assigned to interrupt line eray_int0
MTSBL Media Access Test Symbol Channel B Interrupt Line
  1=Interrupt assigned to interrupt line eray_int1
  0=Interrupt assigned to interrupt line eray_int0

4.4.5 Error Interrupt Enable Set/Reset (EIES, EIER)

The settings in the Error Interrupt Enable register determine which status changes in the Error Interrupt Register will result in an interrupt. The enable bits are set by writing to address 0x0030 and reset by writing to address 0x0034. Writing a '1' sets/resets the specific enable bit, a '0' has no effect.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| EIES,R S:0x0030 R:0x0034 R/W | WSCBE | SMEBE | SVBE | USBE | LMBE | CCMBE | SMBE | BCEBE | WSCAE | SMEA | SVAE | USAE | LMAE | CCMAE | SMAE | BCEAE |
| Reset | 0 | 0 | 0 | 0 | 0 | 0 | 0 | 0 | 0 | 0 | 0 | 0 | 0 | 0 | 0 | 0 |
| Bit | 15 | 14 | 13 | 12 | 11 | 10 | 9 | 8 | 7 | 6 | 5 | 4 | 3 | 2 | 1 | 0 |
| R | 0 | 0 | 0 | 0 | 0 | 0 | 0 | 0 | 0 | PERRE | SCEE | CCFE | MSFE | NSFE | CNVE | PEMCE |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

PEMCE POC Error Mode Changed Interrupt Enable
  1=Protocol Error Mode Changed Interrupt enabled
  0=Interrupt disabled
CNVE Command Not Valid Interrupt Enable
  1=Command Not Valid Interrupt enabled
  0=Interrupt disabled
NSFE No Sync Frame Received Interrupt Enable
  1=No Sync Frame Received Interrupt enabled
  0=Interrupt disabled
MSFE Maximum Number of Sync Frames Exceeded Interrupt Enable
  1=Maximum Number of Sync Frames Exceeded Interrupt enabled
  0=Interrupt disabled
CCFE Clock Correction Failure Interrupt Enable
  1=Clock Correction Failure Interrupt enabled
  0=Interrupt disabled SCEE Slot Configuration Error Interrupt Enable
1=Slot Configuration Error Interrupt enabled
0=Interrupt disabled
PERRE Parity Error Interrupt Enable
1=Parity Error Interrupt enabled
0=Interrupt disabled
BCEAE Bit Coding/CRC Error Channel A Interrupt Enable
1=Bit Coding/CRC Error Channel A Interrupt enabled
0=Interrupt disabled
SMAE Slot Mismatch Channel A Interrupt Enable
1=Slot Mismatch Channel A Interrupt enabled
0=interrupt disabled
CCMAE Cycle Counter Mismatch Channel A Interrupt Enable
1=Cycle Counter Mismatch Channel A Interrupt enabled
0=Interrupt disabled
LMAE Length Mismatch Channel A Interrupt Enable
1=Length Mismatch Channel A Interrupt enabled
0=Interrupt disabled SVBE Silence Violation Channel B Interrupt Enable
1=Silence Violation Channel B Interrupt enabled
0=Interrupt disabled
SMEAE BG Schedule Monitoring Error Channel B Interrupt Enable
1=BG Schedule Monitoring Error Channel B Interrupt enabled
0=Interrupt disabled
WSCAE Wakeup Collision Indicator Channel B Interrupt Enable
1=Wakeup Collision Indicator Channel B Interrupt enabled
0=Interrupt disabled 4.4.6 Status Interrupt Enable Set/Reset (SIES, SIER)

The settings in the Status Interrupt Enable register determine which status changes in the Status Interrupt Register will result in an interrupt. The enable bits are set by writing to address 0x0038 and reset by writing to address 0x003C. Writing a '1' sets/resets the specific enable bit, a '0' has no effect.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| SIES,R S:0x0038 R:0x003C R | 0 | 0 | 0 | 0 | 0 | 0 | MTSBE | WUSBE | 0 | 0 | 0 | 0 | 0 | 0 | MTSAE | WUSAE |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |
| Bit | 15 | 14 | 13 | 12 | 11 | 10 | 9 | 8 | 7 | 6 | 5 | 4 | 3 | 2 | 1 | 0 |
| R | 0 | 0 | 0 | SWEE | TOBCE | TIBCE | TI1E | TI0E | NMVCE | RFOE | RFNEE | RXIE | TXIE | CYCSE | CASE | WSTE |
| W | | | | | | | | | | | | | | | | |
| Reset | | | | 0 | 0 | 0 | 0 | 0 | 0 | 0 | 0 | 0 | 0 | 0 | 0 | 0 |

USAE Unaccepted Symbol Channel A Interrupt Enable
1=Unaccepted Symbol Channel A Interrupt enabled
0=Interrupt disabled
SVAE Silence Violation Channel A Interrupt Enable
1=Silence Violation Channel A Interrupt enabled
0=Interrupt disabled
SMEAE BG Schedule Monitoring Error Channel A Interrupt Enable
1=BG Schedule Monitoring Error Channel A Interrupt enabled
0=Interrupt disabled
WSCAE Wakeup Collision Indicator Channel A Interrupt Enable
1=Wakeup Collision Indicator Channel A Interrupt enabled
0=Interrupt disabled
BCEBE Bit Coding/CRC Error Channel B Interrupt Enable
1=Bit Coding/CRC Error Channel B Interrupt enabled
0=Interrupt disabled
SMBE Slot Mismatch Channel B Interrupt Enable
1=Slot Mismatch Channel B Interrupt enabled
0=Interrupt disabled
CCMBE Cycle Counter Mismatch Channel B Interrupt Enable
1=Cycle Counter Mismatch Channel B Interrupt enabled
0=Interrupt disabled
LMBE Length Mismatch Channel B Interrupt Enable
1=Length Mismatch Channel B Interrupt enabled
0=Interrupt disabled
USBE Unaccepted Symbol Channel B Interrupt Enable
1=Unaccepted Symbol Channel B Interrupt enabled
0=Interrupt disabled WSTE Wakeup Status Interrupt Enable
1=Wakeup Status Interrupt enabled
0=Interrupt disabled
CASE Collision Avoidance Symbol Interrupt Enable
1=Collision Avoidance Symbol Interrupt enabled
0=Interrupt disabled
CYCSE Cycle Start Interrupt Enable
1=Cycle Start Interrupt enabled
0=Interrupt disabled
TXIE Transmit Interrupt Enable
1=Transmit Interrupt enabled
0=Interrupt disabled
RXIE Receive Interrupt Enable
1=Receive Interrupt enabled
0=Interrupt disabled
RFNEE Receive FIFO Not Empty Interrupt Enable
1=Receive FIFO Not Empty Interrupt enabled
0=Interrupt disabled
RFOE Receive FIFO Overrun Interrupt Enable
1=Receive FIFO Overrun Interrupt enabled
0=Interrupt disabled
NMVCE Network Management Vector Changed Interrupt Enable
1=Network Management Vector Changed Interrupt enabled
0=Interrupt disabled
TI0E Timer Interrupt 0 Enable
1=Timer Interrupt 0 enabled
0=Interrupt disabled TI1E Timer Interrupt 1 Enable
1=Timer Interrupt 1 enabled
0=Interrupt disabled
TIBCE Transfer Input Buffer Completed Interrupt Enable
1=Transfer Input Buffer Completed Interrupt enabled
0=Interrupt disabled
TOBCE Transfer Output Buffer Completed Interrupt Enable
1=Transfer Output Buffer Completed Interrupt enabled
0=Interrupt disabled
SWEE Stop Watch Event Interrupt Enable
1=Stop Watch Event Interrupt enabled
0=Interrupt disabled

4.4.8 Timer 0 Configuration (TOC)

Absolute timer. Specifies in terms of cycle count and macrotick the point in time when the timer 0 interrupt occurs. When the timer 0 interrupt is asserted output signal eray_tint0 is set to '1' for the duration of one macrotick.

Timer 0 can be activated as long as the POC is either in NORMAL_ACTIVE state or in NORMAL_PASSIVE state. Timer 0 is deactivated when leaving NORMAL_ACTIVE state or NORMAL_PASSIVE state except for transitions between the two states.

Before reconfiguration of the timer, the timer has to be halted first by writing bit T0RC to '0'.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| TOC 0x0044 R/W | 0 | 0 | T0MO 13 | T0MO 12 | T0MO 11 | T0MO 10 | T0MO 9 | T0MO 8 | T0MO 7 | T0MO 6 | T0MO 5 | T0MO 4 | T0MO 3 | T0MO 2 | T0MO 1 | T0MO 0 |
| Reset | 0 | 0 | 0 | 0 | 0 | 0 | 0 | 0 | 0 | 0 | 0 | 0 | 0 | 0 | 0 | 0 |
| Bit | 15 | 14 | 13 | 12 | 11 | 10 | 9 | 8 | 7 | 6 | 5 | 4 | 3 | 2 | 1 | 0 |
| R/W | 0 | T0CC6 | T0CC5 | T0CC4 | T0CC3 | T0CC2 | T0CC1 | T0CC0 | 0 | 0 | 0 | 0 | 0 | 0 | T0MS | T0RC |
| Reset | 0 | 0 | 0 | 0 | 0 | 0 | 0 | 0 | 0 | 0 | 0 | 0 | 0 | 0 | 0 | 0 |

WUSAE Wakeup Symbol Channel A Interrupt Enable
1=Wakeup Symbol Channel A Interrupt enabled
0=Interrupt disabled
MTSAE MTS Received on Channel A Interrupt Enable
1=MTS Received on Channel A Interrupt enabled
0=Interrupt disabled
WUSAE Wakeup Symbol Channel B Interrupt Enable
1=Wakeup Symbol Channel B Interrupt enabled
0=Interrupt disabled
MTSBE MTS Received on Channel B Interrupt Enable
1=MTS Received on Channel B Interrupt enabled
0=Interrupt disabled

4.4.7 Interrupt Line Enable (ILE)

Each of the two interrupt lines to the Host CPU (eray_int0, eray_int1) can be enable/disabled separately by programming bit EINT0 and EINT1.

T0RC Timer 0 Run Control
1=Timer 0 running
0=Timer 0 halted
T0MS Timer 0 Mode Select
1=Continuous mode
0=Single-shot mode
TOCC[6:0] Timer 0 Cycle Code
The 7-bit timer 0 cycle code determines the cycle set used for generation of the timer 0 interrupt. For details about the configuration of the cycle code see 5.7.4 Cycle Counter Filtering.
T0MO[13:0] Timer 0 Macrotick Offset
Configures the macrotick offset from the beginning of the cycle where the interrupt is to occur. The Timer 0 Interrupt occurs at this offset for each cycle in the cycle set.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| ILE 0x0040 R/W | 0 | 0 | 0 | 0 | 0 | 0 | 0 | 0 | 0 | 0 | 0 | 0 | 0 | 0 | 0 | 0 |
| Reset | 0 | 0 | 0 | 0 | 0 | 0 | 0 | 0 | 0 | 0 | 0 | 0 | 0 | 0 | 0 | 0 |
| Bit | 15 | 14 | 13 | 12 | 11 | 10 | 9 | 8 | 7 | 6 | 5 | 4 | 3 | 2 | 1 | 0 |
| R/W | 0 | 0 | 0 | 0 | 0 | 0 | 0 | 0 | 0 | 0 | 0 | 0 | 0 | 0 | EINT1 | EINT0 |
| Reset | 0 | 0 | 0 | 0 | 0 | 0 | 0 | 0 | 0 | 0 | 0 | 0 | 0 | 0 | 0 | 0 |

EINT0 Enable Interrupt Line 0
1=Interrupt line eray_int0 enabled
0=Interrupt line eray_int0 disabled
EINT1 Enable Interrupt Line 1
1=Interrupt line eray_int1 enabled
0=Interrupt line eray_int1 disabled

4.4.9 Timer 1 Configuration (TIC)

Relative timer. After the specified number of macroticks has expired, the timer 1 interrupt is asserted by setting output signal eray_tint1 to '1' for the duration of one macrotick.

Timer 1 can be activated as long as the POC is either in NORMAL_ACTIVE state or in NORMAL_PASSIVE state. Timer 1 is deactivated when leaving NORMAL_ACTIVE state or NORMAL_PASSIVE state except for transitions between the two states.

Before reconfiguration of the timer, the timer has to be halted first by writing bit T1RC to '0'.

EDGE Stop Watch Trigger Edge Select
1=Rising edge
0=Falling edge
SWT Software Trigger
When the Host writes this bit to '1' a stop watch event is generated. To generate the next stop watch event, the

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| T1C 0x0048 R | 0 | 0 | T1MC 13 | T1MC 12 | T1MC 11 | T1MC 10 | T1MC 9 | T1MC 8 | T1MC 7 | T1MC 6 | T1MC 5 | T1MC 4 | T1MC 3 | T1MC 2 | T1MC 1 | T1MC 0 |
| W | | | | | | | | | | | | | | | | |
| Reset | 0 | 0 | 0 | 0 | 0 | 0 | 0 | 0 | 0 | 0 | 0 | 0 | 0 | 0 | 1 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | 0 | 0 | 0 | 0 | 0 | 0 | 0 | 0 | 0 | 0 | 0 | 0 | 0 | 0 | T1MS | T1RC |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

T1RC Timer 1 Run Control
1=Timer 1 running
0=Timer 1 halted
T1MS Timer 1 Mode Select
1=Continuous mode
0=Single-shot mode
T1MC[13:0] Timer 1 Macrotick Count
When the configured macrotick count is reached the timer 1 interrupt is generated.
Valid values are 2 to 16,383 MT.

4.4.10 Stop Watch Register (STPW)

A stop watch event can be generated by a rising or falling edge on pin eray_stpwt or by the Host by writing bit SWT to '1'. At a stop watch event the actual cycle counter and macrotick value are stored in the Stop Watch register and can be read out by the Host.

Host has to write the bit to '1' again. The bit is only writeable while ESW='0'
1=Stop watch event generated
0=no stop watch event generated
SCCV[5:0] Stopped Cycle Counter Value
State of the cycle counter when the stop watch event occurred. Valid values are 0 to 63.
SMTV[13:0] Stopped Macrotick Value
State of the macrotick counter when the stop watch event occurred. Valid values are 0 to 16,000.

Note: Bits ESW and SWT cannot be set to '1' simultaneously. In this case the write access is ignored, and both bits keep their previous values.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| STPW 0x004C R | 0 | 0 | SMTV 13 | SMTV 12 | SMTV 11 | SMTV 10 | SMTV 9 | SMTV 8 | SMTV 7 | SMTV 6 | SMTV 5 | SMTV 4 | SMTV 3 | SMTV 2 | SMTV 1 | SMTV 0 |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | 0 | 0 | SCCV5 | SCCV4 | SCCV3 | SCCV2 | SCCV1 | SCCV0 | 0 | 0 | 0 | 0 | SWT | EDGE | SWMS | ESW |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

ESW Enable Stop Watch
In single-shot mode this bit is reset after the stop watch event occurred.
1=Stop watch enabled
0=Stop watch disabled
SWMS Stop Watch Mode Select
1=Continuous mode
0=Single-shot mode

4.5 CC Control Registers

This section enumerates the registers supplied by the CC to allow the Host to control the operation of the CC. Most of the configuration data cannot be changed by the Host when the CC is not in CONFIG state. The configuration data is reset when CONFIG state is entered from hardware reset or when CONFIG state is entered from HALT state. If the Host wants the CC to leave CONFIG state, the Host has to proceed as described in section 4.3.3 Lock Register (LCK).

All bits marked with an asterisk * can be updated in CONFIG state only!

4.5.1 SUC Configuration Register 1 (SUCC1)

| Bit | | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|---|
| SUCC1 | R | 0 | 0 | 0 | CCHB* | CCHA* | MTSB* | MTSA* | CF* | HCSE* | TSM* | WUCS* | PTA4* | PTA3* | PTA2* | PTA1* | PTA0* |
| 0x0080 | W | | | | | | | | | | | | | | | | |
| Reset | | 0 | 0 | 0 | 0 | 0 | 0 | 0 | 0 | 0 | 0 | 0 | 0 | 0 | 0 | 0 | 0 |
| Bit | | 15 | 14 | 13 | 12 | 11 | 10 | 9 | 8 | 7 | 6 | 5 | 4 | 3 | 2 | 1 | 0 |
| | R | CSA4* | CSA3* | CSA2* | CSA1* | CSA0* | CSI* | TXSY* | TXST* | 0 | 0 | 0 | 0 | CMD3 | CMD2 | CMD1 | CMD0 |
| | W | | | | | | | | | | | | | | | | |
| Reset | | 0 | 0 | 0 | 0 | 0 | 0 | 0 | 0 | 0 | 0 | 0 | 0 | 0 | 0 | 0 | 0 |

CMD[3:0] CHI Command Vector
The Host may write any CHI command at any time, but certain commands are enabled only in certain states. If a command is not enabled, it will not be executed and the CHI command vector CMD[3:0] will be reset to "0000"=command_not_valid. The reserved CHI commands belong to the hardware test functions and are not enabled in normal mode.
0000=command_not_valid
0001=CONFIG.
0010=READY
0011=WAKEUP
0100=RUN
0101=ALL_SLOTS
0110=HALT
0111=FREEZE
1000=SEND_MTS
1001=ALLOW_COLDSTART
1010=RESET_STATUS_INDICATORS
1101 I=MONITOR_MODE
1100=reserved
1101=reserved
1110=reserved
1111=reserved
The CHI commands will trigger the following actions:
command_not_valid
  No function in any state. When CMD[3:0] is reset to "0000" due to an illegal command, bit CNV in the Error Interrupt register is set, and if enabled an interrupt is generated.
CONFIG
  Goto state CONFIG when called in states MONITOR or READY. When called in HALT state the command has to be preceded by command RESET_STATUS_INDICATORS to reset status flag DCREQ located in the CC Status and Error Vector register, otherwise state CMD[3:0] will be reset to "0000"=command_not_valid. When called in any other state CMD[3:0] will be reset to "0000"=command_not_valid.
READY
  Goto state READY when called in states CONFIG, NORMAL_ACTIVE, NORMAL_PASSIVE, STARTUP, or WAKEUP. When called in any other state CMD[3:0] will be reset to "0000"=command_not_valid.
WAKEUP
  Goto state WAKEUP when called in state READY. If bit SWU is set to '1' the CC transits to WAKEUP_SEND state and sends the wakeup pattern. When called in any other state CMD[3:0] will be reset to "0000"=command_not_valid.
RUN
  Goto state STARTUP when called in state READY. When called in any other state CMD[3:0] will be reset to "0000"=command_not_valid.
ALL_SLOTS
  Leave single slot mode after successful startup/integration at the next end_of_cycle when called in state NORMAL_ACTIVE or NORMAL_PASSIVE. When called in any other state CMD[3:0] will be reset to "0000"=command_not_valid.
HALT
  Goto state HALT at the next end_of cycle when called in state NORMAL_ACTIVE or NORMAL_PASSIVE. When called in any other state CMD[3:0] will be reset to "0000"=command_not_valid.
FREEZE
  Goto state HALT and set the Freeze Status Indicator FSI bit in the CC Status and Error Vector register.
SEND_MTS
  Send single MTS symbol during the symbol window of the following cycle on the channel configured by MTSA, MTSB.
ALLOW_COLDSTART
  Reset CSI bit to enable coldstart of the node.
RESET_STATUS_INDICATORS
  Reset status flags CSNI, CSAI, SMRI, and DCREQ located in the CC Status and Error Vector Register.
MONITOR_MODE
  Goto state MONITOR_MODE when called in state CONFIG. In this state the CC is able to receive FlexRay frames and CAS/MTS symbols. It is also able to detect coding errors. The temporal integrity of received frames is not checked. This state can be used for debugging purposes in case that the Startup of a FlexRay network fails. When called in any other state CMD[3:0] will be reset to "0000"=command_not_valid.
Note:
  In MONITOR_MODE state the pick first valid mechanism is disabled. This means that a receive message buffer may only be configured to receive on one channel.
  When applying a state change command while the CC is already in the requested state, this will not reset CMD[3:0] to "command_not_valid".
TXST Transmit Startup Frame in Key Slot (pKeySlotUsedForStartup)
  Defines whether the key slot is used to transmit a Startup frame.
  1=Key slot used to transmit Startup frame
  0=No Startup frame transmitted in key slot TXSY Transmit Sync Frame in Key Slot (pKeySlotUsed-ForSync)
  Defines whether the key slot is used to transmit a Sync frame.
  1=Key slot used to transmit Sync frame
  0=No Sync frame transmitted in key slot
CSI Cold Start Inhibit (vColdStartInhibit)
  The bit disables a Coldstart node from initiating the coldstart. Bit CSI can only be set in CONFIG state. CSI can be reset by writing "1001" to CMD[3:0] at any time.
  1=Cold starting of node disabled
  0=Cold starting of node enabled
CSA[4:0] Cold Start Attempts (gColdStartAttempts)
  Configures the maximum number of attempts that a cold starting node is permitted to try to start up the network without receiving any valid response from another node. It can be modified in CONFIG state only. Must be identical in all nodes of a cluster. Valid values are 2 to 31.
PTA[4:0] Passive to Active (pAllowpassiveToActive)
  Defines the number of consecutive even/odd cycle pairs that must have valid clock correction terms before the CC is allowed to transit from NORMAL_PASSIVE to NORMAL_ACTIVE state. If set to "00000" the CC is not allowed to transit from NORMAL_PASSIVE to NORMAL_ACTIVE state. It can be modified in CONFIG state only. Valid values are 0 to 31 even/odd cycle pairs.
WUCS Wakeup Channel Select (pWakeupChannel)
  With this bit the Host selects the channel on which the CC sends the Wakeup pattern. The CC ignores any attempt to change the status of this bit when not in CONFIG state.
  1=Send wakeup pattern on channel B
  0=Send wakeup pattern on channel A 1=CC will enter HALT state
  0=CC will enter/remain in NORMAL_PASSIVE
CF Cycle Filtering
  When this bit is set by the Host, the CC applies the configured cycle counter filtering for all Transmit, Receive, and FIFO buffers. The CC ignores any attempt to change the status of this bit when not in CONFIG state. It should be configured identically in all nodes of a cluster.
  1=Cycle counter filtering enabled
  0=Cycle counter filtering disabled
MTSA Select Channel A for MTS Transmission
  The bit selects channel A for MTS symbol transmission if requested by writing "1010" to CMD[3:0]. The flag is reset by default and may be modified only in CONFIG state.
  1=Channel A selected for MTS transmission
  0=Channel A not selected for MTS transmission
MTSB Select Channel B for MTS Transmission
  The bit selects channel B for MTS symbol transmission if requested by writing "1010" to CMD[3:0]. The flag is reset by default and may be modified only in CONFIG state.
  1=Channel B selected for MTS transmission
  0=Channel B not selected for MTS transmission
CCHA Connected to Channel A (pChannels)
  Configures whether the node is connected to channel A.
  1=Node connected to channel A
  0=Not connected to channel A
CCHB Connected to Channel B (pChannels)
  Configures whether the node is connected to channel B.
  1=Node connected to channel B
  0=Not connected to channel B 4.5.2 SUC Configuration Register 2 (SUCC2)
The CC accepts modifications of the register in CONFIG state only.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| SUCC2 0x0084 R/W | 0 | 0 | 0 | 0 | LTN3* | LTN2* | LTN1* | LTN0* | 0 | 0 | 0 | LT20* | LT19* | LT18* | LT17* | LT16* |
| Reset | 0 | 0 | 0 | 0 | 0 | 0 | 0 | 1 | 0 | 0 | 0 | 0 | 0 | 0 | 0 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R/W | LT15* | LT14* | LT13* | LT12* | LT11* | LT10* | LT9* | LT8* | LT7* | LT6* | LT5* | LT4* | LT3* | LT2* | LT1* | LT0* |
| Reset | 0 | 0 | 0 | 0 | 0 | 1 | 0 | 1 | 1 | 0 | 1 | 0 | 0 | 1 | 0 | 0 |

TSM Transmission Slot Mode (pSingleSlotEnabled)
  The selected transmission slot mode is entered after completion of Startup. In SINGLE slot mode the CC may only transmit in the pre-configured key slot. This slot is defined by the Sync Frame ID SFID[10:0] located in the MHD Configuration Register 2. In ALL slot mode the CC may transmit in all slots. The bit can be set in CONFIG state only. The bit is reset when the Host successfully applied the ALL_SLOTS command by writing CMD[3:0]="0101".
  1=SINGLE Slot Mode
  0=ALL Slot Mode
HCSE Halt due to Clock Sync Error (pAllowHaltDueToClock)
  Controls reaction of the CC to a clock synchronization error. The bit can be modified in CONFIG state only.

LT[20:0] Listen Timeout (pdListenTimeout)
  Configures the upper limit of the startup and wakeup listen timeout. Valid values are 1444 to 1,283,846 µT.
LTN[3:0] Listen Timeout Noise (gListenNoise)
  Configures the upper limit for the startup and wakeup listen timeout in the presence of noise expressed as a multiple of the cluster constant pdListenTimeout. The interpretation of this value by the hardware is such that one more than the value programmed here is used. Must be identical in all nodes of a cluster. Valid values are 2 to 16.

4.5.3 PRT Configuration Register 1 (PRTC1)
The CC accepts modifications of the register in CONFIG state only.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| PRTC1 R | RWP5* | RWP4* | RWP3* | RWP2* | RWP1* | RWP0* | 0 | RXW8* | RXW7* | RXW6* | RXW5* | RXW4* | RXW3* | RXW2* | RXW1* | RXW0* |
| 0x0088 W | | | | | | | | | | | | | | | | |
| Reset | 0 | 0 | 0 | 0 | 1 | 0 | 0 | 0 | 0 | 1 | 0 | 0 | 1 | 1 | 0 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | BPR1* | BRP0* | 0 | 0 | 0 | 0 | 0 | 0 | 0 | 0 | 0 | 0 | TSST3* | TSST2* | TSST1* | TSST0* |
| W | | | | | | | | | | | | | | | | |
| Reset | 0 | 0 | 0 | 0 | 0 | 0 | 0 | 0 | 0 | 0 | 0 | 0 | 0 | 1 | 0 | 1 |

TSST[3:0] Transmission Start Sequence Transmitter (gdTSSTransmitter)
 Configures the duration of the Transmission Start Sequence (TSS) in terms of bit times (1 bit time=4 μT=100 ns @ 10 Mbps). Must be identical in all nodes of a cluster. Valid values are 5 to 15 bit times.

BRP[1:0] Baud Rate Prescaler (gdSampleClockPeriod, pSamplePerMicrotick)
 The Baud Rate Prescaler configures the baud rate on the FlexRay bus. The baud rates listed below are valid with a sample clock eray_sclk=80 MHz.
 00=10 MBit/s
 01=5 MBit/s
 10=2.5 MBit/s
 11=1.25 MBit/s RXW[8:0] Wakeup Symbol Receive Window Length (gdWakeupSymbolRxWindow)
 Configures the window length within which the symbol has to be received in multiples of bit times for the receiver to recognize the symbol as a wakeup. Must be identical in all nodes of a cluster. Valid values are 76 to 301 bit times.

RWP[5:0] Repetitions of Tx Wakeup Pattern (pWakeupPattern)
 Configures the number of repetitions (sequences) of the Tx wakeup symbol. The interpretation of this value by the hardware is such that one more than the value programmed here is used. Valid values are 2 to 63.

4.5.4 PRT Configuration Register 2 (PRTC2)
 The CC accepts modifications of the register in CONFIG state only.

RXI[5:0] Wakeup Symbol Receive Idle (gdWakeupSymbolRxIdle)
 Configures the RXLnimum duration of the idle/recessive high level in multiples of bit times for the receiver to recognize the symbol as a wakeup. Must be identical in all nodes of a cluster. Valid values are 14 to 59 bit times.

RXL[5:0] Wakeup Symbol Receive Low (gdWakeupSymbolRxLow)
 Configures the minimum duration of the active low level in multiples of bit times for the receiver to recognize the symbol as a wakeup. Must be identical in all nodes of a cluster. Valid values are 14 to 59 bit times.

TXI[7:0] Wakeup Symbol Transmit Idle (gdWakeupSymbolTxIdle)
 Configures the duration of the idle/high level of the wakeup symbol in multiples of bit times. Must be identical in all nodes of a cluster. Valid values are 45 to 180 bit times.

TXL[5:0] Wakeup Symbol Transmit Low (QdWakeupSymbolTxLow)
 Configures the duration of the active low level of the wakeup symbol in multiples of bit times. Must be identical in all nodes of a cluster. Valid values are 15 to 60 bit times.

4.5.5 MHD Configuration Register 1 (MHDC1)
 The CC accepts modifications of the register in CONFIG state only.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| PRTC2 R | 0 | 0 | TXL5* | TXL4* | TXL3* | TXL2* | TXL1* | TXL0* | TX17* | TX16* | TX15* | TX14* | TX13* | TX12* | TX11* | TX10* |
| 0x008C W | | | | | | | | | | | | | | | | |
| Reset | 0 | 0 | 0 | 0 | 1 | 1 | 1 | 1 | 0 | 0 | 1 | 0 | 1 | 1 | 0 | 1 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | 0 | 0 | RXL5* | RXL4* | RXL3* | RXL2* | RXL1* | RXL0* | 0 | 0 | RX15* | RX14* | RX13* | RX12* | RX11* | RX10* |
| W | | | | | | | | | | | | | | | | |
| Reset | 0 | 0 | 0 | 0 | 1 | 1 | 1 | 0 | 0 | 0 | 0 | 0 | 1 | 1 | 1 | 0 |

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| MHDC1 R | 0 | 0 | 0 | SLT12* | SLT11* | SLT10* | SLT9* | SLT8* | SLT7* | SLT6* | SLT5* | SLT4* | SLT3* | SLT2* | SLT1* | SLT0* |
| 0x0090 W | | | | | | | | | | | | | | | | |
| Reset | 0 | 0 | 0 | 0 | 0 | 0 | 0 | 0 | 0 | 0 | 0 | 0 | 0 | 0 | 0 | 1 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | 0 | 0 | 0 | 0 | 0 | 0 | 0 | 0 | 0 | SFDL6* | SFDL5* | SFDL4* | SFDL3* | SFDL2* | SFDL1* | SFDL0* |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

SFDL[6:0] Static Frame Data Length (gPayloadLengthStatic)
Configures the (fixed) frame length for all frames sent in the Static Segment in double bytes. The frame length must be identical in all nodes of a cluster. Valid values are 0 to 127.

SLT[12:0] Start of Latest Transmit (pLatestTx)
Configures the maximum minislot value allowed before inhibiting new frame transmissions in the Dynamic Segment of the cycle. Valid values are 1 to 7992 minislots.

4.5.6 MHD Configuration Register 2 (MHDC2)
The CC accepts modifications of the register in CONFIG state only.

WCP[3:0] Maximum Without Clock Correction Passive (gMaxWithoutClockCorrectionPassive)
Defines the number of consecutive even/odd cycle pairs with missing clock correction terms that will cause a transition from NORMAL_ACTIVE to NORMAL_PASSIVE state. Must be identical in all nodes of a cluster. Valid values are 1 to 15 cycle pairs.

WCF [3:0] Maximum Without Clock Correction Fatal (gMaxWithoutClockCorrectionFatal)
Defines the number of consecutive even/odd cycle pairs with missing clock correction terms that will cause a transition from NORMAL_ACTIVE or NORMAL_

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| MHDC2 R | 0 | 0 | 0 | 0 | 0 | 0 | 0 | 0 | 0 | 0 | 0 | 0 | 0 | 0 | 0 | 0 |
| 0x0094 W | | | | | | | | | | | | | | | | |
| Reset | 0 | 0 | 0 | 0 | 0 | 0 | 0 | 0 | 0 | 0 | 0 | 0 | 0 | 0 | 0 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | 0 | 0 | 0 | 0 | 0 | 0 | SFID9* | SFID8* | SFID7* | SFID6* | SFID5* | SFID4* | SFID3* | SFID2* | SFID1* | SFID0* |
| W | | | | | | | | | | | | | | | | |
| Reset | 0 | 0 | 0 | 0 | 0 | 0 | 0 | 0 | 0 | 0 | 0 | 0 | 0 | 0 | 0 | 1 |

SFID[9:0] Sync Frame ID (pKeySlotID)
Holds the slot ID used to transmit the Startup frame, the Sync frame, or the designated single slot frame. Valid values are 1 to 1023.

4.5.7 NEM Configuration Register (NEMC)
The CC accepts modifications of the register in CONFIG state only.

PASSIVE to HALT state. Must be identical in all nodes of a cluster. Valid values are 1 to 15 cycle pairs.

NML[3:0] Network Management Vector Length (gNetworkManagementVectorLength)
These bits configure the length of the NM vector. The configured length must be identical in all nodes of a cluster. Valid values are 0 to 12 bytes.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| NEMC R | 0 | 0 | 0 | 0 | 0 | 0 | DSE* | BGD* | 0 | 0 | BGT5* | BGT4* | BGT3* | BGT2* | BGT1* | BGT0* |
| 0x0098 W | | | | | | | | | | | | | | | | |
| Reset | 0 | 0 | 0 | 0 | 0 | 0 | 0 | 0 | 0 | 0 | 0 | 0 | 0 | 0 | 0 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | 0 | 0 | 0 | 0 | NML3* | NML2* | NML1* | NML0* | WCF3* | WCF2* | WCF1* | WCF0* | WCP3* | WCP2* | WCP1* | WCP0* |
| W | | | | | | | | | | | | | | | | |
| Reset | 0 | 0 | 0 | 0 | 0 | 0 | 0 | 0 | 0 | 0 | 0 | 1 | 0 | 0 | 0 | 1 |

BGT[5:0] Bus Guardian Tick
Configures the length of the Bus Guardian Tick (BGT) to be provided by the CC to the Bus Guardian in multiples of the CC microticks. Valid values are 10 to 63 µT.
BGD Bus Guardian Disabled
Indicates that no Bus Guardian is available, or that the Bus Guardian is disabled. In this case input signals eray_bge1,2 are never raised.
1=BG disabled
0=BG enabled
DSE Dynamic Segment Enable (pDynamicSegmentEnable)
Indicates to the BG Schedule Monitoring Service that the node may transmit during the dynamic segment.
1=BG Schedule Monitoring mode in dynamic segment is RELAXED
0=BG Schedule Monitoring mode in dynamic segment is DISABLED

4.5.8 GTU Configuration Register 1 (GTUC1)

The CC accepts modifications of the register in CONFIG state only.

MPC[13:0] Macrotick Per Cycle (gMacroPerCycle)
Configures the duration of one communication cycle in macroticks. The cycle length must be identical in all nodes of a cluster. Valid values are 12 to 16,000 MT.

SNM[3:0] Sync Node Max (gSyncNodeMax)
Maximum number of frames within a cluster with Sync frame indicator bit set. Must be identical in all nodes of a cluster. Valid values are 2 to 15.

4.5.10 GTU Configuration Register 3 (GTUC3)

The CC accepts modifications of the register in CONFIG state only.

| Bit | | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|---|
| GTUC1 | R | 0 | 0 | 0 | 0 | 0 | 0 | 0 | 0 | 0 | 0 | 0 | 0 | UT19* | UT18* | UT17* | UT16* |
| 0x00A0 | W | | | | | | | | | | | | | | | | |
| Reset | | 0 | 0 | 0 | 0 | 0 | 0 | 0 | 0 | 0 | 0 | 0 | 0 | 0 | 0 | 0 | 0 |

| Bit | | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| | R | UT15* | UT15* | UT15* | UT15* | UT15* | UT15* | UT9* | UT8* | UT7* | UT6* | UT5* | UT4* | UT3* | UT2* | UT1* | UT0* |
| | W | | | | | | | | | | | | | | | | |
| Reset | | 0 | 0 | 0 | 0 | 0 | 0 | 1 | 0 | 1 | 1 | 0 | 1 | 0 | 0 | 0 | 0 |

UTI[9:0] Microtick per Cycle (pMicroPerCycle)
Configures the duration of the cluster cycle in microticks. Valid values are 720 to 640,000 µT.

4.5.9 GTU Configuration Register 2 (GTUC2)

The CC accepts modifications of the register in CONFIG state only.

| Bit | | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|---|
| GTUC2 | R | 0 | 0 | 0 | 0 | 0 | 0 | 0 | 0 | 0 | 0 | 0 | 0 | SNM3* | SNM2* | SNM1* | SNM0* |
| 0x00A4 | W | | | | | | | | | | | | | | | | |
| Reset | | 0 | 0 | 0 | 0 | 0 | 0 | 0 | 0 | 0 | 0 | 0 | 0 | 0 | 0 | 1 | 0 |

| Bit | | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| | R | 0 | 0 | MPC13* | MPC12* | MPC11* | MPC10* | MPC9* | MPC8* | MPC7* | MPC6* | MPC5* | MPC4* | MPC3* | MPC2* | MPC1* | MPC0* |
| | W | | | | | | | | | | | | | | | | |
| Reset | | 0 | 0 | 0 | 0 | 0 | 0 | 0 | 0 | 0 | 0 | 0 | 1 | 1 | 0 | 0 | 0 |

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| GTUC3 R | 0 | 0 | 0 | 0 | 0 | 0 | 0 | 0 | 0 | 0 | MTIO5* | MTIO4* | MTIO3* | MTIO2* | MTIO1* | MTIO0* |
| 0x00A8 W | | | | | | | | | | | | | | | | |
| Reset | 0 | 0 | 0 | 0 | 0 | 0 | 0 | 0 | 0 | 0 | 0 | 0 | 0 | 0 | 0 | 1 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R/W | UIOB7* | UIOB6* | UIOB5* | UIOB4* | UIOB3* | UIOB2* | UIOB1* | UIOB0* | UIOA7* | UIOA6* | UIOA5* | UIOA4* | UIOA3* | UIOA2* | UIOA1* | UIOA0* |
| Reset | 0 | 0 | 0 | 0 | 0 | 0 | 0 | 0 | 0 | 0 | 0 | 0 | 0 | 0 | 0 | 0 |

UIOA[7:0] Microtick Initial Offset (pMicroInitialOffset [A])

Configures the number of microticks which describe the distance between the macrotick boundary described by gMacroInitialOffset and the exact secondary time reference point. The parameter depends on pDelayCompensation[A] and therefore has to be set for each channel independently. Valid values are 0 to 240 µT.

UIOB[7:0] Microtick Initial Offset (pMicroInitialOffset [B])

Configures the number of microticks which describe the distance between the macrotick boundary described by gMacroInitialOffset and the exact secondary time reference point. The parameter depends on pDelayCompensation[B] and therefore has to be set for each channel independently. Valid values are 0 to 240 µT.

MTIO[5:0] Macrotick Initial Offset (gMacroInitialOffset)

Configures the number of macroticks which describe the distance between the static slot boundary and the closed macrotick boundary of the secondary time reference point using the initial configured macrotick length. Must be identical in all nodes of a cluster. Valid values are 1 to 37 MT.

4.5.11 GTU Configuration Register 4 (GTUC4)

The CC accepts modifications of the register in CONFIG state only.

NIT[13:0] Network Idle Time Start (gMacroPerCycle-gd-NIT-1)

Configures the starting point of the Network Idle Time NIT at the end of the communication cycle expressed in terms of macroticks from the beginning of the cycle. Must be identical in all nodes of a cluster. Valid values are 10 to 15,998 MT.

OCS[13:0] Offset Correction Start (gOffsetCorrectionStart-1)

Determines the start of the offset correction within the NIT phase, calculated from start of cycle. Must be identical in all nodes of a cluster. Valid values are 10 to 15,998 MT.

4.5.12 GTU Configuration Register 5 (GTUC5)

The CC accepts modifications of the register in CONFIG state only.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| GTUC4 R | 0 | 0 | OCS13* | OCS12* | OCS11* | OCS10* | OCS9* | OCS8* | OCS7* | OCS6* | OCS5* | OCS4* | OCS3* | OCS2* | OCS1* | OCS0* |
| 0x00AC W | | | | | | | | | | | | | | | | |
| Reset | 0 | 0 | 0 | 0 | 0 | 0 | 0 | 0 | 0 | 0 | 0 | 0 | 1 | 0 | 1 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R/W | 0 | 0 | NIT13* | NIT12* | NIT11* | NIT10* | NIT9* | NIT8* | NIT7* | NIT6* | NIT5* | NIT4* | NIT3* | NIT2* | NIT1* | NIT0* |
| Reset | 0 | 0 | 0 | 0 | 0 | 0 | 0 | 0 | 0 | 0 | 0 | 1 | 0 | 1 | 0 | |

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| GTUC5 R | 0 | 0 | 0 | 0 | 0 | 0 | 0 | 0 | 0 | 0 | 0 | CDD4* | CDD3* | CDD2* | CDD1* | CDD0* |
| 0x00B0 W | | | | | | | | | | | | | | | | |
| Reset | 0 | 0 | 0 | 0 | 0 | 0 | 0 | 0 | 0 | 0 | 0 | 0 | 0 | 0 | 0 | 1 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R / W | DCB7* | DCB6* | DCB5* | DCB4* | DCB3* | DCB2* | DCB1* | DCB0* | DCA7* | DCA6* | DCA5* | DCA4* | DCA3* | DCA2* | DCA1* | DCA0* |
| Reset | 0 | 0 | 0 | 0 | 0 | 0 | 0 | 0 | 0 | 0 | 0 | 0 | 0 | 0 | 0 | 0 |

DCA[7:0] Delay Compensation Channel A (pDelayCompensation[A])
  Configures the average delay compensation value for channel A. Valid values are 0 to 200 μT.
DCB[7:0] Delay Compensation Channel B (pDelayCompensation[B])
  Configures the average delay compensation value for channel B. Valid values are 0 to 200 μT.
CDD[2:0] Cluster Drift Damping (pClusterDriftDamping)
  Configures the cluster drift damping value used in clock synchronization to minimize accumulation of rounding errors. Valid values are 1 to 20 μT.

4.5.13 GTU Configuration Register 6 (GTUC6)

The CC accepts modifications of the register in CONFIG state only.

MOD[10:0] Maximum Oscillator Drift (pdMaxDrift)
  Maximum drift offset between two nodes that operate with unsynchronized clocks over one communication cycle in μT. Valid values are 2 to 1,923 μT.

4.5.14 GTU Configuration Register 7 (GTUC7)

The CC accepts modifications of the register in CONFIG state only.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| GTUC6 R | 0 | 0 | 0 | 0 | 0 | MOD10* | MOD9* | MOD8* | MOD7* | MOD6* | MOD5* | MOD4* | MOD3* | MOD2* | MOD1* | MOD0* |
| 0x00B4 W | | | | | | | | | | | | | | | | |
| Reset | 0 | 0 | 0 | 0 | 0 | 0 | 0 | 0 | 0 | 0 | 0 | 0 | 0 | 0 | 1 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | 0 | 0 | 0 | 0 | 0 | ASR10* | ASR9* | ASR8* | ASR7* | ASR6* | ASR5* | ASR4* | ASR3* | ASR2* | ASR1* | ASR0* |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

ASR[10:0] Accepted Startup Range (pdAcceptedStartupRange)
  Expanded range of measured deviation in case of Startup frames. Valid values are 0 to 1875 μT.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| GTUC7 R | 0 | 0 | 0 | 0 | 0 | 0 | NSS9* | NSS8* | NSS7* | NSS6* | NSS5* | NSS4* | NSS3* | NSS2* | NSS1* | NSS0* |
| 0x00B8 W | | | | | | | | | | | | | | | | |
| Reset | 0 | 0 | 0 | 0 | 0 | 0 | 0 | 0 | 0 | 0 | 0 | 0 | 0 | 0 | 1 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | 0 | 0 | 0 | 0 | 0 | SSL10* | SSL9* | SSL8* | SSL7* | SSL6* | SSL5* | SSL4* | SSL3* | SSL2* | SSL1* | SSL0* |
| W | | | | | | | | | | | | | | | | |
| Reset | 0 | 0 | 0 | 0 | 0 | 0 | 0 | 0 | 0 | 0 | 0 | 0 | 0 | 0 | 1 | 1 |

SSM[10:0] Static Slot Length (gdStaticSlot)
Configures the duration of a static slot in macroticks. The static slot length must be identical in all nodes of a cluster. Valid values are 5 to 2047 MT.
NSS[9:0] Number of Static Slots (gNumberOfStaticSlots)
Configures the number of static slots in a cycle. At least 2 Startup nodes must be configured to startup a FlexRay network. The number of static slots must be identical in all nodes of a cluster. Valid values are 2 to 1,023.

4.5.15 GTU Configuration Register 8 (GTUC8)

The CC accepts modifications of the register in CONFIG state only.

APO[4:0] Action Point Offset (gdActionPointOffset)

Configures the action point offset in macroticks. Must be identical in all nodes of a cluster. Valid values are 1 to 31 MT.

MAPO[4:0] Minislot Action Point Offset (gdMinislotActionPointOffset)

Configures the action point offset in macroticks. Must be identical in all nodes of a cluster. Valid values are 1 to 31 MT.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| GTUC8 R | 0 | 0 | 0 | NMS 12* | NMS 11* | NMS 10* | NMS9* | NMS8* | NMS7* | NMS6* | NMS5* | NMS4* | NMS3* | NMS2* | NMS1* | NMS0* |
| 0x00BC W | | | | | | | | | | | | | | | | |
| Reset | 0 | 0 | 0 | 0 | 0 | 0 | 0 | 0 | 0 | 0 | 0 | 0 | 0 | 0 | 0 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | 0 | 0 | 0 | 0 | 0 | 0 | 0 | 0 | 0 | 0 | MSL5* | MSL4* | MSL3* | MSL2* | MSL1* | MSL0* |
| W | | | | | | | | | | | | | | | | |
| Reset | 0 | 0 | 0 | 0 | 0 | 0 | 0 | 0 | 0 | 0 | 0 | 0 | 0 | 0 | 1 | 0 |

MSL[5:0] Minislot Length (gdMinislot)
Configures the duration of a minislot in macroticks. The minislot length must be identical in all nodes of a cluster. Valid values are 2 to 63 MT.
NMS[12:0] Number of Minislots (gNumberOfMinislots)
Configures the number of minislots in the Dynamic Segment of a cycle. The number of minislots must be identical in all nodes of a cluster. Valid values are 0 to 7,994.

4.5.16 GTU Configuration Register 9 (GTUC9)

The CC accepts modifications of the register in CONFIG state only.

DSI[1:0] Dynamic Slot Idle Phase (gdDynamicSlotIdlePhase)

The duration of the Dynamic Slot Idle Phase has to be greater or equal than the idle detection time. Must be identical in all nodes of a cluster. Valid values are 1 to 3 Minislot.

4.5.17 GTU Configuration Register 10 (GTUC10)

The CC accepts modifications of the register in CONFIG state only.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| GTUC9 R | 0 | 0 | 0 | 0 | 0 | 0 | 0 | 0 | 0 | 0 | 0 | 0 | 0 | 0 | DSI1* | DSI0* |
| 0x00C0 W | | | | | | | | | | | | | | | | |
| Reset | 0 | 0 | 0 | 0 | 0 | 0 | 0 | 0 | 0 | 0 | 0 | 0 | 0 | 0 | 0 | 1 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | 0 | 0 | 0 | MAPO 4* | MAPO 3* | MAPO 2* | MAPO 1* | MAPO 0* | 0 | 0 | 0 | APO4* | APO3* | APO2* | APO1* | APO0* |
| W | | | | | | | | | | | | | | | | |
| Reset | 0 | 0 | 0 | 0 | 0 | 0 | 0 | 1 | 0 | 0 | 0 | 0 | 0 | 0 | 0 | 1 |

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| GTUC10 R | 0 | 0 | 0 | 0 | 0 | MRC10* | MRC9* | MRC8* | MRC7* | MRC6* | MRC5* | MRC4* | MRC3* | MRC2* | MRC1* | MRC0* |
| 0x00C4 W | | | | | | | | | | | | | | | | |
| Reset | 0 | 0 | 0 | 0 | 0 | 0 | 0 | 0 | 0 | 0 | 0 | 0 | 0 | 0 | 1 | 0 |
| Bit | 15 | 14 | 13 | 12 | 11 | 10 | 9 | 8 | 7 | 6 | 5 | 4 | 3 | 2 | 1 | 0 |
| R | 0 | 0 | 0 | MOC12* | MOC11* | MOC10* | MOC9* | MOC8* | MOC7* | MOC6* | MOC5* | MOC4* | MOC3* | MOC2* | MOC1* | MOC0* |
| W | | | | | | | | | | | | | | | | |
| Reset | 0 | 0 | 0 | 0 | 0 | 0 | 0 | 0 | 0 | 0 | 0 | 0 | 0 | 0 | 0 | 1 |

MOC[12:0] Maximum Offset Correction (pOffsetCorrectionOut)
  Holds the maximum permitted offset correction value to be applied during regular clock synchronization algorithm. The CC checks the sum of internal and external offset correction against the maximum offset correction value. Valid values are 1 to 7680 μT.

MRC[10:0] Maximum Rate Correction (pRateCorrectionOut)
  Holds the maximum permitted rate correction value to be applied by the internal clock synchronization algorithm. The CC checks the sum of internal and external rate correction against the maximum rate correction value. Valid values are 2 to 1,923 J.

4.5.18 GTU Configuration Register 11 (GTUC11)

EOC[2:0] External Offset Correction (pExternOffsetCorrection)
  Holds the external clock offset correction value in microticks to be applied by the internal clock synchronization algorithm. The value is subtracted/added from/to the calculated offset correction value. The value is applied during NIT and therefore should be modified only outside NIT. Valid values are 0 to 7 μT.

ERC[2:0] External Rate Correction (pExternRateCorrection)
  Holds the external clock rate correction value in microticks to be applied by the internal clock synchronization algorithm. The value is subtracted/added from/to the calculated rate correction value. The value is applied during NIT and therefore should be modified only outside NIT. Valid values are 0 to 7 μT.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| GTUC11 R | 0 | 0 | 0 | 0 | 0 | ERC2* | ERC1* | ERC0* | 0 | 0 | 0 | 0 | 0 | EOC2* | EOC1* | EOC0* |
| 0x00C8 W | | | | | | | | | | | | | | | | |
| Reset | 0 | 0 | 0 | 0 | 0 | 0 | 0 | 0 | 0 | 0 | 0 | 0 | 0 | 0 | 0 | 0 |
| Bit | 15 | 14 | 13 | 12 | 11 | 10 | 9 | 8 | 7 | 6 | 5 | 4 | 3 | 2 | 1 | 0 |
| R | 0 | 0 | 0 | 0 | 0 | | | | | | | | | | ECC1 | ECC0 |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

ECC[1:0] External Clock Correction
  By writing to ECC[1:0] the external offset/rate correction is enabled as specified below.
  00, 01=No external clock correction
  10=External offset/rate correction value subtracted from calculated offset/rate correction value
  11=External offset/rate correction value added to calculated offset/rate correction value 4.6 CC Status Registers During byte-access to status variables coded with more than eight bit, the variable might be updated by the CC between the two accesses.

4.6.1 CC Status and Error Vector (CCSEV)

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| CCSEV R | 0 | 0 | 0 | PTAC4 | PTAC3 | PTAC2 | PTAC1 | PTAC0 | RCA4 | RCA3 | RCA2 | RCA1 | RCA0 | WSV2 | WSV1 | WSV0 |
| 0x0100 W | | | | | | | | | | | | | | | | |
| Reset | 0 | 0 | 0 | 0 | 0 | 0 | 0 | 0 | 0 | 0 | 0 | 0 | 0 | 0 | 0 | 0 |
| Bit | 15 | 14 | 13 | 12 | 11 | 10 | 9 | 8 | 7 | 6 | 5 | 4 | 3 | 2 | 1 | 0 |
| R | DCREQ | SMR1 | CSA1 | CSN1 | ERRM1 | ERRM0 | SLM1 | SLM0 | HRQ | FSI | POCS5 | POCS4 | POCS3 | POCS2 | POCS1 | POCS0 |
| W | | | | | | | | | | | | | | | | |
| Reset | | | | | | | | | | | 0 | 0 | 0 | 0 | 0 | 0 |

POCS[5:0] Protocol Operation Control Status
Indicates the actual state of operation of the CC Protocol Operation Control (vPOC!State)
00 0000=CONFIG state
00 0001=READY state
00 0010=WAKEUP state
00 0011=STARTUP state
00 0100=NORMAL_ACTIVE state
00 0101=NORMAL_PASSIVE state
00 0110=HALT state
00 0111=MONITOR_MODE state
00 1000..00 1111=reserved
Indicates the actual state of operation of the POC in the wakeup path (vPOC!WakeupStatus)
01 0000=WAKEUP STANDBY state
01 0001=WAKEUP_LISTEN state
01 0010=WAKEUP_SEND state
01 001'1=WAKEUP DETECT state
10 0100..10 1111=reserved
Indicates the actual state of operation of the POC in the startup path
10 0000=STARTUP_STANDBY state
10 0001=COLDSTART_LISTEN state
10 0010=COLDSTART_COLLISION_RESOLUTION state
10 0011=COLDSTART_CONSISTENCY_CHECK state
10 0100=COLDSTART GAP state
10 0101=COLDSTART_JOIN State
10 0110=INTEGRATION_COLDSTART_CHECK state
10 0111=INTEGRATION_LISTEN state
10 1000=INTEGRATION_CONSISTENCY_CHECK state
10 1001=INITIALIZE_SCHEDULE state
10 1010..11 1111=reserved
FSI Freeze Status Indicator (vPOC!Freeze)
Indicates that the POC has entered the HALT state due to CHI command FREEZE or due to an error condition requiring an immediate POC halt.
HRQ Halt Request (vPOC!CHIHaltRequest)
Indicates that a request from the Host has been received to halt the POC at the end of the communication cycle. Reset at the end of the cycle when HALT state is reached.
SLM[1:0] Slot Mode (vPOC!SlotMode)
Indicates the actual slot mode of the POC. Default is NOT_SYNCHRONIZED. Changes to SINGLE or ALL after CHI command RUN, depending on configuration bit TSM. In NORMAL_ACTIVE or NORMAL_PASSIVE state the CHI command ALL_SLOTS will change the slot mode from SINGLE over ALL_PENDING to ALL. The CHI commands READY, HALT, and FREEZE will reset the slot mode to NOT_SYNCHRONIZED.
00=NOT_SYNCHRONIZED
01=SINGLE
10=ALL_PENDING
11=ALL
ERRM[1:0] Error Mode (vPOC!ErrorMode)
Indicates the actual error mode of the POC.
00=ACTIVE (green)
01=PASSIVE (yellow)
10=COMM_HALT (red)
11=reserved
CSNI Coldstart Noise Indicator (vColdStartNoise)
Indicates that the cold start procedure occurred under noisy conditions.
Reset under control of the Host by CHI command.
CSAI Coldstart Abort Indicator
Coldstart aborted. Reset under control of the Host by CHI command.
SMRI BG Schedule Monitoring Reset Indicator
Reset under control of the Host by CHI command.
DCREQ Default Config Request
To leave HALT state the Host has to reset the bit by CHI command RESET_STATUS_INDICATORS. The Host has to check and if necessary to restore the configuration. The reinitialization of the configuration has then to be done by the Host in CONFIG state.
WSV[2:0] Wakeup Status (vWakeupStatus)
Indicates the status of the current wakeup attempt.
000=No wakeup attempt
001=RECEIVED_HEADER. This flag is set if the CC finishes wakeup due to the reception of a frame header without coding violation in Wakeup Listen state.
010=RECEIVED_WUS. This flag is set if the CC finishes wakeup due to the reception of a valid Wakeup symbol in Wakeup Listen state.
011=COLLISION_HEADER. This flag is set if the CC stops wakeup due to a detected collision during Wakeup pattern transmission with receiving a valid header.
100=COLLISION_WUS. This flag is set if the CC stops wakeup due to a detected collision during Wakeup pattern transmission with receiving a valid WUS.
101=COLLISION_UNKNOWN. This flag is set if the CC stops wakeup due to a detected collision without succeeding valid reception.
110=TRANSMITTED. This flag is set if the CC has successfully completed the transmission of the Wakeup pattern.
111=reserved
RCA [4:0] Remaining Coldstart Attempts (vRemainingColdstartAttempts)
Indicates the number of remaining coldstart attempts. The maximum number of coldstart attempts is configured by CSA[4:0] in the SUC Configuration Register 1.
PTAC[4:0] Passive to Active Count (vAllowpassiveToActive)
Indicates the number of consecutive even/odd cycle pairs that have passed with valid rate and offset correction terms, while the node is waiting to transit from NORMAL_PASSIVE state to NORMAL_ACTIVE state. The transition takes place when PTAC[4:0] equals PTA [4:0] as defined in the SUC Configuration Register 1.

4.6.2 Slot Counter Value (SCV)

The Macrotick and Cycle Counter Value Register holds the current value of the macrotick counter and the cycle counter. The register is cleared during hard reset and when entering CONFIG state.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| SCV | R | 0 | 0 | 0 | 0 | 0 | SCCA10 | SCCA9 | SCCA8 | SCCA7 | SCCA6 | SCCA5 | SCCA4 | SCCA3 | SCCA2 | SCCA1 | SCCA0 |
| 0x0110 | W | | | | | | | | | | | | | | | | |
| Reset | | 0 | 0 | 0 | 0 | 0 | 0 | 0 | 0 | 0 | 0 | 0 | 0 | 0 | 0 | 1 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | 0 | 0 | 0 | 0 | 0 | SCCB10 | SCCB9 | SCCB8 | SCCB7 | SCCB6 | SCCB5 | SCCB4 | SCCB3 | SCCB2 | SCCB1 | SCCB0 |
| W | | | | | | | | | | | | | | | | |
| Reset | 0 | 0 | 0 | 0 | 0 | 0 | 0 | 0 | 0 | 0 | 0 | 0 | 0 | 0 | 0 | 1 |

SCCA[10:0] Slot Counter Channel A (vSlotCounter[A])
Current slot counter value channel A. The value is incremented by the CC and reset at the start of a communication cycle. Valid values are 1 to 2,047.

SCCB[10:0] Slot Counter Channel B (vSlotCounter[B])
Current slot counter value channel B. The value is incremented by the CC and reset at the start of a communication cycle. Valid values are 1 to 2,047.

4.6.3 Macrotick and Cycle Counter Value (MTCCV)

The Macrotick and Cycle Counter Value Register holds the current value of the macrotick counter and the cycle counter. The register is cleared during hard reset and when entering CONFIG state.

its limit. The CC can only set this flag. The flag is reset when the Host clears flag CCF in the Error Interrupt Register.

MRCS Missing Rate Correction Signal
The Missing Rate Correction Signal signals to the Host, that no rate correction can be performed because no pairs of (even/odd) Sync Frames were received. The flag is reset by the CC after successful rate correction.

MOCS Missing Offset Correction Signal
The Missing Offset Correction Signal signals to the Host, that no offset correction can be performed because no Sync frames were received in an odd cycle. The flag is reset by the CC after successful offset correction.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| MTCCV R | 0 | 0 | 0 | 0 | 0 | 0 | 0 | 0 | 0 | 0 | CCV5 | CCV4 | CCV3 | CCV2 | CCV1 | CCV0 |
| 0x0114 W | | | | | | | | | | | | | | | | |
| Reset | 0 | 0 | 0 | 0 | 0 | 0 | 0 | 0 | 0 | 0 | 0 | 0 | 0 | 0 | 0 | 0 |
| Bit | 15 | 14 | 13 | 12 | 11 | 10 | 9 | 8 | 7 | 6 | 5 | 4 | 3 | 2 | 1 | 0 |
| R | 0 | 0 | MTV13 | MTV12 | MTV11 | MTV10 | MTV9 | MTV8 | MTV7 | MTV6 | MTV5 | MTV4 | MTV3 | MTV2 | MTV1 | MTV0 |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

MTV[13:0] Macrotick Value (vMacrotic)
Current Macrotick value. The value is incremented by the CC and reset at the start of a communication cycle. Valid values are 0 to 16,000.

CCV[5:0] Cycle Counter Value (vCycleCounter)
The value is incremented by the CC at the start of a communication cycle. Valid values are 0 to 63.

4.6.4 Clock Correction Status 1 (CCS1)

CCFC[3:0] Clock Correction Failed Counter (vClockCorrectionFailed)
The Clock Correction Failed Counter is incremented by one at the end of any odd communication cycle where either the Missing Offset Correction error or Missing Rate Correction error are active. The Clock Correction Failed Counter is reset to '0' at the end of an odd communication cycle if neither the Offset Correction Failed

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| CCS1 R | 0 | 0 | 0 | 0 | 0 | 0 | 0 | 0 | 0 | 0 | 0 | 0 | 0 | 0 | 0 | 0 |
| 0x0118 W | | | | | | | | | | | | | | | | |
| Reset | 0 | 0 | 0 | 0 | 0 | 0 | 0 | 0 | 0 | 0 | 0 | 0 | 0 | 0 | 0 | 0 |
| Bit | 15 | 14 | 13 | 12 | 11 | 10 | 9 | 8 | 7 | 6 | 5 | 4 | 3 | 2 | 1 | 0 |
| R | 0 | 0 | 0 | 0 | 0 | 0 | 0 | 0 | CCFC3 | CCFC2 | CCFC1 | CCFC0 | 0 | MOCS | MRCS | CCLR |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

CCLR Clock Correction Limit Reached
The Clock Correction Limit Reached flag signals to the Host, that the offset or rate correction value has reached nor the Rate Correction Failed errors are active. The Clock Correction Failed Counter stops at 15.

4.6.5 Clock Correction Status 2 (CCS2)

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| CCS2 R | 0 | 0 | 0 | 0 | RCV11 | RCV10 | RCV9 | RCV8 | RCV7 | RCV6 | RCV5 | RCV4 | RCV3 | RCV2 | RCV1 | RCV0 |
| 0x011C W | | | | | | | | | | | | | | | | |
| Reset | 0 | 0 | 0 | 0 | 0 | 0 | 0 | 0 | 0 | 0 | 0 | 0 | 0 | 0 | 0 | 0 |

-continued

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | 0 | 0 | OCV13 | OCV12 | OCV11 | OCV10 | OCV9 | OCV8 | OCV7 | OCV6 | OCV5 | OCV4 | OCV3 | OCV2 | OCV1 | OCV0 |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

OCV[13:0] Offset Correction Value (vOffsetCorrection)
  Offset correction value (two's complement) applied by the clock sync in the current cycle (internal+external). Valid values are −7687 to +7687 µT.
RCV[11:0] Rate Correction Value (vRateCorrection)
  Rate correction value (two's complement) applied by the clock sync in the current cycle (internal+external). Valid values are −1,930 to +1,930 µT.

4.6.6 Sync Frame Status (SFS)

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| SFS R | 0 | 0 | 0 | 0 | 0 | 0 | 0 | 0 | 0 | 0 | 0 | 0 | 0 | 0 | 0 | SFO |
| 0x0120 W | | | | | | | | | | | | | | | | |
| Reset | 0 | 0 | 0 | 0 | 0 | 0 | 0 | 0 | 0 | 0 | 0 | 0 | 0 | 0 | 0 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | VSBO3 | VSBO2 | VSBO1 | VSBO0 | VSBE3 | VSBE2 | VSBE1 | VSBE0 | VSAO3 | VSAO2 | VSAO1 | VSAO0 | VSAE3 | VSAE2 | VSAE1 | VSAE0 |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

VSAE[3:0] Valid Sync Frames Channel A, even communication cycle (vSyncFramesEvenA)
  Holds the number of valid Sync frames received and transmitted on channel A in the even communication cycle. The value is reset at the start of each even communication cycle and incremented at the end of each communication slot throughout the even communication cycle. The maximum number of valid Sync frames in a communication cycle is 15.

VSAO[3:0] Valid Sync Frames Channel A, odd communication cycle (vSyncFramesOddA)
  Holds the number of valid Sync frames received and transmitted on channel A in the odd communication cycle. The value is reset at the start of each odd communication cycle and incremented at the end of each communication slot throughout the odd communication cycle. The maximum number of valid Sync frames in a communication cycle is 15.

VSBE[3:0] Valid Sync Frames Channel B, even communication cycle (vSyncFramesEvenB)
  Holds the number of valid Sync frames received and transmitted on channel B in the even communication cycle. The value is reset at the start of each even communication cycle and incremented at the end of each communication slot throughout the even communication cycle. The maximum number of valid Sync frames in a communication cycle is 15.

VSBO[3:0] Valid Sync Frames Channel B, odd communication cycle (vSyncFramesOddB)
  Holds the number of valid Sync frames received and transmitted on channel B in the odd communication cycle. The value is reset at the start of each odd communication cycle and incremented at the end of each communication slot throughout the odd communication cycle. The maximum number of valid Sync frames in a communication cycle is 15.

SFO Sync Frame Overflow
  Set when the number of received Sync frames exceeds the maximum number of Sync frames as defined by SNM[3:0] in the GTU Configuration Register 2. The flag is reset under control of the Host.

4.6.7 Symbol Window and NIT Status (SWNIT)

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| SWNIT R | 0 | 0 | 0 | 0 | 0 | 0 | 0 | 0 | 0 | 0 | 0 | 0 | 0 | 0 | 0 | 0 |
| 0x0124 W | | | | | | | | | | | | | | | | |
| Reset | 0 | 0 | 0 | 0 | 0 | 0 | 0 | 0 | 0 | 0 | 0 | 0 | 0 | 0 | 0 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | 0 | 0 | 0 | 0 | SBNB | SENB | SBNA | SENA | 0 | 0 | TCSB | SBSB | SESB | TCSA | SBSA | SESA |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

Symbol window related status information. Updated by the CC at the end of the symbol window for each channel:

SESA Syntax Error in Symbol Window Channel A (vSS!SyntaxErrorA)
  Syntax error during symbol window detected on channel A.

SBSA Slot Boundary Violation in Symbol Window Channel A (vSS!BViolationA)
  Slot Boundary violation during symbol window detected on channel A:
TCSA Transmission Conflict in Symbol Window Channel A (vSS!TxConflictA)
  Transmission conflict in symbol window detected on channel A.
SESB Syntax Error in Symbol Window Channel B (vSS!SyntaxErrorB)
  Syntax error during symbol window detected on channel B.
SBSB Slot Boundary Violation in Symbol Window Channel B (vSS!BViolationB)
  Slot Boundary violation during symbol window detected on channel B.
TCSB Transmission Conflict in Symbol Window Channel B (vSS!TxConflictB)
  Transmission conflict in symbol window detected on channel B.
NIT related status information. Updated by the CC at the end of the NIT for each channel:
SENA Syntax Error during NIT Channel A (vSS!SyntaxErrorA)
  Syntax error during NIT detected on channel A.
SBNA Slot Boundary Violation during NIT Channel A (vSS!BViolationA)
  Slot Boundary violation during NIT detected on channel A.
SENB Syntax Error during NIT Channel B (vSS!SyntaxErrorB)
  Syntax error during NIT detected on channel B.
SBNB Slot Boundary Violation during NIT Channel B (vSS!BViolationB)
  Slot Boundary violation during NIT detected on channel B.

4.6.8 Aggregated Channel Status (ACS)

The aggregated channel status provides the Host with an accrued status of channel activity for all communication slots regardless of whether they are assigned for transmission or subscribed for reception. The aggregated channel status also includes status data from the symbol phase and the network idle time. The status data is aggregated over a period defined by the Host. The aggregated channel status is reset by the Host.

CEDA Content Error Detected on Channel A (vSS!ContentErrorA)
  One or more frames with a content error were received on channel A in any static or dynamic slot during the observation period.
CIA Communication Indicator Channel A
  One or more valid frames were received on channel A in slots that also contained any additional communication during the observation period, i.e. one or more slots received a valid frame AND had any combination of either syntax error OR content error OR slot boundary violation.
SBVA Slot Boundary Violation on Channel A (vSS!BViolationA)
  One or more slot boundary violations were observed on channel A at any time during the observation period (static or dynamic slots including symbol window and NIT).
VFRB Valid Frame Received on Channel B (vSS!ValidFrameB)
  One or more valid frames were received on channel B in any static or dynamic slot during the observation period. Reset under control of the Host.
SEDB Syntax Error Detected on Channel B (vSS!SyntaxErrorB)
  One or more syntax errors in static or dynamic slots including symbol window and NIT were observed on channel B.
CEDB Content Error Detected on Channel B (vSS!SyntaxErrorB)
  One or more frames with a content error were received on channel B in any static or dynamic slot during the observation period.
CIB Communication Indicator Channel B
  One or more valid frames were received on channel B in slots that also contained any additional communication during the observation period, i.e. one or more slots received a valid frame AND had any combination of either syntax error OR content error OR slot boundary violation.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| ACS R | 0 | 0 | 0 | 0 | 0 | 0 | 0 | 0 | 0 | 0 | 0 | 0 | 0 | 0 | 0 | 0 |
| 0x0128 W | | | | | | | | | | | | | | | | |
| Reset | 0 | 0 | 0 | 0 | 0 | 0 | 0 | 0 | 0 | 0 | 0 | 0 | 0 | 0 | 0 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | 0 | 0 | 0 | SBVB | CIB | CEDB | SEDB | VFRB | 0 | 0 | 0 | SBVA | CIA | CEDA | SEDA | VFRA |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

VFRA Valid Frame Received on Channel A (vSS!ValidFrameA)
  One or more valid frames were received on channel A in any static or dynamic slot during the observation period.
SEDA Syntax Error Detected on Channel A (vSS!SyntaxErrorA)
  One or more syntax errors in static or dynamic slots including symbol window and NIT were observed on channel A.
SBVB Slot Boundary Violation on Channel B (vSS!SyntaxErrorB)
  One or more slot boundary violations were observed on channel B at any time during the observation period (static or dynamic slots including symbol window and NIT).

4.6.9 Even Sync ID [0..15] (ESIDn)
Registers ESID1 to ESID15 hold the frame IDs of the Sync frames received in even communication cycles, assorted in ascending order, with register ESID1 holding the lowest received Sync frame ID. Register ESID0 holds the frame ID of the Sync frame transmitted by the node itself, if it transmits one.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| ESIDn R | 0 | 0 | 0 | 0 | 0 | 0 | 0 | 0 | 0 | 0 | 0 | 0 | 0 | 0 | 0 | 0 |
| 0x0130- 0x016C W | | | | | | | | | | | | | | | | |
| Reset | 0 | 0 | 0 | 0 | 0 | 0 | 0 | 0 | 0 | 0 | 0 | 0 | 0 | 0 | 0 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | RXEB | RXEA | 0 | 0 | 0 | 0 | ESID9 | ESID8 | ESID7 | ESID6 | ESID5 | ESID4 | ESID3 | ESID2 | ESID1 | ESID0 |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

ESID[9:0] Even Sync ID (vsSyncIDListA.B even)
Sync frame ID even communication cycle.
RXEA Received Even Sync ID on Channel A
Indicates that the Sync frame corresponding to the stored even Sync ID was received on channel A.
1=Sync frame received on channel A
0=Sync frame not received on channel A
RXEB Received Even Sync ID on Channel B
Indicates that the Sync frame corresponding to the stored even Sync ID was received on channel B.
1=Sync frame received on channel B
0=Sync frame not received on channel B
4.6.10 Odd Sync ID [0..15] (OSIDn)
Registers OSID1 to OSID15 hold the frame IDs of the Sync frames received in odd communication cycles, assorted in ascending order, with register OSID1 holding the lowest received Sync frame ID. Register OSID0 holds the frame ID of the Sync frame transmitted by the node itself, if it transmits one.

OSID[9:0] OddSync ID (vsSyncIDListA.B odd)
Sync frame ID odd communication cycle.
RXOA Received Odd Sync ID on Channel A
Indicates that the Sync frame corresponding to the stored odd Sync ID was received on channel A.
1=Sync frame received on channel A
0=Sync frame not received on channel A
RXOB Received Odd Sync ID on Channel B
Indicates that the Sync frame corresponding to the stored odd Sync ID was received on channel B.
1=Sync frame received on channel B
0=Sync frame not received on channel B
4.6.11 Even Arrival Channel A,B [0..15] (EAABn)
Registers EAAB1 to EAAB15 hold the Sync frame arrival time for Sync frames received in even communication cycles on channel A and B measured relative to the action point. Register EAAB0 holds the Sync frame transmission time of the Sync frame transmitted by the node itself, if it transmits one.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| OSIDn R | 0 | 0 | 0 | 0 | 0 | 0 | 0 | 0 | 0 | 0 | 0 | 0 | 0 | 0 | 0 | 0 |
| 0x0170- 0x01AC W | | | | | | | | | | | | | | | | |
| Reset | 0 | 0 | 0 | 0 | 0 | 0 | 0 | 0 | 0 | 0 | 0 | 0 | 0 | 0 | 0 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | RXOB | RXOA | 0 | 0 | 0 | 0 | OSID9 | OSID8 | OSID7 | OSID6 | OSID5 | OSID4 | OSID3 | OSID2 | OSID1 | OSID0 |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| EAABn 0x01B0- 0x01EC R/W | 0 | 0 | 0 | 0 | EAB11 | EAB10 | EAB9 | EAB8 | EAB7 | EAB6 | EAB5 | EAB4 | EAB3 | EAB2 | EAB1 | EAB0 |
| Reset | 0 | 0 | 0 | 0 | 0 | 0 | 0 | 0 | 0 | 0 | 0 | 0 | 0 | 0 | 0 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R/W | 0 | 0 | 0 | 0 | EAA11 | EAA10 | EAA9 | EAA8 | EAA7 | EAA6 | EAA5 | EAA4 | EAA3 | EAA2 | EAA1 | EAA0 |
| Reset | 0 | 0 | 0 | 0 | 0 | 0 | 0 | 0 | 0 | 0 | 0 | 0 | 0 | 0 | 0 | 0 |

EAA[11:0] Even Arrival Channel A
Arrival time on channel A, even communication cycle. Valid values are 0 to 2120 μT.

EAB[11:0] Even Arrival Channel B
Arrival time on channel B, even communication cycle. Valid values are 0 to 2120 μT.

4.6.12 Odd Arrival Channel A,B [0..15] (OAABn)
Registers OAAB1 to OAAB15 hold the Sync frame arrival time for Sync frames received in odd communication cycles on channel A and B measured relative to the action point. Register OAAB0 holds the Sync frame transmission time of the Sync frame transmitted by the node itself, if it transmits one.

4.7 Message Buffer Control Registers 4.7.1 Message RAM Configuration (MRC)
The Message RAM Configuration register defines the number of message buffers assigned to the static segment, dynamic segment, and Receive FIFO. In addition the data length for all message buffers belonging to the Receive FIFO is configured here. The register can be written during CONFIG state only.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| OAABn 0x01F0- 0x022C R/W | 0 | 0 | 0 | 0 | OAB11 | OAB10 | OAB9 | OAB8 | OAB7 | OAB6 | OAB5 | OAB4 | OAB3 | OAB2 | OAB1 | OAB0 |
| Reset | 0 | 0 | 0 | 0 | 0 | 0 | 0 | 0 | 0 | 0 | 0 | 0 | 0 | 0 | 0 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R/W | 0 | 0 | 0 | 0 | OAA11 | OAA10 | OAA9 | OAA8 | OAA7 | OAA6 | OAA5 | OAA4 | OAA3 | OAA2 | OAA1 | OAA0 |
| Reset | 0 | 0 | 0 | 0 | 0 | 0 | 0 | 0 | 0 | 0 | 0 | 0 | 0 | 0 | 0 | 0 |

OAA[11:0] Odd Arrival Channel A
Arrival time on channel A, odd communication cycle. Valid values are 0 to 2120 μT.

OAB[11:0] Odd Arrival Channel B
Arrival time on channel B, odd communication cycle. Valid values are 0 to 2120 μT.

4.6.13 Network Management Vector [1..3] (NMVn)
The 3 Network Management Registers hold the accrued NM vector (configurable 0 to 12 bytes). The accrued NM vector is generated by the CC by bit-wise ORing each NM vector received (frames with NM Indication Bit set) on each channel. The CC updates the NM vector at the end of each communication cycle.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| NMVn 0x0230- 0x0238 R/W | NM31 | NM30 | NM29 | NM28 | NM27 | NM26 | NM25 | NM24 | NM23 | NM22 | NM21 | NM20 | NM19 | NM18 | NM17 | NM16 |
| Reset | 0 | 0 | 0 | 0 | 0 | 0 | 0 | 0 | 0 | 0 | 0 | 0 | 0 | 0 | 0 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R/W | NM15 | NM14 | NM13 | NM12 | NM11 | NM10 | NM9 | NM8 | NM7 | NM6 | NM5 | NM4 | NM3 | NM2 | NM1 | NM0 |
| Reset | 0 | 0 | 0 | 0 | 0 | 0 | 0 | 0 | 0 | 0 | 0 | 0 | 0 | 0 | 0 | 0 |

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| MRC R<br>0x0300 W | 0 | DLF6* | DLF5* | DLF4* | DLF3* | DLF2* | DLF1* | DLF0* | 0 | 0 | LCB5* | LCB4* | LCB3* | LCB2* | LCB1* | LCB0* |
| Reset | 0 | 0 | 0 | 0 | 0 | 0 | 0 | 0 | 0 | 0 | 0 | 0 | 0 | 0 | 0 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R<br>W | 0 | FFB6* | FFB5* | FFB4* | FFB3* | FFB2* | FFB1* | FFB0* | 0 | FDB6* | FDB5* | FDB4* | FDB3* | FDB2* | FDB1* | FDB0* |
| Reset | 0 | 0 | 0 | 0 | 0 | 0 | 0 | 0 | 0 | 0 | 0 | 0 | 0 | 0 | 1 | 0 |

FDB[6:0] First Dynamic Buffer
Valid values are 0 to 64.
0=No static buffers configured
>63=No dynamic Buffers configured
FFB[6:0] First FIFO Buffer
Valid values are 0 to 64.
0=No static and dynamic buffers configured
>63=No FIFO Buffers configured
LCB[5:0] Last Configured Buffer
Valid values are 0 to 63.
0=One message buffer configured
63=64 message buffers configured

| | | |
|---|---|---|
| Message Buffer 0 | ↓Static Buffers | |
| Message Buffer 1 | ↓Dynamic Buffers | ⇐FDB |
| ... | ↓FIFO Buffers | ⇐FFB |
| Message Buffer N-1 | | |
| Message Buffer N | | ⇐LCB |

DLF[6:0] Data Length FIFO Buffer
Configures the payload length for all message buffers assigned to the FIFO.
Valid values are 0 to 127.
Note: The maximum number of available message buffers depends on the configured number of data bytes per message buffer (Example: 16 MBs with 254 bytes, 32 MBs with 128 bytes, 64 MBs with 56 bytes or less). The programmer has to ensure that the configuration defined by FDB[6:0], FFB[6:0], and LCB[5:0] is possible. The CC does not check for erroneous configurations!

4.7.2 FIFO Rejection Filter (FRF)

The FIFO Rejection Filter defines a user specified sequence of bits with which channel, frame ID, and cycle count of the incoming message are compared. Together with the FIFO Rejection Filter Mask this register determines whether the message is rejected by the FIFO. The FRF register can be written during CONFIG state only.

CH[1:0]. Channel Filter
11=no reception
10=receive only on channel A
01=receive only on channel B
00=receive on both channels (pick first valid)
FID[10:0] Frame ID Filter
1..2047=possible frame ID values.
CYF[6:0] Cycle Code Filter
The 7-bit cycle code filter determines the cycle set used for rejection filtering. For details about the configuration of the cycle code see 5.7.4 Cycle Counter Filtering.
RSS Reject Static Segment
In time-triggered applications the FIFO Buffer should only be used in dynamic segment.
1=Reject messages in static segment
0=FIFO also used in static segment 4.7.3 FIFO Rejection Filter Mask (FRFM)

The FIFO Rejection Filter Mask specifies which of the corresponding FRF bits are relevant for rejection filtering. If a bit is set, it indicates that the state of the corresponding bit in the FRF register will not affect whether or not the message is rejected by the FIFO. A message will be rejected by the FIFO if all unmasked bits of the FRF registers match. The FRFM register can be written during CONFIG state only.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| FRF1 R<br>0x0304 W | 0 | 0 | 0 | 0 | 0 | 0 | 0 | 0 | RSS* | CYF6* | CYF5* | CYF4* | CYF3* | CYF2* | CYF1* | CYF0* |
| Reset | 1 | 0 | 0 | 0 | 0 | 0 | 0 | 0 | 0 | 0 | 0 | 0 | 0 | 0 | 0 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R<br>W | 0 | 0 | 0 | FID10* | FID9* | FID8* | FID7* | FID6* | FID5* | FID4* | FID3* | FID2* | FID1* | FID0* | CH1* | CH0* |
| Reset | 0 | 0 | 0 | 0 | 0 | 0 | 0 | 0 | 0 | 0 | 0 | 0 | 0 | 0 | 0 | 0 |

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| FRFM R | 0 | 0 | 0 | 0 | 0 | 0 | 0 | 0 | 0 | 0 | 0 | 0 | 0 | 0 | 0 | 0 |
| 0x0308 W | | | | | | | | | | | | | | | | |
| Reset | 0 | 0 | 0 | 0 | 0 | 0 | 0 | 0 | 0 | 0 | 0 | 0 | 0 | 0 | 0 | 0 |
| Bit | 15 | 14 | 13 | 12 | 11 | 10 | 9 | 8 | 7 | 6 | 5 | 4 | 3 | 2 | 1 | 0 |
| R | 0 | 0 | 0 | MFID10* | MFID9* | MFID8* | MFID7* | MFID6* | MFID5* | MFID4* | MFID3* | MFID2* | MFID1* | MFID0* | 0 | 0 |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

MFID[10:0] FIFO Rejection Filter Mask Bits
1=Ignore corresponding FIFO Rejection Filter bit.
0=Match corresponding FIFO Rejection Filter bit.

4.8 Message Buffer Status Registers

4.8.1 Transmission Request Registers 1/2 (TXRQ1/2)

The two registers reflect the state of the TXR flags of all configured message buffers. If the number of configured message buffers is less than 64, the remaining TXR flags have no meaning and are read as '0'.

buffer is in progress. The flags are reset after transmission has completed (single-shot mode only).

4.8.2 New Data Registers 1/2 (NDAT1/2)

The two registers reflect the state of the ND flags of all configured message buffers. If the number of configured message buffers is less than 64, the remaining ND flags have no meaning and are read as '0'.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| TXRQ2 R | TXR63 | TXR62 | TXR61 | TXR60 | TXR59 | TXR58 | TXR57 | TXR56 | TXR55 | TXR54 | TXR53 | TXR52 | TXR51 | TXR50 | TXR49 | TXR48 |
| 0x0314 W | | | | | | | | | | | | | | | | |
| Reset | 0 | 0 | 0 | 0 | 0 | 0 | 0 | 0 | 0 | 0 | 0 | 0 | 0 | 0 | 0 | 0 |
| Bit | 15 | 14 | 13 | 12 | 11 | 10 | 9 | 8 | 7 | 6 | 5 | 4 | 3 | 2 | 1 | 0 |
| R | TXR47 | TXR46 | TXR45 | TXR44 | TXR43 | TXR42 | TXR41 | TXR40 | TXR39 | TXR38 | TXR37 | TXR36 | TXR35 | TXR34 | TXR33 | TXR32 |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |
| Bit | 31 | 30 | 29 | 28 | 27 | 26 | 25 | 24 | 23 | 22 | 21 | 20 | 19 | 18 | 17 | 16 |
| TXRQ1 R | TXR31 | TXR30 | TXR29 | TXR28 | TXR27 | TXR26 | TXR25 | TXR24 | TXR23 | TXR22 | TXR21 | TXR20 | TXR19 | TXR18 | TXR17 | TXR16 |
| 0x0310 W | | | | | | | | | | | | | | | | |
| Reset | 0 | 0 | 0 | 0 | 0 | 0 | 0 | 0 | 0 | 0 | 0 | 0 | 0 | 0 | 0 | 0 |
| Bit | 15 | 14 | 13 | 12 | 11 | 10 | 9 | 8 | 7 | 6 | 5 | 4 | 3 | 2 | 1 | 0 |
| R | TXR15 | TXR14 | TXR13 | TXR12 | TXR11 | TXR10 | TXR9 | TXR8 | TXR7 | TXR6 | TXR5 | TXR4 | TXR3 | TXR2 | TXR1 | TXR0 |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

TXR[63:0] Transmission Request
If the flag is set, the respective message buffer is ready for transmission respectively transmission of this message

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| NDAT2 R | ND63 | ND62 | ND61 | ND60 | ND59 | ND58 | ND57 | ND56 | ND55 | ND54 | ND53 | ND52 | ND51 | ND50 | ND49 | ND48 |
| 0x0324 W | | | | | | | | | | | | | | | | |
| Reset | 0 | 0 | 0 | 0 | 0 | 0 | 0 | 0 | 0 | 0 | 0 | 0 | 0 | 0 | 0 | 0 |
| Bit | 15 | 14 | 13 | 12 | 11 | 10 | 9 | 8 | 7 | 6 | 5 | 4 | 3 | 2 | 1 | 0 |
| R | ND47 | ND46 | ND45 | ND44 | ND43 | ND42 | ND41 | ND40 | ND39 | ND38 | ND37 | ND36 | ND35 | ND34 | ND33 | ND32 |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |
| Bit | 31 | 30 | 29 | 28 | 27 | 26 | 25 | 24 | 23 | 22 | 21 | 20 | 19 | 18 | 17 | 16 |
| NDAT1 R | ND31 | ND30 | ND29 | ND28 | ND27 | ND26 | ND25 | ND24 | ND23 | ND22 | ND21 | ND20 | ND19 | ND18 | ND17 | ND16 |
| 0x0320 W | | | | | | | | | | | | | | | | |
| Reset | 0 | 0 | 0 | 0 | 0 | 0 | 0 | 0 | 0 | 0 | 0 | 0 | 0 | 0 | 0 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | ND15 | ND14 | ND13 | ND12 | ND11 | ND10 | ND9 | ND8 | ND7 | ND6 | ND5 | ND4 | ND3 | ND2 | ND1 | ND0 |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

NDE[63:0] New Data

The flags are set when the Message Handler stores a valid received message into the respective message buffer. The flags are reset when the message buffer has been transferred to the Output Buffer.

4.8.3 Message Handler Status (MHDS)

The Message Handler Status register gives the Host CPU access to the actual state of the Message Handler.

MBT[5:0] Message Buffer Transmitted

Number of last successfully transmitted message buffer. If the message buffer is configured for single-shot mode, the respective TXR flag in the Transmission Request Register 1/2 was reset.

MBU[5:0] Message Buffer Updated

Number of message buffer that stored the last received and accepted message. For this message buffer the

| | Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|---|
| MHDS | R | 0 | 0 | MBU5 | MBU4 | MBU3 | MBU2 | MBU1 | MBU0 | 0 | 0 | MBT5 | MBT4 | MBT3 | MBT2 | MBT1 | MBT0 |
| 0x0330 | W | | | | | | | | | | | | | | | | |
| Reset | | 0 | 0 | 0 | 0 | 0 | 0 | 0 | 0 | 0 | 0 | 0 | 0 | 0 | 0 | 0 | 0 |
| | Bit | 15 | 14 | 13 | 12 | 11 | 10 | 9 | 8 | 7 | 6 | 5 | 4 | 3 | 2 | 1 | 0 |
| | R | 0 | 0 | FMB5 | FMB4 | FMB3 | FMB2 | FMB1 | FMB0 | 0 | 0 | 0 | PTBF2 | PTBF1 | PMR | POBF | PIBF |
| | W | | | | | | | | | | | | | | | | |
| Reset | | 0 | 0 | 0 | 0 | 0 | 0 | 0 | 0 | 0 | 0 | 0 | 0 | 0 | 0 | 0 | 0 |

The following flags have to be explicitly reset by the Host CPU:

PIBF Parity Error Input Buffer RAM 1,2
Parity error occurred when Message Handler read Input Buffer RAM 1,2
POBF Parity Error Output Buffer RAM 1,2
Parity error occurred when CPU read Output Buffer RAM 1,2
PMR Parity Error Message RAM
Parity error occurred when reading the Message RAM
PTBF1 Parity Error Transient Buffer RAM A
Parity error occurred when reading Transient Buffer RAM A
PTBF2 Parity Error Transient Buffer RAM B
Parity error occurred when reading Transient Buffer RAM B
FMB[5:0] Faulty Message Buffer
Parity error occurred when reading from/writing to the message buffer referenced by FMB[5:0]. Value only valid when one of the flags PIBF, PMR, PTBF1, or PTBF2 is set.

respective ND flag in the New Data Register 1/2 is also set.

4.9 Input Buffer

Double buffer structure that holds the header and data sections to be transferred to the selected message buffer in the Message RAM. Used to configure the message buffers in the Message RAM and to update the data sections of Transmit Buffers.

The header sections of message buffers belonging to the static segment or to the FIFO can only be changed when the CC is in CONFIG state.

The data transfer between Input Buffer (IBF) and Message RAM is described in detail in section 5.11.1.1 Data Transfer Input Buffer→Message RAM.

4.9.1 Write Data Section [1..64] (WRDSn)

Holds the data words to be transferred to the data section of the addressed message buffer. The data words are written to the Message RAM in transmission order from DW1 (byte0, byte1) to $DW_{PL}$ ($DW_{PL}$=number of data words as defined by the payload length).

| | Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|---|---|
| WRDSn | R | MD31 | MD30 | MD29 | MD28 | MD27 | MD26 | MD25 | MD24 | MD23 | MD22 | MD21 | MD20 | MD19 | MD18 | MD17 | MD16 |
| 0x0400-0x04FC | W | | | | | | | | | | | | | | | | |
| Reset | | | | | | | | | undefined | | | | | | | | |
| | Bit | 15 | 14 | 13 | 12 | 11 | 10 | 9 | 8 | 7 | 6 | 5 | 4 | 3 | 2 | 1 | 0 |
| | R | MD15 | MD14 | MD13 | MD12 | MD11 | MD10 | MD9 | MD8 | MD7 | MD6 | MD5 | MD4 | MD3 | MD2 | MD1 | MD0 |
| | W | | | | | | | | | | | | | | | | |
| Reset | | | | | | | | | undefined | | | | | | | | |

MD[31:0] Message Data
MD[7:0]=DWn, byte0
MD[15:8]=DWn, byte1
MD[23:16]=DWn+1, byte3
MD[31:24]=DWn+1, byte4

4.9.2 Write Header Section 1 (WRHS1)

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| WRHS1 R | 0 | 0 | MBI | TXM | NME | CFG | CHB | CHA | 0 | CYC6 | CYC5 | CYC4 | CYC3 | CYC2 | CYC1 | CYC0 |
| 0x0500 W | | | | | | | | | | | | | | | | |
| Reset | 0 | 0 | 0 | 0 | 0 | 0 | 0 | 0 | 0 | 0 | 0 | 0 | 0 | 0 | 0 | 0 |
| Bit | 15 | 14 | 13 | 12 | 11 | 10 | 9 | 8 | 7 | 6 | 5 | 4 | 3 | 2 | 1 | 0 |
| R | 0 | 0 | 0 | 0 | 0 | FID10 | FID9 | FID8 | FID7 | FID6 | FID5 | FID4 | FID3 | FID2 | FID1 | FID0 |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

FID[10:0] Frame ID

Frame ID of the selected message buffer. The frame ID defines the slot number for transmission of the respective message. Message buffers with frame ID='0' are considered as not valid. Once the buffer is ready for transmission (TXR='1') the frame ID bits cannot be written until after the buffer has been transmitted (TXR='0'). Only frame IDs greater than the maximum static slot number (dynamic buffers) can be changed during runtime. Frame IDs for static slots may only be written in CONFIG state.

CYC[6:0] Cycle Code

The 7-bit cycle code determines the cycle set used for cycle counter filtering. For details about the configuration of the cycle code see 5.7.4 Cycle Counter Filtering.

CHA, CHB Channel Filter Control

The 2-bit channel filtering field associated with each buffer serves as a filter for Receive Buffers, and as a control field for Transmit Buffers.

| CHA | CHB | Transmit Buffer transmit frame on | Receive Buffer store valid frame received from |
|---|---|---|---|
| 1 | 1 | both channels | channel A or B (pick first valid) |
| 1 | 0 | channel A | channel A |
| 0 | 1 | channel B | channel B |
| 0 | 0 | no transmission | ignore frame |

CFG Message Buffer Configuration Bit

This bit is used to configure the corresponding buffer as Transmit Buffer or as Receive Buffer. For message buffers belonging to the Receive FIFO the bit is not evaluated.

1=The corresponding buffer is configured as Transmit Buffer

0=The corresponding buffer is configured as Receive Buffer

NME Network Management Enable

This bit is used to control the state of the Payload Preamble Indicator in transmit frames. If the bit is set, the respective message buffer holds network management information. Only evaluated for Transmit Buffers in static segment. Message ID filtering in dynamic segment is not supported by the E-Ray module.

1=Payload Preamble Indicator set

0=Payload Preamble Indicator not set

TXM Transmission Mode

This bit is used to select the transmission mode.

1=Single-shot mode (static segment: transmit Null frame if buffer not updated, TXR='0')

0=Continuous mode

MBI Message Buffer Interrupt

This bit enables the receive/transmit interrupt for the corresponding message buffer. After a received message has been stored into the message buffer, the RXI flag in the Status Interrupt register is set. After successful transmission the TXI flag in the Status Interrupt register is set.

1=The corresponding message buffer interrupt is enabled

0=The corresponding message buffer interrupt is disabled

4.9.3 Write Header Section 2 (WRHS2)

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| WRHS2 R | 0 | 0 | 0 | 0 | 0 | 0 | 0 | 0 | 0 | PLC6 | PLC5 | PLC4 | PLC3 | PLC2 | PLC1 | PLC0 |
| 0x0504 W | | | | | | | | | | | | | | | | |
| Reset | 0 | 0 | 0 | 0 | 0 | 0 | 0 | 0 | 0 | 0 | 0 | 0 | 0 | 0 | 0 | 0 |
| Bit | 15 | 14 | 13 | 12 | 11 | 10 | 9 | 8 | 7 | 6 | 5 | 4 | 3 | 2 | 1 | 0 |
| R | 0 | 0 | 0 | 0 | 0 | CRC10 | CRC9 | CRC8 | CRC7 | CRC6 | CRC5 | CRC4 | CRC3 | CRC2 | CRC1 | CRC0 |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

CRC[10:0] Header CRC (vRHHeader!HeaderCRC)
Receive Buffer: Header CRC updated from received frame
Transmit Buffer Header CRC calculated and configured by the Host
PLC[6:0] Payload Length Configured
Length of data field (number of 2-byte words) as configured by the Host (=buffer length).

4.9.4 Write Header Section 3 (WRHS3)

| Bit | | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|---|
| WRHS3 | R | 0 | 0 | 0 | 0 | 0 | 0 | 0 | 0 | 0 | 0 | 0 | 0 | 0 | 0 | 0 | 0 |
| 0x0508 | W | | | | | | | | | | | | | | | | |
| Reset | | 0 | 0 | 0 | 0 | 0 | 0 | 0 | 0 | 0 | 0 | 0 | 0 | 0 | 0 | 0 | 0 |
| Bit | | 15 | 14 | 13 | 12 | 11 | 10 | 9 | 8 | 7 | 6 | 5 | 4 | 3 | 2 | 1 | 0 |
| | R | 0 | 0 | 0 | 0 | 0 | DP10* | DP9* | DP8* | DP7* | DP6* | DP5* | DP4* | DP3* | DP2* | DP1* | DP0* |
| | W | | | | | | | | | | | | | | | | |
| Reset | | 0 | 0 | 0 | 0 | 0 | 0 | 0 | 0 | 0 | 0 | 0 | 0 | 0 | 0 | 0 | 0 |

DP[10:0] Data Pointer
Pointer to the first 32-bit word of the data section of the addressed message buffer in the Message RAM. Writeable only in CONFIG state.

4.9.5 Input Buffer Command Request (IBCR)

When the Host writes the number of a target message buffer in the Message RAM to IBRH[5:0] in the Input Buffer Command Request register, IBF and IBF Shadow are swapped. In addition the message buffer numbers stored under IBRH[5:0] and IBRS[5:0] are also swapped (see also 5.11.1.1 Data Transfer Input Buffer→Message RAM).

With this write operation the IBSYS bit in the Input Buffer Command Request register is set to '1'. The Message Handler then starts to transfer the contents of IBF Shadow to the message buffer in the Message RAM selected by IBRS[5:0].

While the Message Handler transfers the data from IBF Shadow to the target message buffer in the Message RAM, the Host may configure the next message in the IBF. After the transfer between IBF Shadow and the Message RAM has completed, the IBSYS bit is set back to '0' and the next transfer to the Message RAM may be started by the Host by writing the respective target message buffer number to IBRH [5:0].

If a write access to IBRH[5:0] occurs while IBSYS is '1', IBSYH is set to '1'. After completion of the ongoing data transfer from IBF Shadow to the Message RAM, IBF and IBF Shadow are swapped, IBSYH is reset to '0'. IBSYS remains set to '1', and the next transfer to the Message RAM is started. In addition the message buffer numbers stored under IBRH [5:0] and IBRS[5:0] are also swapped.

IBRH[5:0] Input Buffer Request Host
Selects the target message buffer in the Message RAM for data transfer from Input Buffer.
Valid values are 0x0000 to 0x003F (0..63).

IBSYH Input Buffer Busy Host
Set to '1' by writing IBRH[5:0] while IBSYS is still '1'. After the ongoing transfer between IBF Shadow and the Message RAM has completed, the IBSYH is set back to '0'.

1=Request while transfer between IBF Shadow and Message RAM in progress
0=No request pending IBRS[5:0] Input Buffer Request Shadow
Number of the target message buffer actual updated/last updated.
Valid values are 0x0000 to 0x003F (0..63).

IBSYS Input Buffer Busy Shadow
Set to '1' after writing IBRH[5:0]. When the transfer between IBF Shadow and the Message RAM has completed, IBSYS is set back to '0'.

1=Transfer between IBF Shadow and Message RAM in progress
0=Transfer between IBF Shadow and Message RAM completed

4.9.6 Input Buffer Command Mask (IBCM)

Configures how the message buffer in the Message RAM selected by the Input Buffer Command Request register is updated. When IBF and IBF Shadow are swapped, bits LHSH, LDSH, and STXRH are swapped with bits LHSS, LDSS, and STXRS to keep them attached to the respective message buffer number from the Input Buffer Command Request register.

| Bit | | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|---|
| IBCR | R | IBSYS | 0 | 0 | 0 | 0 | 0 | 0 | 0 | 0 | 0 | IBRS5 | IBRS4 | IBRS3 | IBRS2 | IBRS1 | IBRS0 |
| 0x0510 | W | | | | | | | | | | | | | | | | |
| Reset | | 0 | 0 | 0 | 0 | 0 | 0 | 0 | 0 | 0 | 0 | 0 | 0 | 0 | 0 | 0 | 0 |
| Bit | | 15 | 14 | 13 | 12 | 11 | 10 | 9 | 8 | 7 | 6 | 5 | 4 | 3 | 2 | 1 | 0 |
| | R | IBSYH | 0 | 0 | 0 | 0 | 0 | 0 | 0 | 0 | 0 | IBRH5 | IBRH4 | IBRH3 | IBRH2 | IBRH1 | IBRH0 |
| | W | | | | | | | | | | | | | | | | |
| Reset | | 0 | 0 | 0 | 0 | 0 | 0 | 0 | 0 | 0 | 0 | 0 | 0 | 0 | 0 | 0 | 0 |

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| IBCM R | 0 | 0 | 0 | 0 | 0 | 0 | 0 | 0 | 0 | 0 | 0 | 0 | 0 | STXRS | LDSS | LHSS |
| 0x0514 W | | | | | | | | | | | | | | | | |
| Reset | 0 | 0 | 0 | 0 | 0 | 0 | 0 | 0 | 0 | 0 | 0 | 0 | 0 | 0 | 0 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | 0 | 0 | 0 | 0 | 0 | 0 | 0 | 0 | 0 | 0 | 0 | 0 | 0 | STXRH | LDSH | LHSH |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

LHSH Load Header Section Host
1=Header section selected for transfer from Input Buffer to the Message RAM
0=Header section is not updated
LDSH Load Data Section Host
1=Data section selected for transfer from Input Buffer to the Message RAM
0=Data section is not updated
STXRH Set Transmission Request Host
If this bit is set to '1', the Transmission Request flag TXR for the selected message buffer is set in the Transmission Request Registers to release the message buffer for transmission. In single-shot mode the flag is cleared by the CC after transmission has completed.
1=Set Transmission Request flag, Transmit Buffer released for transmission
0=Reset Transmission Request flag
LHSS Load Header Section Shadow
1=Header section selected for transfer from Input Buffer to the Message RAM
0=Header section is not updated
LDSS Load Data Section Shadow
1=Data section selected for transfer from Input Buffer to the Message RAM
0=Data section is not updated
STXRS Set Transmission Request Shadow
If this bit is set to '1', the Transmission Request flag TXR for the selected message buffer is set in the Transmission Request Registers to release the message buffer for transmission. In single-shot mode the flag is cleared by the CC after transmission has completed.
1=Set Transmission Request flag, Transmit Buffer released for transmission
0=Reset Transmission Request flag 4.10 Output Buffer Double buffer structure that holds the header and data sections of selected message buffers transferred from the Message RAM. Used to read out message buffers from the Message RAM.

The data transfer between Message RAM and Output Buffer (OBF) is described in detail in section 5.11.1.2 Data Transfer Message RAM→Output Buffer.

4.10.1 Read Data Section [1..64] (RDDSn)

Holds the data words read from the data section of the addressed message buffer. The data words are read from the Message RAM in reception order from DW1 (byte0, byte1) to $DW_{PL}$ ($DW_{PL}$=number of data words as defined by the Payload Length).

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| RDDSn R | MD31 | MD30 | MD29 | MD28 | MD27 | MD26 | MD25 | MD24 | MD23 | MD22 | MD21 | MD20 | MD19 | MD18 | MD17 | MD16 |
| 0x0600-0x06FC W | | | | | | | | | | | | | | | | |
| Reset | | | | | | | | undefined | | | | | | | | |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | MD15 | MD14 | MD13 | MD12 | MD11 | MD10 | MD9 | MD8 | MD7 | MD6 | MD5 | MD4 | MD3 | MD2 | MD1 | MD0 |
| W | | | | | | | | | | | | | | | | |
| Reset | | | | | | | | undefined | | | | | | | | |

MD[31:0] Message Data
MD[7:0]=DWn, byte0
MD[15:8]=DWn, byte1
MD[23:16]=DWn+1, byte3
MD[31:24]=DWn+1, byte4

4.10.2 Read Header Section 1 (RDHS1)

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| RDHS1 R | 0 | 0 | MBI | TXM | NME | CFG | CHB | CHA | 0 | CYC6 | CYC5 | CYC4 | CYC3 | CYC2 | CYC1 | CYC0 |
| 0x0700 W | | | | | | | | | | | | | | | | |
| Reset | 0 | 0 | 0 | 0 | 0 | 0 | 0 | 0 | 0 | 0 | 0 | 0 | 0 | 0 | 0 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | 0 | 0 | 0 | 0 | 0 | FID10 | FID9 | FID8 | FID7 | FID6 | FID5 | FID4 | FID3 | FID2 | FID1 | FID0 |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

FID[10:0] Frame ID
Frame ID of the selected message buffer. The frame ID defines the slot number for reception of the respective message. Message buffers with frame ID='0' are considered as not valid.

CYC[6:0] Cycle Code
The 7-bit cycle code determines the cycle set used for cycle counter filtering. For details about the configuration of the cycle code see 5.7.4 Cycle Counter Filtering.

CHA, CHB Channel Filter Control
The 2 bit Channel Filtering field associated with each buffer serves as a filter for a Receive Buffer, and as a control field for a Transmit Buffer.

| CHA | CHB | Transmit Buffer transmit frame on | Receive Buffer store valid frame received from |
|---|---|---|---|
| 1 | 1 | both channels | channel A or B (pick first valid) |
| 1 | 0 | channel A | channel A |
| 0 | 1 | channel B | channel B |
| 0 | 0 | no transmission | ignore frame | respective message buffer holds network management information. Only valid for message buffers configured for reception in static segment. Message ID filtering in dynamic segment is not supported by the E-Ray module.
1=Payload Preamble Indicator set
0=Payload Preamble Indicator not set TXM Transmission Mode
This bit is used to select the transmission mode.
1=Single-shot mode (static segment: transmit Null frame if buffer not updated, TXR='0')
0=Continuous mode MBI Message Buffer Interrupt
This bit enables the receive/transmit interrupt for the corresponding message buffer. After a received message has been stored into the message buffer, the RXI flag in the Status Interrupt Register is set. After successful transmission the TXI flag in the Status Interrupt Register is set.
1=The corresponding message buffer interrupt is enabled
0=The corresponding message buffer interrupt is disabled 4.10.3 Read Header Section 2 (RDHS2)

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| RDHS2 R | 0 | PLR6 | PLR5 | PLR4 | PLR3 | PLR2 | PLR1 | PLR0 | 0 | PLC6 | PLC5 | PLC4 | PLC3 | PLC2 | PLC1 | PLC0 |
| 0x0704 W | | | | | | | | | | | | | | | | |
| Reset | 0 | 0 | 0 | 0 | 0 | 0 | 0 | 0 | 0 | 0 | 0 | 0 | 0 | 0 | 0 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | 0 | 0 | 0 | 0 | 0 | CRC10 | CRC9 | CRC8 | CRC7 | CRC6 | CRC5 | CRC4 | CRC3 | CRC2 | CRC1 | CRC0 |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

CFG Message Buffer Configuration Bit
This bit is used to configure the corresponding buffer as a Transmit Buffer or as a Receive Buffer. For message buffers belonging to the Receive FIFO the bit is not evaluated.
1=The corresponding buffer is configured as Transmit Buffer
0=The corresponding buffer is configured as Receive Buffer NME Network Management Enable
This bit indicates the reception of a FlexRay frame with the Payload Preamble Indicator set to '1'. If the bit is set, the CRC[10:0] Header CRC (vRF!Header!HeaderCRC)
Receive Buffer: Header CRC updated from received frame
Transmit Buffer Header CRC calculated and configured by the Host PLC[6:0] Payload Length Configured
Length of data field (number of 2-byte words) as configured by the Host (=buffer length).

PLR[16:0] Payload Length Received (vRF!Header!Length)
Length of data field (number of 2-byte words) from received frame.

4.10.4 Read Header Section 3 (RDHS3)

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| RDHS3 R | 0 | 0 | RES | PPI | NFI | SYN | SFI | RCI | 0 | 0 | RCC5 | RCC4 | RCC3 | RCC2 | RCC1 | RCC0 |
| 0x0708 W | | | | | | | | | | | | | | | | |
| Reset | 0 | 0 | 0 | 0 | 0 | 0 | 0 | 0 | 0 | 0 | 0 | 0 | 0 | 0 | 0 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | 0 | 0 | 0 | 0 | 0 | DP10 | DP9 | DP8 | DP7 | DP6 | DP5 | DP4 | DP3 | DP2 | DP1 | DP0 |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

DP[10:0] Data Pointer

Pointer to the first 32-bit word of the data section of the addressed message buffer in the Message RAM.

RCC[5:0]. Receive Cycle Count (vRF!Header!CycleCount)

Cycle counter value updated from received frame.

4.10.5 Message Buffer Status (MBS)

The message buffer status is updated by the CC at the end of the slot, defined by the configured frame ID, and can be checked by the Host. The flags are set if one of the listed errors is detected by the CC. The message buffer status always shows the status of the latest slot, which means that errors from previous cycles are overwritten.

| Bit | | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|---|
| MBS | R | 0 | 0 | 0 | 0 | 0 | 0 | 0 | 0 | 0 | 0 | 0 | 0 | 0 | 0 | 0 | 0 |
| 0x070C | W | | | | | | | | | | | | | | | | |
| Reset | | 0 | 0 | 0 | 0 | 0 | 0 | 0 | 0 | 0 | 0 | 0 | 0 | 0 | 0 | 0 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | 0 | 0 | 0 | MLST | PLE | VFRB | VFRA | TCIB | TCIA | DCE | SVOB | SVOA | CEOB | CEOA | SEOB | SEOA |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

RCI Received on Channel Indication (vSS!Channel)

Indicates for each subscribed static reception slot on which channel the frame was received if a single receive buffer is assigned to both channels.

1=Frame received on channel A
0=Frame received on channel B

SFI Startup Frame Indication Bit (vRF!Header!SuFIndicator)

A Startup frame is marked by the Startup frame indicator.
1=The receive frame is a Startup frame
0=No Startup frame received SYN Sync Frame Indication Bit (vRF!Header!SyFIndicator)

A Sync frame is marked by the Sync frame indicator.
1=The receive frame is a Sync frame
0=No Sync frame received NFI Null Frame Indication Bit (vRF!Header!NFIndicator)

If set to '0' the payload segment of the received frame contains no usable data.
1=Received frame is not a Null frame
0=Received frame is a Null frame PPI Payload Preamble Indicator (vRF!Header!PPIndicator)

The payload preamble indicator defines whether a network management vector or message ID is contained within the payload segment of the received frame.

1=Static segment: Network management vector at the beginning of the payload
Dynamic segment: Message ID at the beginning of the payload 0=The payload segment of the received frame does not contain a network management vector or a message ID RES Reserved Bit (vRF!Header!Reserved)

Reflects the state of the received reserved bit. The reserved bit is transmitted as '0'.

Transmit & Receive Buffer

SEOA Syntax Error Observed on Channel A (vSS!SyntaxErrorA)

A syntax error was observed in the configured slot on channel A.
1=Syntax error observed on channel A
0=No syntax error observed on channel A SEOB Syntax Error Observed on Channel B (vSS!SyntaxErrorB)

A syntax error was observed in the configured slot on channel B.
1=Syntax error observed on channel B
0=No syntax error observed on channel B CEOA Content Error Observed on Channel A (vSS!ContentErrorA)

A content error was observed in the configured slot on channel A.
1=Content error observed on channel A
0=No content error observed on channel A CEOB Content Error Observed on Channel B (vSS!ContentErrorB)

A content error was observed in the configured slot on channel B.
1=Content error observed on channel B
0=No content error observed on channel B SVOA Slot Boundary Violation Observed on Channel A (vSS!BViolationA)

A slot boundary violation was observed on channel A i.e. channel active at the start or at the end of the configured slot.
1=Slot boundary violation observed on channel A
0=No slot boundary violation observed on channel A SVOB Slot Boundary Violation Observed on Channel B (vSS!BViolationB)
  A slot boundary violation was observed on channel B i.e. channel active at the start or at the end of the configured slot.
  1=Slot boundary violation observed on channel B
  0=No slot boundary violation observed on channel B
DCE Data Consistency Error
  The bit is set when a parity error was detected when writing data to this message buffer or when reading from this message buffer. If a transmit buffer has this flag set, a Null frame is transmitted.
  1=Message buffer void due to parity error
  0=No parity error detected for this message buffer
Transmit Buffer
TCIA Transmission Conflict Indication Channel A (vSS!TxConflictA)
  A transmission conflict indication is set if a transmission conflict has occurred on channel A.
  1=Transmission conflict occurred on channel A
  0=No transmission conflict occurred on channel A
TCIB Transmission Conflict Indication Channel B (vSS!TxConflictB)
  A transmission conflict indication is set if a transmission conflict has occurred on channel B.
  1=Transmission conflict occurred on Channel B
  0=No transmission conflict occurred on Channel B
VFRA Valid Frame Received on Channel A (vSS!ValidFrameA)
  A valid frame indication is set if a valid frame received in the transmission slot on channel A.
  1=Valid frame received on channel A
  0=No valid frame received on channel A
E VFRB Valid Frame Received on Channel B (vSS!ValidFrameB)
  A valid frame indication is set if a valid frame received in the transmission slot on channel B.
  1=Valid frame received on Channel B
  0=No valid frame received on Channel B
Receive Buffer
PLE Payload Length Error
  A mismatch between configured payload length and payload length of the received frame was detected. If such a mismatch is detected in static segment, the CEOA and/or CEOB flag is also set.
  1=Payload length error detected
  0=No payload length error detected
MLST Message Lost
  Host did not read message before message buffer was updated with new message.
  1=Unprocessed message was overwritten
  0=No message lost 4.10.6 Output Buffer Command Request (OBCR)

The message buffer selected by OBRS[5:0] in the Output Buffer Command Request register is transferred from the Message RAM to the Output Buffer as soon as the Host has set REQ to '1'. Bit REQ can only be set to '1' while OBSYS is '0' (see also 5.11.1.2 Data Transfer Message RAM→Output Buffer).

After setting REQ to '1', OBSYS is set to '1', and the transfer of the message buffer selected by OBRS[5:0] from the Message RAM to OBF Shadow is started. After the transfer between the Message RAM and OBF Shadow has completed, the OBSYS bit is set back to '0'.

By setting the VIEW bit to '1' while OBSYS is '0', OBF and OBF Shadow are swapped. Now the Host can read the transferred message buffer from OBF while the Message Handler may transfer the next message from the Message RAM to OBF Shadow.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| OBCR R | 0 | 0 | 0 | 0 | 0 | 0 | 0 | 0 | 0 | 0 | OBRH5 | OBRH4 | OBRH3 | OBRH2 | OBRH1 | OBRH0 |
| 0x0710 W | | | | | | | | | | | | | | | | |
| Reset | 0 | 0 | 0 | 0 | 0 | 0 | 0 | 0 | 0 | 0 | 0 | 0 | 0 | 0 | 0 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | OBSYS | 0 | 0 | 0 | 0 | 0 | REQ | VIEW | 0 | 0 | OBRS5 | OBRS4 | OBRS3 | OBRS2 | OBRS1 | OBRS0 |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

OBRS[5:0] Output Buffer Request Shadow
  Number of source message buffer to be transferred from the Message RAM to OBF Shadow. Valid values are 0x0000 to 0x003F (0..63). If the number of the first message buffer of the Receive FIFO is written to this register the Message Handler transfers the FIFO Buffer addressed by the GET Index Register (GIDX) to OBF Shadow.
VIEW View Shadow Buffer
  Toggles between OBF Shadow and OBF.
  Only writeable while OBSYS='0'.
  1=Swap OBF Shadow and OBF
  0=No action
REQ Request Message RAM Transfer
  Requests transfer of message buffer addressed by OBRS [5:0] from Message RAM to OBF Shadow. Only writeable while OBSYS='0'.
  1=Transfer to OBF Shadow requested
  0=No request
OBSYS Output Buffer Shadow Busy
  Set to '1' after setting bit REQ. When the transfer between the Message RAM and OBF Shadow has completed, OBSYS is set back to '0'.
  1=Transfer between Message RAM and OBF Shadow in progress
  0=No transfer in progress
OBRH[5:0] Output Buffer Request Host
  Number of transferred message buffer stored in OBF. By writing VIEW to '1' OBF Shadow and OBF are swapped and the transferred message buffer is accessible by the Host. Valid values are 0x0000 to 0x003F (0..63).

4.10.7 Output Buffer Command Mask (OBCM)

Configures how the header section of the Output Buffer is updated from the selected message buffer in the Message RAM.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| OBCM R | 0 | 0 | 0 | 0 | 0 | 0 | 0 | 0 | 0 | 0 | 0 | 0 | 0 | 0 | RDSH | RHSH |
| 0x0714 W | | | | | | | | | | | | | | | | |
| Reset | 0 | 0 | 0 | 0 | 0 | 0 | 0 | 0 | 0 | 0 | 0 | 0 | 0 | 0 | 0 | 0 |
| Bit | 15 | 14 | 13 | 12 | 11 | 10 | 9 | 8 | 7 | 6 | 5 | 4 | 3 | 2 | 1 | 0 |
| R | 0 | 0 | 0 | 0 | 0 | 0 | 0 | 0 | 0 | 0 | 0 | 0 | 0 | | RDSS | RHSS |
| W | | | | | | | | | | | | | | | | |
| Reset | 0 | 0 | 0 | 0 | 0 | 0 | 0 | 0 | 0 | 0 | 0 | 0 | 0 | 0 | 0 | 0 |

RHSS Read Header Section Shadow
1=Header section selected for transfer from Message RAM to Output Buffer
0=Header section is not read
RDSS Read Data Section Shadow
1=Data section selected for transfer from Message RAM to Output Buffer
0=Data section is not read
RHSH Read Header Section Host
1=Header section selected for transfer from Message RAM to Output Buffer
0=Header section is not read
RDSH Read Data Section Host
1=Data section selected for transfer from Message RAM to Output Buffer
0=Data section is not read Note: After the transfer from the Message RAM to the Output Buffer has completed, the New Data flag ND of the selected message buffer in the New Data Register is cleared.

5. FUNCTIONAL DESCRIPTION 5.1 Communication Cycle

FIG. 8: Structure of Communication Cycle

A communication cycle in FlexRay consists of the following elements:
  Static Segment
  Dynamic Segment
  Symbol Window
  Network Idle Time (NIT)

Static Segment, Dynamic Segment, and Symbol Window form the Network Communication Time (NCT). For each communication channel the slot counter starts at 1 and counts up until the 'Start of Latest Transmit' as configured in the MHD Configuration Register 1 is reached. Both channels share the same arbitration grid which means that they use the same synchronized macrotick.

5.1.1 Static Segment

The Static Segment is characterized by the following features:
  slots protected by bus guardian
  start of frame transmission at action point of the respective static slot
  ends with static slot idle phase of last static slot
  payload length same for all frames (on both channels)
  Parameters: number of static slots, duration of static slot, static slot action point offset 5.1.2 Dynamic Segment The Dynamic Segment is characterized by the following features:
  bus guardian disabled, all controllers have bus access
  variable duration of slots, different for both channels
  channel activity stops slot counting
  start of transmission at minislot action point
  end of transmission at action point of last minislot
  Parameters: number of minislots, duration of minislot, minislot action point offset, last minislot to start transmission 5.1.3 Symbol Window The Symbol Window is characterized by the following features:
  send single symbol
  the FlexRay Protocol Specification v2.0 defines three symbols:
    Wake-up Symbol (WUS), sent in WAKEUP state only
    Collision Avoidance Symbol (CAS), sent in STARTUP state only
    Media Access Test Symbol (MTS), sent in NORMAL_ACTIVE state to test the Bus Guardian
  arbitration not provided (higher-level protocol)
  transmit phase+symbol window idle phase
  Parameters: end of dynamic segment, start of network idle time 5.1.4 Network Idle Time (NIT)

During Network Idle Time the Communication Controller has to perform the following tasks:
  calculate clock correction terms
  apply offset correction during multiple macroticks
  perform implementation specific cluster cycle related tasks
  Parameters: start of network idle time 5.2 Communication Modes The FlexRay Protocol Specification v2.0 defines the Time-triggered Distributed (TT-D) mode.

5.2.1 Time-triggered Distributed (TT-D)

In TT-D mode the following configurations are possible:
  pure static: minimum 2 static slots+symbol window (optional)
  mixed static/dynamic: minimum 2 static slots+Dynamic Segment+symbol window (optional)

A minimum of two Startup nodes need to be configured for distributed time-triggered operation. Two fault-free Startup nodes are necessary for the cluster startup. Each Startup frame shall be a Sync frame, therefore all Startup nodes are Sync nodes.

5.3 Clock Synchronization

In TT-D mode a distributed clock synchronization is used. Each node individually synchronizes itself to the cluster by observing the timing of transmitted Sync frames from other nodes.

5.3.1 Global Time

In a FlexRay node activities, including communication, are based on the concept of a global time, even though each individual node maintains its own view of it. It is the clock synchronism mechanism that differentiates the FlexRay cluster from other node collections with independent clock mechanisms. The global time is a vector of two values; the cycle (cycle counter) and the cycle time (macrotick counter).

Cluster Specific:
- macrotick (MT)=basic unit of time measurement in a FlexRay network,
- a macrotick consists of an integer number of microticks ($\mu T$)
- cycle length=duration of a communication cycle in units of macroticks (MT)

5.3.2 Local Time

Internally, nodes time their behavior with microtick resolution. Microticks are time units derived from the oscillator clock tick of the specific node. Therefore microticks are controller-specific units. They may have different durations in different controllers. The precision of a node's local time difference measurements is a microtick ($\mu T$).

Node Specific:
- oscillator clock→prescaler→microtick ($\mu T$)
- $\mu T$=basic unit of time measurement in a CC, clock correction is done in units of $\mu T$'s
- cycle counter+macrotick counter=nodes local view of the global time

5.3.3 Synchronization Process

Clock synchronization is performed by means of Sync frames. Only preconfigured nodes (Sync nodes) connected to both channels (two-channel cluster) are allowed to send Sync frames.

For synchronization in FlexRay the following constraints have to be considered:
- max. one Sync frame per node in one communication cycle
- max. 15 Sync frames per network in one communication cycle
- every node has to use all available Sync frames for clock synchronization
- minimum of two Sync nodes required for clock synchronization
- for fault tolerant clock synchronization a minimum of 3 Sync nodes is required
- a synchronization error is a fatal error, that is the controller has to reintegrate For clock synchronization the time difference between expected and observed arrival time of Sync frames received during the static segment, valid on both channels (two-channel cluster), is measured. The calculation of correction terms is done during NIT (offset: every cycle, rate: odd cycle) by using a FTA/FTM algorithm.

5.3.3.1 Offset (Phase) Correction

- only deviation values measured and stored in the current cycle used
- for a two channel node the smaller value will be taken
- calculation during NIT of every communication cycle, value may be negative
- offset correction value calculated in even cycles used for error checking only
- checked against limit values (violation: NORMAL_ACTIVE→NORMAL_PASSIVE→HALT)
- correction value is an integer number of $\mu$Ts
- correction done in odd numbered cycles, distributed over the macroticks comprising the NIT to shift nodes next start of cycle (MTs lengthened/shortened)

5.3.3.2 Rate (Frequency) Correction

- pairs of deviation values measured and stored in even/odd cycle pair used
- for a two channel node the average of the differences from the two channels is used
- calculated during NIT of odd numbered cycles, value may be negative
- cluster drift damping term added (=positive integer)
- checked against limit values (violation: NORMAL_ACTIVE→NORMAL_PASSIVE→HALT)
- correction value is an integer number of $\mu$Ts
- distributed over macroticks comprising the next even/odd cycle pair (MTs lengthened/shortened)

5.3.4 External Clock Synchronization

During normal operation, independent clusters can drift significantly. If synchronous operation is desired across the clusters, external synchronization is necessary; even though the nodes within each cluster are synchronized. This can be accomplished with synchronous application of host-deduced rate and offset correction terms to the clusters.

- external offset/rate correction value is a signed integer
- external offset/rate correction value added to calculated offset/rate correction value
- aggregate offset/rate correction term (external+internal) checked against the configured limits
- if one of the correction values is outside the limits, the node is out of synchronization

5.4 Error Handling

The implemented error handling concept is intended to ensure that communication between non-affected nodes can be maintained in the presence of a lower layer protocol error in a single node. In some cases, higher layer program command activity is required for the CC to resume normal operation. A change of the error handling state will set bit PEMC in the Error Interrupt Register and may trigger an interrupt to the Host if enabled. The actual error mode is signalled by ERRM [1:0] in the CC Status and Error Vector register.

TABLE 12

Error modes of the POC (degradation model)

| Error Mode | Activity |
|---|---|
| ACTIVE (green) | Full operation<br>The CC is fully synchronized and supports the cluster wide clock synchronization. The host is informed of any error condition(s) or status change by interrupt (if enabled) or by reading the error and status flags from the Error and Status Interrupt Registers. The BG is synchronized with the CC. |
| PASSIVE (yellow) | Reduced operation, CC self rescue allowed.<br>The CC stops transmitting frames and symbols, but received frames are still processed. Clock synchronization mechanisms are continued based on received frames. No active contribution to the cluster wide clock synchronization. The host is informed of any error condition(s) or status change by interrupt (if enabled) or by reading the error and status flags from the Error and Status Interrupt Registers. The BG remains synchronized as the CC continues to provide the ARM, MT, and BGT signals. |
| COMM_HALT (red) | Operation halted, CC self rescue not allowed.<br>The CC stops frame and symbol processing, clock synchronization processing and the macrotick generation. The host has still access to error and status information by reading the error and status flags from Error and Status Interrupt Registers. The BG will enter FailSilent state due to lack of transmissions of the ARM, MT, or BGT signals. The bus driver is disabled. |

5.4.1 Clock Correction Failed Counter

When the Clock Correction Failed Counter reaches the Maximum Without Clock Correction Passive limit defined by WCP[3:0], the POC transits from NORMAL_ACTIVE to NORMAL_PASSIVE state. When it reaches the Maximum Without Clock Correction Fatal limit defined by WCF[3:0], it transits NORMAL_ACTIVE or NORMAL_PASSIVE to the HALT state. Both limits are defined in the NEM Configuration Register.

The Clock Correction Failed Counter CCFC[3:0] allows the Host to monitor the duration of the inability of a node to compute clock correction terms after the CC passed protocol startup phase. It will be incremented by one at the end of any odd numbered communication cycle where either the Missing Offset Correction signal MOCS or the Missing Rate Correction signal MRCS is set. The counter and the two flags are located in the Clock Correction Status 1 register.

The Clock Correction Failed Counter is reset to zero at the end of an odd communication cycle if neither the Missing Offset Correction signal nor the Missing Rate Correction signal are active.

The Clock Correction Failed Counter stops incrementing when the Maximum Without Clock Correction Fatal value WCF[3:0] as defined in NEM Configuration Register is reached (i.e. incrementing the counter at its maximum value will not cause it to "wraparound" back to zero). The Clock Correction Failed Counter will be initialized to zero when the CC performs the transition from CONFIG to READY state.

state. If PTA[4:0] is set to zero the CC is not allowed to transit from NORMAL_PASSIVE to NORMAL_ACTIVE state.

5.4.3 HALT Command

In case the Host detects an error condition it can bring the CC into HALT state by asserting the HALT command. This can be done by writing CMD[3:0]="0110" in the SUC Configuration Register 1. When called in NORMAL_ACTIVE or NORMAL_PASSIVE state the POC transits to HALT state at the next end_of cycle. When called in any other state CMD [3:0] will be reset to "0000"=command_not_valid and bit CNV in the Error Interrupt Register is set to '1'. If enabled an interrupt to the Host is generated.

5.4.4 FREEZE Command

In case the Host detects a severe error condition it can bring the CC into HALT state by asserting the FREEZE command. This can be done by writing CMD[3:0]="0111" in the SUC Configuration Register 1. The FREEZE command triggers the entry of the HALT state immediately regardless of the actual POC state.

5.5 Communication Controller States

5.5.1 Communication Controller State Diagram

FIG. 9: Overall State Diagram of E-Ray Communication Controller

State transitions are controlled by externals pins eray_reset and eray_rxd1,2, the POC state machine, and by the CHI Command Vector CMD[3:0] located in the SUC Configuration Register 1.

TABLE 13

State transitions of E-Ray overall state machine

| T # | Condition | From | To |
|---|---|---|---|
| 1 | Hardware reset | HW Reset | CONFIG |
| 2 | Unlock sequence followed by command MONITOR_MODE, CMD[3:0] = "1100" | CONFIG | MONITOR_MODE |
| 3 | Command CONFIG, CMD[3:0] = "0001" | MONITOR_MODE | CONFIG |
| 4 | Unlock sequence followed by command READY, CMD[3:0] = "0010" | CONFIG | READY |
| 5 | Command CONFIG, CMD[3:0] = "0001" | READY | CONFIG |
| 6 | Command WAKEUP, CMD[3:0] = "0011" | READY | WAKEUP |
| 7 | Complete, non-aborted transmission of wakeup pattern OR received WUS OR received frame header OR command READY, CMD[3:0] = "0010" | WAKEUP | READY |
| 8 | Command RUN, CMD[3:0] = "0100" | READY | STARTUP |
| 9 | Successful startup | STARTUP | NORMAL_ACTIVE |
| 10 | Clock Correction Failed counter reached Maximum Without Clock Correction Passive limit configured by WCP[3:0] | NORMAL_ACTIVE | NORMAL_PASSIVE |
| 11 | Number of valid correction terms reached the Passive to Active limit configured by PTA[4:0] | NORMAL_PASSIVE | NORMAL_ACTIVE |
| 12 | Command READY, CMD[3:0] = "0010" | STARTUP, NORMAL_ACTIVE, NORMAL_PASSIVE | READY |
| 13 | Clock Correction Failed counter reached Maximum Without Clock Correction Fatal limit configured by WCF[3:0] | NORMAL_ACTIVE | HALT |
| 14 | Clock Correction Failed counter reached Maximum Without Clock Correction Fatal limit configured by WCF[3:0] | NORMAL_PASSIVE | HALT |
| 15 | Command FREEZE, CMD[3:0] = "0111" | All States | HALT |
| 16 | Command CONFIG, CMD[3:0] = "0001" | HALT | CONFIG |

5.4.2 Passive to Active Counter

The Passive to Active Counter controls the transition of the POC from NORMAL_PASSIVE to NORMAL_ACTIVE state. PTA[4:0] in the SUC Configuration Register 1 defines the number of consecutive even/odd cycle pairs that must have valid clock correction terms before the CC is allowed to transit from NORMAL_PASSIVE to NORMAL_ACTIVE

5.5.2 CONFIG State

In CONFIG state, the CC is stopped. All configuration registers are accessible and the pins to the physical layer are in their inactive state. This state is used to initialize the CC configuration.

The CC enters this state
When leaving hardware reset (external reset signal eray_reset is disasserted)

When exiting from MONITOR state, READY state, or HALT state

To leave CONFIG state, the Host has to perform the unlock sequence as described in section 4.3.3 Lock Register (LCK). Directly after unlocking the CONFIG state the Host has to write CMD[3:0] in the SUC Configuration Register 1 to enter the next state.

5.5.3 MONITOR State

After unlocking CONFIG state and writing CMD[3:0]="1100" the CC enters MONITOR state. In this state the CC is able to receive FlexRay frames and CAS/MTS symbols. It is also able to detect coding errors. The temporal integrity of received frames is not checked. This state can be used for debugging purposes in case that startup of a FlexRay network fails. After writing CMD[3:0]="0001" the CC transits back to CONFIG state.

5.5.4 READY State

After unlocking CONFIG state and writing CMD[3:0]="0010" the CC enters READY state. From this state the CC can transit to WAKEUP state and perform a cluster wakeup or to STARTUP state to perform a coldstart or to integrate into a running communication.

The CC enters this state
When exiting from CONFIG, WAKEUP, STARTUP, NORMAL_ACTIVE,
or NORMAL_PASSIVE state by writing CMD[3:0]="0010" (READY command).

The CC exits from this state
To CONFIG state by writing CMD[3:0]="0001" (CONFIG command)
To WAKEUP state by writing CMD[3:0]="0011" (WAKEUP command)
To STARTUP state by writing CMD[3:0]="0100" (RUN command)

5.5.5 WAKEUP State

Any node entering STARTUP that has coldstart capability (Startup node with CSI='0') has to assure that both channels attached have been awakened. Otherwise it cannot be ensured, that the cluster is awake (or at least that the wakeup has been triggered) before the node begins the startup procedure.

The minimum requirement for a cluster wakeup is that all bus drivers are supplied with power. A bus driver has the ability to wake up the other components of its node when it receives a wakeup symbol on its channel. At least one node in the cluster needs an external wakeup source.

FIG. 10: Structure of POC State WAKEUP

The Host completely controls the wakeup procedure. It is informed about the state of the cluster by E the bus driver and the CC and configures bus guardian (if available) and CC to perform the cluster wakeup. The CC provides the Host the ability to transmit a special wakeup pattern (wakeup symbol) on each of its available channels separately.

The wakeup may be performed on only one channel at a time. The CC ensures that ongoing communication on this channel is not disturbed. The CC cannot guarantee that all nodes connected to the configured channel awake because of the transmission of the wakeup pattern, since these nodes cannot give feedback until the startup phase.

Generally, the bus driver of the receiving node recognizes the wakeup pattern and triggers the node wakeup. The CC needs to recognize the wakeup pattern only during wakeup and startup phase The wakeup procedure enables single-channel devices in a two-channel system to trigger the wakeup, by only transmitting the wakeup pattern on the single channel to which they are connected. Another (Startup) node then assumes the responsibility for waking the other channel.

The wakeup procedure tolerates any number of nodes simultaneously trying to wakeup a single channel and resolves this situation such that only one node transmits the pattern. Additionally the wakeup pattern is collision resilient, so even in the presence of a fault causing two nodes to simultaneously transmit a wakeup pattern, the resulting collided signal can still wake the other nodes.

Wakeup is recognized by the CC only during WAKEUP_LISTEN state. After wakeup the CC returns to READY state and signals the change of the wakeup status to the Host by setting bit WST in the Status Interrupt Register. The wakeup status vector WSV[2:0] can be read from the CC Status and Error Vector register. If a valid wakeup symbol was received also bit WUSA or WUSB in the Status Interrupt Register is set. After return from wakeup the Host has to configure the CC to enter STARTUP state.

The Host has to be aware of possible failures of the wakeup and act accordingly. It is advisable to delay any potential startup attempt of the node having instigated the wakeup by the minimal time it takes another Startup node to become awake and to be configured.

To avoid certain types of failures, a single CC should not awake both channels. Instead, two different CCs shall awake the two channels.

The WAKEUP_LISTEN state is controlled by two μT timers, the Wakeup timer and the WakeupNoise timer. The

TABLE 14

State transitions WAKEUP

| T # | Condition | From | To |
|---|---|---|---|
| 1 | Command WAKEUP, CMD[3:0] = "0011" | READY | WAKEUP_LISTEN |
| 2 | Wait for reception of WUS or frame header | WAKEUP_LISTEN | WAKEUP_LISTEN |
| 3 | Received WUS or frame header | WAKEUP_LISTEN | READY |
| 4 | Wakeup OR Wakeup Noise Timer expired AND wakeup channel selected by bit WUCS in the SUC Configuration Register 1 in idle state AND command WAKEUP, CMD[3:0] = "0011" | WAKEUP_LISTEN | WAKEUP_SEND |
| 5 | Complete, non-aborted transmission of wakeup pattern | WAKEUP_SEND | READY |
| 6 | Collision detected | WAKEUP_SEND | WAKEUP_DETECT |
| 7 | One of the following events triggers the transition to READY state: Wakeup timer expired OR Wakeup symbol detected OR frame header received | WAKEUP_DETECT | READY |
| 8 | Host commands change to READY state by command READY, CMD[3:0] = "0010" | All wakeup states | READY |

Wakeup timer enables a fast cluster wakeup in case of a noise free environment, while the WakeupNoise timer enables wakeup under more difficult conditions regarding noise interference.

5.5.5.1 Host Activities

The host must coordinate the BG and the CC wakeup modes. It must coordinate the wakeup of the two channels and must decide whether, or not, to wake a specific channel. The sending of the wakeup sequence is initiated by the Host and generated by the CC. The wakeup sequence is detected by the remote BD's and signalled to their local Hosts.

Wakeup Procedure Controlled by Host:
check local BD's if a WUS was received
command BG first channel to enter WAKEUP (if a BG is installed)
command CC to wakeup first channel
   CC enters WAKEUP_LISTEN and wait for expiration of vdWakeup
   CC enters WAKEUP_SEND and transmits the wakeup pattern
   CC returns to READY state
   CC signals status of wakeup try to Host
command BG first channel to leave wakeup (if a BG is installed)
repeat steps above to wake up second channel if required
set Coldstart Inhibit flag (CSI) and command CC to enter INTEGRATION_LISTEN state
wait predefined time to allow the other nodes to wakeup and configure themselves
reset Coldstart Inhibit flag (CSI) and command CC to enter COLDSTART_LISTEN state
Wakeup Procedure Triggered by BD:
wakeup recognized by BD
BD triggers power-up of Host (if required)
BD signals wakeup event to Host
Host configures its local CC
if necessary Host commands wakeup of second channel and waits predefined time to allow the other nodes to wakeup and configure themselves
Host commands CC to enter STARTUP state

5.5.5.2 Wakeup symbol (WUS)

The WUS is configured by the PRT Configuration Registers 1,2.
collision resilient for up to two sending nodes, two overlapping wakeup symbols still recognizable
Tx-wakeup symbol is independent of transmission rate
configurable number of repetitions pWakeupPattern (2..63)
for wakeup at least two Tx-wakeup symbols needed
single channel wakeup, wakeup symbol may not be sent on both channels at the same time
The gdWakeupSymbolTxIdle time is used to listen for activity on the bus FIG. 11: Timing of Wakeup Pattern

5.5.6 STARTUP State

The cluster wakeup must precede the communication startup in order to ensure that all mechanisms defined for the startup work properly. Startup is performed on all channels synchronously. During startup, a node may only transmit Startup frames.

It cannot be assumed that all nodes and stars need the same amount of time to become completely awake and to be configured. Since at least two nodes are necessary to start up the cluster communication, it is advisable to delay any potential startup attempt of the node having instigated the wakeup by the minimal amount of time it takes another Startup node to become awake, to be configured and to enter startup. It may require several hundred milliseconds (depending on the hardware used) before all nodes and stars are completely awakened and configured.

A fault-tolerant, distributed startup strategy is specified for initial synchronization of all nodes. In general, a node may enter NORMAL_ACTIVE state via the coldstart path initiating the schedule synchronization, or via the integration path integrating into an existing communication schedule.

A coldstart attempt begins with the transmission of a collision avoidance symbol (CAS). Only a Startup node that had transmitted the CAS transmits frames in the first four cycles after the CAS, it is then joined firstly by the other Startup nodes and afterwards by all other nodes.

Each startup frame must also be a Sync frame; therefore each Startup node will also be a Sync node. The number of coldstart attempts is configured by CSA[4:0] in the SUC Configuration Register 1.

In each cluster, at least two nodes must be configured to be Startup nodes. While more than three nodes may be configured to be Startup nodes, the cluster will not benefit from certain properties of the startup algorithm. At least two fault-free Startup nodes are necessary for the cluster to start up.

A Startup node that actively starts the cluster is also called a 'leading Startup node'. A Startup node that integrates upon another Startup node is also called a 'following Startup node'.

A Non-startup node requires at least two startup frames from distinct nodes for integration.

Both Non-startup nodes and Startup nodes start passive integration via the integration path as soon as they receive Sync frames from which to derive the TDMA schedule information. During integration the node has to adapt its own clock to the global clock (rate and offset) and has to make its cycle time consistent with the global schedule observable at the network. Afterwards, these settings are checked for consistency with all available network nodes. The node can only leave the integration phase and actively participate in communication when these checks are passed.

FIG. 12: State Diagram Time-Triggered Startup

5.5.6.1 ColdStart-Inhibit Mode

In coldstart inhibit mode the node is prevented from initializing the TDMA communication schedule. If the Host has set bit CSI in the SUC Configuration Register 1, the node is not allowed to initialize the cluster communication, i.e. entering the coldstart path is prohibited. The node is allowed to integrate to a running cluster or to transmit Startup frames after another Startup node started the initialization of the cluster communication.

The coldstart inhibit bit CSI can be set in the CONFIG or READY state only. CSI cannot be set after leaving READY state, but can be cleared at any time.

5.5.6.2 Startup Timeouts

The CC maintains two different µT timers supporting two timeout values, Startup timeout and StartupNoise timeout. The two timers are reset when the CC enters the COLDSTART_LISTEN state. The expiration of either of these timers causes the node to leave the initial sensing phase (COLDSTART_LISTEN state) with the intention of starting up communication.

Note: The Startup and StartupNoise timers are identical with the Wakeup and WakeupNoise timers and use the same configuration values from the SUC Configuration Register 2.

Startup Timeout

The Startup timeout limits the listen time used by a node to determine if there is already communication between other nodes or at least one Startup node actively requesting the integration of others.

The Startup timer is configured by programming LT[20:0] (pdListenTimeout) in the SUC Configuration Register 2.

The Startup timer is reset upon:
entering the COLDSTART_LISTEN state
if communication channel activity is detected on one of the configured channels while the node is in the COLDSTART_LISTEN state
as long as the channel status of one of the configured channels is active the timer is continuously reset. The timer resumes counting once the channel idle state is reached for all channels and the node is still in the COLDSTART_LISTEN state.

Once the Startup timeout expires, neither an overflow nor a cyclic restart of the timer is performed. The timer status is kept for further processing by the startup state machine.

StartupNoise Timeout

At the same time the Startup timer is started for the first time (transition from STARTUP_PREPARE state to COLDSTART_LISTEN state), the StartupNoise timer is started. This additional timeout is used to improve reliability of the startup procedure in the presence of noise.

The StartupNoise timer is configured by programming LTN[3:0] (gListenNoise) in the SUC Configuration Register 2.

The StartupNoise timer is reset upon
entering the COLDSTART_LISTEN state
reception of correctly decoded headers or CAS symbols while the node is in COLDSTART_LISTEN state Once the StartupNoise timeout expires, neither an overflow nor a cyclic restart of the timer is performed. The status is kept for further processing by the startup state machine.

Since the StartupNoise timer won't be reset if channel activity is sensed, this timeout defines the fallback solution that guarantees that a node will try to start up the communication cluster even in the presence of noise. On the other hand, by having defined reset conditions, the synchronization of the coldstart entry is still guaranteed.

5.5.6.3 Path of Startup Node Initiating Coldstart

When a Startup node enters COLDSTART_LISTEN, it listens to its attached channels and tries to receive FlexRay frames.

If no communication is detected, the node enters the COLDSTART_COLLISION_RESOLUTION state and commences a coldstart attempt. The initial transmission of a CAS symbol is succeeded by the first regular cycle. This cycle has the number zero.

From cycle zero on, the node transmits its Startup frame. Since each Startup node is allowed to perform a coldstart attempt, it may occur that several nodes simultaneously transmit the CAS symbol and enter the coldstart path. This situation is resolved during the first four cycles after CAS transmission.

As soon as a node that initiates a coldstart attempt receives a CAS symbol or a frame header during these four cycles, it reenters the COLDSTART_LISTEN state. Thereby, only one node remains in this path. In cycle four, other Startup nodes begin to transmit their startup frames.

After four cycles in COLDSTART_COLLISION_RESOLUTION state, the node that initiated the coldstart enters the COLDSTART_CONSISTENCY_CHECK state. It collects all startup frames from cycle four and five and performs the clock correction. If the clock correction does not deliver any errors and it has received at least one valid startup frame pair, the node leaves COLDSTART_CONSISTENCY_CHECK and enters NORMAL_ACTIVE state.

The number of coldstart attempts that a node is allowed to perform is configured by CSA[4:0] in the SUC Configuration Register 1. The number of remaining attempts is reduced by one for each attempted coldstart. A node may enter the COLDSTART_LISTEN state only if this variable is larger than one and it may enter the COLDSTART_COLLISION_RESOLUTION state only if this variable is larger than zero. A value larger than one is required for entering the COLDSTART_LISTEN state, since one coldstart attempt may be used up for performing the collision resolution, in which case the coldstart attempt could fail.

5.5.6.4 Path of Startup Node Integrating

When a Startup node enters the COLDSTART_LISTEN state, it tries to receive a valid pair of Startup frames to derive its schedule and clock correction from it.

As soon as a valid Startup frame has been received the INITIALIZE_SCHEDULE state is entered. If the clock synchronization can successfully receive a matching second valid Startup frame and derive a schedule from this, the INTEGRATION_COLDSTART_CHECK state is entered.

In INTEGRATION_COLDSTART_CHECK state it is assured that the clock correction can be performed correctly and that the Startup node from which this node has initialized its schedule is still available. During the first double-cycle in this state, either two valid Startup frame pairs or the Startup frame pair of the node that this node has integrated on must be received. If at the end of the first double-cycle in this state the integration attempt has not been aborted, the COLDSTART_JOIN state is entered.

In COLDSTART_JOIN state integrating Startup nodes begin to transmit their own Startup frames. Thereby the node that initiated the coldstart and the nodes joining it can check if their schedules agree to each other. If for the following three cycles the clock correction does not signal errors and at least one other Startup node is visible, the node leaves COLDSTART_JOIN state and enters NORMAL_ACTIVE state. Thereby it leaves STARTUP at least one cycle after the node that initiated the coldstart.

5.5.6.5 Path of Non-Startup Node Integrating

When a Non-startup node enters the INTEGRATION_LISTEN state, it listens to its attached channels and tries to receive FlexRay frames.

As soon as a valid Startup frame has been received the INITIALIZE_SCHEDULE state is entered. If the clock synchronization can successfully receive a matching second valid Startup frame and derive a schedule from this, the INTEGRATION_CONSISTENCY_CHECK state is entered.

In INTEGRATION_CONSISTENCY_CHECK state it is verified that the clock correction can be performed correctly and that enough Startup nodes (at least 2) send startup frames that agree to the nodes own schedule. After receiving valid Startup frame pairs for two consecutive double-cycles from at least two Startup nodes, the node leaves INTEGRATION_CONSISTENCY_CHECK state and enters NORMAL_ACTIVE state or NORMAL_PASSIVE state. Thereby, it leaves STARTUP at least two cycles after the node that initiated the coldstart. That means that all nodes of the cluster can leave STARTUP at the end of cycle 7, just before entering cycle 8.

5.5.7 NORMAL_ACTIVE State

As soon as the node that transmitted the first CAS symbol (resolving the potential access conflict and entering STARTUP via coldstart path) and one additional node have entered the NORMAL_ACTIVE state, the startup phase for the cluster has finished. In the NORMAL_ACTIVE state, all configured messages are scheduled for transmission. This includes all data frames as well as the Sync frames. Rate and offset measurement is started in all even cycles (even/odd cycle pairs required).

In NORMAL_ACTIVE state the CC supports regular communication functions
- The CC performs transmissions and reception on the FlexRay bus as configured
- Clock synchronization is running
- The Host Interface is operational
- The CC exits from that state
- To the HALT state by writing CMD[3:0]="0110" (HALT command)
- To the HALT state by writing CMD[3:0]="0111" (FREEZE command)
- To HALT state due to change of the error state from ACTIVE to COMM_HALT
- To NORMAL_PASSIVE state due to change of the error state from ACTIVE to PASSIVE
- To READY state by writing CMD[3:0]="0010" (READY command)

5.5.8 NORMAL_PASSIVE State

NORMAL_PASSIVE state is entered from NORMAL_ACTIVE state when the error state changes from ACTIVE (green) to PASSIVE (yellow).

In NORMAL_PASSIVE state, the node is able to receive all frames (node is fully synchronized and performs the clock synchronization). In comparison to the NORMAL_ACTIVE state the node does not actively participate in communication, i.e. neither symbols nor frames are transmitted.

In NORMAL_PASSIVE state
- The CC performs reception on the FlexRay bus if configured
- The CC does not transmit any frames on the FlexRay bus
- Clock synchronization is running
- The Host interface is operational
- The CC exits from this state
- To the HALT state by writing CMD[3:0]="0110" (HALT command)
- To the HALT state by writing CMD[3:0]="0111" (FREEZE command)
- To HALT state due to change of the error state from ACTIVE or PASSIVE to COMM_HALT
- To NORMAL_ACTIVE state due to change of the error state from PASSIVE to ACTIVE. The transition takes place when PTAC[4:0] from the CC Status and Error Vector register equals PTA[4:0] as defined in the SUC Configuration Register 1.
- To READY state by writing CMD[3:0]="0010" (READY command)

5.5.9 HALT State

When the Host writes CMD[3:0]="0110" (HALT command) in the SUC Configuration Register to '1', the CC enters HALT state after the current communication cycle has finished.

When the Host writes CMD[3:0]="0111" (FREEZE command) in the SUC Configuration Register to '1', the CC enters HALT state immediately and sets the FSI bit in the CC Status and Error Vector register.

In this state all communication (reception and transmission) is stopped and the Host is allowed to bring the CC into a power saving mode by halting all internal clocks.

When the CC transits from HALT state to CONFIG state all configuration and status data is maintained for analyzing purposes. Before leaving CONFIG state the Host has to restore a fault-free configuration. All internal counters and the CC status flags are reset when the CC transits from CONFIG to READY state.

Note: Status data stored in the Message RAM is not affected by a hardware reset or by the transition of the POC from CONFIG to READY state.

5.6 Network Management

The Network Management (NM) vector is located in the Network Management Register 1..3. The CC performs a logical OR operation over all NM vectors out of all received valid NM frames with the NM Indication Bit set. The CC updates the NM vector at the end of each cycle.

The length of the NM vector can be configured from 0 to 12 bytes by NML[3:0] in the NEM Configuration Register. The NM vector length must be configured identically in all nodes of a cluster.

To configure a transmit buffer to send FlexRay frames with the NM Indication Bit set, the NME bit in the header section of the respective transmit buffer has to be set. In addition the Host has to write the NM information to the data section of the transmit buffer.

The evaluation of the NM vector has to be done by the application running on the Host.

5.7 Filtering and Masking

Frame filtering is done by checking specific fields in a valid frame against corresponding configuration constants of the valid message buffers. A frame is only processed further if the required matches occur. Otherwise, it is discarded.

Frames are filtered on the following frame fields:
- Channel ID
- Frame ID
- Cycle Counter 5.7.1 Filtering Mechanisms The filtering mechanisms described below are applied differently for receive buffers, FIFO buffers, and transmit buffers.

Receive Buffers, FIFO Buffers

The following filter combinations for acceptance filtering are allowed:
- Frame ID+Channel ID
- Frame ID+Channel ID+Cycle Counter Cycle Counter filtering is controlled by bit CF in the SUC Configuration Register 1:
- CF='0': Cycle Counter filtering disabled, default
- CF='1': Cycle Counter filtering enabled The CF bit must be configured identically for all nodes in a cluster.

In order to store a received message all configured filters must match.

Transmit Buffers

The following filter combinations are allowed:
- Frame ID+Channel ID
- Frame ID+Channel ID+Cycle Counter A message will be transmitted in the time slot corresponding to the configured frame ID on the configured channel(s). If cycle counter filtering is enabled the configured cycle filter value must also match. If cycle counter filtering is disabled there must be no transmit buffers with the same frame ID configured.

5.7.2 Channel ID Filtering

There is a 2-bit channel filtering field (CHA, CHB) located in the header section of each message buffer in the Message RAM. It serves as a filter for receive buffers, and as a control field for transmit buffers (see table 15).

Receive Buffers

Valid received frames are stored if they are received on the channels specified in the channel filtering field. In static segment only one receive buffer has to be setup for reception on both channels (CHA and CHB set). Other filtering criteria must also be met. If a received frame was accepted and stored in a receive buffer, the respective New Data flag in the New Data Register is set (ND='1'). In addition the RXI flag in the Status Interrupt Register is set to '1', and an interrupt is generated if enabled.

Transmit Buffers

The content of the buffer is transmitted only on the channels specified in the channel filtering field when the cycle counter filtering and frame ID filtering criteria are also met. In static segment only one transmit buffer has to be setup for transmission on both channels (CHA and CHB set). In addition the TXI flag in the Status Interrupt Register is set to '1', and an interrupt is generated if enabled.

TABLE 15

Channel filtering configuration

| CHA | CHB | Transmit Buffer transmit frame | Receive Buffer store valid receive frame |
|---|---|---|---|
| 1 | 1 | on both channels (static segment only) | received on channel A or B (static segment only, pick first valid) |
| 1 | 0 | on channel A | received on channel A |
| 0 | 1 | on channel B | received on channel B |
| 0 | 0 | no transmission | ignore frame |

5.7.3 Frame ID Filtering

Every transmit and dedicated receive buffer contains a frame ID stored in the header section. This frame ID is used differently for receive and transmit buffers.

Receive Buffers

A received message is stored in the first receive buffer where the received frame ID matches the configured frame ID, provided channel ID and cycle counter criteria are also met.

Transmit Buffers

For transmit buffers the configured frame ID is used to determine the appropriate slot for message transmission. The frame will be transmitted in the time slot corresponding to the configured frame ID, provided channel ID and cycle counter criteria are also met.

5.7.4 Cycle Counter Filtering

Cycle counter filtering is based on the notion of a cycle set. For filtering purposes, a match is detected if any one of the elements of the cycle set is matched. The cycle set is defined by the cycle code field in the header section of each message buffer.

The set of cycle numbers belonging to a cycle set is determined as described in table 16.

TABLE 16

Definition of cycle set

| Cycle Code | Matching Cycle Counter Values |
|---|---|
| 0b000000x | all Cycles |
| 0b000001c | every second Cycle at (Cycle Count)mod2 = c |
| 0b00001cc | every fourth Cycle at (Cycle Count)mod4 = cc |
| 0b0001ccc | every eighth Cycle at (Cycle Count)mod8 = ccc |
| 0b001cccc | every sixteenth Cycle at (Cycle Count)mod16 = cccc |
| 0b01ccccc | every thirty-second Cycle at (Cycle Count)mod32 = ccccc |
| 0b1cccccc | every sixty-fourth Cycle at (Cycle Count)mod64 = cccccc |

Table 17 below gives some examples for valid cycle sets to be used for cycle counter filtering:

TABLE 17

Examples for valid cycle sets

| Cycle Code | Matching Cycle Counter Values |
|---|---|
| 0b0000011 | 1-3-5-7-....-63 ↵ |
| 0b0000100 | 0-4-8-12-....-60 ↵ |
| 0b0001110 | 6-14-22-30-....-62 ↵ |
| 0b0011000 | 8-24-40-56 ↵ |
| 0b0100011 | 3-35 ↵ |
| 0b1001001 | 9 ↵ |

Receive Buffers

The received message is stored only if the received cycle counter matches an element of the receive buffer's cycle set. Channel ID and frame ID criteria must also be met.

Transmit Buffers

The content of the buffer is transmitted on the configured channels when an element of the cycle set matches the current cycle counter value and the frame ID matches the slot counter value.

5.7.5 FIFO Filtering

For FIFO filtering there is one Rejection Filter and one Rejection Filter Mask available. The FIFO Rejection Filter consists of 20 bits for Channel (2 bits), Frame ID (11 bits), and Cycle Code (7 bits). Both registers can be configured in CONFIG state only. The filter configuration in the header sections of the message buffers belonging to the FIFO buffer is ignored.

A valid received frame is stored in the next free FIFO buffer if channel ID, frame ID, and cycle counter are not rejected by the configured Rejection Filter and Rejection Filter Mask, and if there is no matching dedicated receive buffer.

5.8 Transmit Process 5.8.1 Transmit Buffers

A part of the message buffers can be configured as transmit buffers by programming bit CFG in the header section of the respective message buffer to '1'. This can be done via the Write Header Section 1 register.

There exist the following possibilities for transmission of a message buffer:
Static segment: channel A or channel B, channel A and channel B
Dynamic segment: channel A or channel B The message buffer that holds the frame ID configured by SFID[9:0] in the Message Handler Configuration Register 2 is dedicated to hold the Startup/Sync frame if the node is a Startup/Sync node (as configured by TXST and TXSY in the SUC Configuration Register 1). It can be reconfigured only in CONFIG state. This ensures that any node transmits at most one Startup/Sync frame per communication cycle. Transmission of Startup/Sync frames from other message buffers is not possible. For Startup/Sync frames, the Sync Bit, Startup Frame Indicator, Sync Frame ID, Payload Length and the corresponding Header CRC can be changed only in CONFIG state.

It is not allowed to configure two or more Transmit Buffers with the same frame ID and cycle counter filter value.

For transmit frames in the dynamic segment reconfigurable message buffers can be used. Frame ID, cycle filter, channel filter, and Header CRC are reconfigurable during runtime. Due to the organization of the data section in the Message RAM (reference by data pointer), the Payload Length may only be shortenend with respect to the value configured in CONFIG state.

The CC does not have the capability to calculate the Header CRC. The Host is supposed to provide the Header CRC's for all transmitted frames. If network management is required the Host has to set the NME bit in the header section of the respective message buffer to '1'. This can be done via the Write Header Section 1 register.

The length field in all messages (static and dynamic) reflects the frame payload data length as defined in the FlexRay frame format. The CC may use transmit buffer structures shorter than the actual configured data frame length in the static segment. In this case, the CC generates padding bytes to ensure that frames have proper physical length. The padding pattern is logical zero. The padding function applies only to frames to be transmitted in the static segment.

Each transmit buffer provides a Transmission Mode flag TXM that allows the Host to configure the transmission mode for the transmit buffer in the static segment. If this bit is set, the transmitter operates in the single-shot mode. If this bit is cleared, the transmitter operates in the continuous mode.

The Host CPU explicitly sets the Transmission Request flag TXR when a transmit buffer has been updated and is ready for transmission. In single-shot mode the CC resets the TXR flag after transmission has been completed. Now the Host may update the transmit buffer with the next message. The CC does not transmit the message out of the transmit buffer before the Host has indicated that the update is completed by setting the Transmission Request flag TXR again. The Host CPU can check the actual state of the TXR flags of all message buffers by reading the Transmission Request Registers.

5.8.2 Null Frame Transmission

If a message buffer is configured in "single-shot mode", the configured frame is sent out by the transmitter only once after the Host has set the Transmission Request flag TXR. After transmission the TXR flag is reset by the CC. If in static segment the Host does not set the Transmission Request flag before transmit time and if there is no other Transmit Buffer with matching Frame ID and cycle counter filter, the CC transmits a Null Frame with the Null Frame Indication bit set and the payload data set to zero.

If a message buffer is configured in the "continuous mode", the CC does not reset the Transmission Request flag TXR after transmission. If the Transmission Request flag is set, the frame is sent out each time the frame ID and cycle counter filter match. If in static segment the Host clears the Transmission Request flag, the CC transmits a Null Frame with the Null Frame Indication bit set and the payload data zero in the respective slot.

In the following cases the CC transmits a Null Frame with the Null Frame Indication bit set, and the rest of the frame header and the frame length unchanged:
  all Transmit Buffers configured for the slot having cycle filters that do not match the current cycle
  there are matching frame IDs and cycle counters, but none of these transmit buffers have the Transmission Request flag TXR set
  Null Frames are not transmitted in the dynamic segment.

5.8.3 Static Segment

For the static segment, if there are several messages pending for transmission, the message with the frame ID corresponding to the next sending slot is selected for transmission. The data section of transmit buffers assigned to the static segment can be updated until one slot before the sending slot of the buffer.

5.8.4 Dynamic Segment

In the dynamic segment, if several messages are pending, the message with the highest priority (lowest frame ID) is selected next. Only frame IDs which are higher than the largest static frame ID are allowed for the dynamic segment.

In the dynamic segment different minislot sequences are possible (concurrent sending of different frame IDs on both channels). Therefore pending messages are selected according to their frame ID and their channel configuration bit.

The Start of Latest Transmit configured by SLT[12:0] in the MHD Configuration Register 1 defines the maximum minislot value allowed before inhibiting new frame transmission in the dynamic segment of the cycle.

The frame IDs of all active transmit buffers (TXR='1') are unchangeable until these buffers have been transmitted (TXR='0'). This will prevent the changing of a message buffer's frame ID while it is waiting to be transmitted. After successful transmission the Transmit Interrupt flag in the Status Interrupt Register is set (TXI='1').

5.8.5 Frame Transmission

To prepare a transmit buffer for transmission the following steps are required:
  Configure the message buffer as transmit buffer by writing a '1' to the CFG bit in the Write Header Section 1 register
  Write transmit message (header and data section) to the Input Buffer.
  To transfer a transmit message from Input Buffer to the Message RAM proceed as described in section 5.11.1.1 Data Transfer Input Buffer→Message RAM.
  If configured in the Input Buffer Command Mask register the Transmission Request flag for the respective message buffer will be set as soon as the transfer has completed, and the message buffer is ready for transmission.
  Check whether the message buffer has been transmitted by checking the TXR bits (TXR='0') in the Transmission Request Register 1,2

Note: (Re)configuration of the header section for static message buffers is only allowed in CONFIG state.

5.9 Receive Process 5.9.1 Receive Buffers

A portion of the E-Ray message buffers can be configured as dedicated receive buffers by programming bit CFG in the header section of the respective message buffer to '0'.

There exist the following possibilities to assign a receive buffer to the CC channels:
  Static segment: channel A or channel B, channel A and channel B (pick first valid)
  Dynamic segment: channel A or channel B The CC transfers only valid received messages from the shift registers of the FlexRay protocol controllers (channel A or B) to the dedicated receive buffer with the matching filter configuration. A receive buffer is able to store all frame elements except the frame CRC. The payload length information presented to the Host reflects the length updated from the received payload length code.

If no frame or a corrupted frame is received in a slot, the message buffer contents prior to the reception is maintained. The flags in the Message Buffer Status register signal the cause of the problem.

The New Data flag ND in the New Data Register 1,2 indicates that the CC has updated the respective receive buffer since the last read (ND='1'). When the received message is transferred from the Message RAM to the Output Buffer, the New Data flag is cleared (ND='0') by the Message Handler.

The Host does not have write access to the configuration data of static receive buffers stored in the header section of the message buffer in NORMAL_ACTIVE or NORMAL_PASSIVE operation state. The Host has write access to the header section of static receive buffers only in CONFIG state.

5.9.2 Null Frame Reception

The payload of a received Null Frame is not copied into the matching receive buffer. The reception of a Null Frame is indicated by the Null Frame Indication bit NFI='0' in the header section 3 of the respective message buffer.

5.9.3 Frame Reception

To prepare or change a message buffer for reception the following steps in CONFIG state are required (dynamic receive buffers may also be (re)configured in NORMAL_ACTIVE or NORMAL_PASSIVE state):

Configure the message buffer as receive buffer by writing a '0' to the CFG bit in the Write Header Section 1 register Configure the receive buffer by writing the configuration (header section) data to the Input Buffer Transfer the configuration from Input Buffer to the Message RAM by writing the number of the target message buffer to the Input Buffer Command Request register.

Once these steps are performed, the message buffer functions as an active receive buffer and participates in the internal matching process, which takes place every time the CC receives a valid message. The received message is stored into the first matching receive buffer. If the buffer holds an unprocessed message (ND='1') it is overwritten with the new message and the MLST bit in the respective Message Buffer Status register is set.

The respective New Data flag ND in the New Data Register 1,2 is set every time the buffer is updated and, if enabled, a receive interrupt is generated.

To read a receive buffer from the Message RAM via the Output Buffer proceed as described in section 5.11.1.2 Data Transfer Message RAM→Output Buffer.

Note: The ND flag will automatically be cleared by the Message Handler when the received message has been transferred to the Output Buffer.

5.10 FIFO Buffer Function

5.10.1 Description

A group of the message buffers can be configured as a cyclic First-In-First-Out (FIFO) buffer. The group of FIFO buffers is contiguous in the register map starting with the message buffer referenced by FFB[6:0] and ending with the message buffer referenced by LCB[6:0] in the Message RAM Configuration register. Between 2 and 64 message buffers can be assigned to the FIFO buffer system.

Every valid incoming message not matching with any dedicated receive buffer but matching the programmable FIFO filter is stored into the FIFO buffer system. In this case frame ID, payload length, receive cycle count, and the status bits of the addressed FIFO buffer are overwritten with frame ID, payload length, receive cycle count, and the status from the received message and can be read by the Host for message identification. Bit RFNE in the Interrupt Status Register shows that the FIFO buffer system is not empty, bit RFO in the Interrupt Status Register shows that a FIFO buffer system overrun has been detected. If enabled, interrupts are generated.

There are two index registers associated with the FIFO buffer system. The PUT Index Register (PIDX) is an index to the next available location in the FIFO buffer system. When a new message has been received it is written into the message buffer addressed by the PIDX register. The PIDX register is then incremented and addresses the next available message buffer. If the PIDX register is incremented past the highest numbered FIFO buffer the PIDX register is loaded with the number of the first (lowest numbered) message buffer in the FIFO chain. The GET Index. Register (GIDX) is used to address the next FIFO buffer to be read. The GIDX register is incremented after transfer of the contents of a FIFO buffer to the Output Buffer.

The FIFO buffer system is completely filled when the PUT index (PIDX) reaches the value of the GET index (GIDX). When the next message is written to the FIFO buffer before the oldest message has been read, both PUT index and GET index are incremented and the new message overwrites the oldest message in the FIFO buffer. This will set FIFO buffer overrun flag RFO in the Status Interrupt Register.

FIG. 13: FIFO Buffer Status: Empty, not Empty, Overrun

A FIFO buffer non empty status is detected when the PUT index (PIDX) differs from the GET index (GIDX). In this case flag RFNE is set. This indicates that there is at least one received message in the FIFO buffer system. The PUT Index Register and the GET Index Register are not accessible by the Host CPU. The FIFO buffer empty, FIFO buffer not empty, and the FIFO buffer overrun states are explained in FIG. 13 for a three buffer FIFO buffer system.

There is a programmable FIFO Rejection Filter for the FIFO buffer system. The FIFO Rejection Filter Register (FRF) defines a filter pattern for messages to be rejected. The FIFO Rejection Filter consists of channel filter, frame ID filter, and cycle filter. If bit RSS is set to '1' (default), all message received in the static segment are rejected by the FIFO buffer system. The FIFO Rejection Filter Mask Register (FRFM) specifies which of the corresponding bits in the FIFO Rejection Filter are marked 'don't care' for rejection filtering.

5.10.2 Configuration of the FIFO Buffer

For all message buffers belonging to the FIFO buffer system the Data Pointer to the first 32-bit word of the data section of the respective message buffer in the Message RAM has to be configured via the Write Header Section 3 register. All information required for acceptance filtering is taken from the FIFO Rejection Filter and the FIFO Rejection Filter Mask and needs not be configured in the header sections of the message buffers belonging to the FIFO buffer.

When programming the data pointers for the message buffers belonging to the FIFO buffer system the payload length of all message buffers has to be programmed to the value defined by DLF[6:0] in the Message RAM Configuration register.

Note: If the payload length of a received frame is longer than the value programmed by DLF[6:0] the data field stored in a message buffer of the FIFO Buffer system is truncated to that length.

5.10.3 Access to the FIFO Buffer

To read from the FIFO buffer system the Host has to trigger a transfer from the Message RAM to the Output Buffer by writing the number of the first message buffer of the FIFO Buffer (referenced by FFB[6:0]) to the Output Buffer Command Request register. The Message Handler then transfers the message buffer addressed by the GET Index Register (GIDX) to the Output Buffer. After this transfer the GET Index Register (GIDX) is incremented.

5.11 Message Handling

The Message Handler controls data transfers between the Input/Output Buffer and the Message RAM and between the Message RAM and the two Transient Buffer RAMs. All accesses to the internal RAM's are 32+1 bit accesses.

Access to the message buffers stored in the Message RAM is done under control of the Message Handler state machine. This avoids conflicts between accesses of the two protocol controllers and the Host CPU to the Message RAM.

The message buffers assigned to the static segment have to be configured in that way that message buffer 0 is configured with the lowest frame ID while the last message buffer configured for the static segment holds the highest frame ID. The frame IDs in between have to be ordered in an ascending sequence.

Frame IDs of message buffers assigned to the static segment have to be in the range from 1 to NSS[9:0] as configured in the GTU Configuration Register 7. Frame IDs of message buffers assigned to the dynamic segment have to be in the range from NSS[9:0]+1 to 2047.

In case the Message Handler detects a mismatch between message buffer number and the sequence of the configured frame IDs (message buffer holds frame ID with lower number than previous message buffer) for a static message buffer, or that a frame ID belonging to the static segment is assigned to a dynamic message buffer, or a frame ID from the dynamic segment is assigned to a static message buffer, the Message Handler will set the Slot Configuration Error flag SCE in the Error Interrupt Register. This will generate an error interrupt if enabled.

Received messages with no matching dedicated receive buffer (static or dynamic segment) are stored in the Receive FIFO (if configured) if they pass the FIFO rejection filter.

In RAM Test Mode the Message Handler is bypassed and all internal RAM blocks can directly be accessed via the Host interface (see section 4.3 Special Registers).

5.11.1 Input/Output Buffer<->Message RAM

The message transfer between Input Buffer and Message RAM as well as between Message RAM and Output Buffer is triggered by the Host CPU by writing the number of the target/source message buffer to be accessed to the Input or Output Buffer Command Request register.

The Input/Output Buffer Command Mask registers can be used to write/read header and data section of the selected message buffer separately thereby reducing the time for data transfers between Input/Output Buffer and Message RAM. If bit STXR in the Input Buffer Command Mask register is set (STXR='1'), the transmission request flag of the selected message buffer is automatically set after the message buffer has been updated.

The Input Buffer and the Output Buffer are build up as a double buffer structure. One half of this double buffer structure is accessible by the Host CPU, while the other half (shadow buffer) is accessed by the Message Handler for data transfers between Message RAM and Input/Output Buffer.

FIG. 14: CPU Access to Message Buffers 5.11.1.1 Data Transfer Input Buffer→Message RAM When the Host writes the number of a target message buffer in the Message RAM to IBRH[5:0] in the Input Buffer Command Request register, IBF and IBF Shadow are swapped. In addition the message buffer numbers stored under IBRH[5:0] and IBRS[5:0] are also swapped (see FIG. 15).

FIG. 15: Double Buffer Structure Input Buffer

With this write operation the IBSYS bit in the Input Buffer Command Request register is set to '1'. The Message Handler then starts to transfer the contents of IBF Shadow to the message buffer in the Message RAM selected by IBRS[5:0].

While the Message Handler transfers the data from IBF Shadow to the target message buffer in the Message RAM, the Host may configure the next message in the IBF. After the transfer between IBF Shadow and the Message RAM has completed, the IBSYS bit is set back to '0' and the next transfer to the Message RAM may be started by the Host by writing the respective target message buffer number to IBRH [5:0].

If a write access to IBRH[5:0] occurs while IBSYS is '1', IBSYH is set to '1'. After completion of the ongoing data transfer from IBF Shadow to the Message RAM, IBF and IBF Shadow are swapped, IBSYH is reset to '0', IBSYS remains set to '1', and the next transfer to the Message RAM is started.

In addition the message buffer numbers stored under IBRH [5:0] and IBRS[5:0] are also swapped Example of a 8/16-Bit Host Access Sequence:
Write 1st message to IBF
  Request data transfer to target message buffer: write IBRH[5:0]
Write 2nd message to IBF
  Request data transfer to target message buffer: write IBRH[5:0] after IBSYS is reset Write 3rd message to IBF
. . .

TABLE 18

Assignment of Input Command Request register bits

| Position | Access | Bit | Function |
|---|---|---|---|
| 31 | r | IBSYS | IBF Shadow Busy, signals ongoing transfer from IBF to Message RAM |
| 21 . . . 16 | r | IBRS[5:0] | IBF Shadow, number of message buffer currently/last updated |
| 15 | r | IBSYH | IBF Busy, transfer request pending for message buffer referenced by IBRH[5:0] |
| 5 . . . 0 | r/w | IBRH[5:0] | IBF, number of message buffer to be updated next |

5.11.1.2 Data Transfer Message RAM→Output Buffer

The message buffer selected by OBRS[5:0] in the Output Buffer Command Request register is transferred from the Message RAM to the Output Buffer Shadow as soon as the Host has set REQ to '1'. Bit REQ can only be set to '1' while OBSYS is '0'.

FIG. 16: Double Buffer Structure Output Buffer

After setting REQ to '1', OBSYS is set to '1', and the transfer of the message buffer selected by OBRS[5:0] from the Message RAM to OBF Shadow is started. After the transfer between the Message RAM and OBF Shadow has completed, the OBSYS bit is set back to '0'.

By setting VIEW to '1' while OBSYS is '0', OBF and OBF Shadow are swapped. Now the Host can read the transferred message buffer from OBF while the Message Handler may transfer the next message from the Message RAM to OBF Shadow.

Example of a 8-Bit Host Access Sequence:
Select 1st message buffer: write OBRS[5:0]
Request transfer of 1st message buffer: write REQ
  Wait until OBSYS is reset
Select 2nd message buffer: write OBRS[5:0] (may also be set while OBSYS='1')
View 1st message and request transfer of 2nd message buffer: write VIEW, REQ
  Read out 1st message
  Wait until OBSYS is reset
Select 3rd message buffer: write OBRS[5:0]
View 2nd message and request transfer of 3rd message buffer: write VIEW, REQ
  Read out 2nd message
  Wait until OBSYS is reset

. . .

View n-th message: write VIEW
  Read out nth message
Example of a 16-Bit Host Access Sequence:
Select and request transfer of 1st message buffer: write OBRS[5:0], REQ
  Wait until OBSYS is reset
View 1st message, select and request transfer of 2nd message buffer:
write VIEW, REQ, OBRS[5:0]
  Read out 1st message
  Wait until OBSYS is reset
View 2nd message, select and request transfer of 3rd message buffer:
write VIEW, REQ, OBRS[5:0]

Read out 2nd message
Wait until OBSYS is reset
...
View n-th message:
write VIEW (OBRS[5:0] not evaluated)
Read out n-th message

TABLE 19

Assignment of Input Command Request register bits

| Position | Access | Bit | Function |
|---|---|---|---|
| 21 ... 16 | r | OBRH[5:0] | OBF, number of message buffer available for Host access |
| 15 | r | OBSYS | OBF Shadow Busy, signals ongoing transfer from Message RAM to OBF |
| 9 | r/w | REQ | Request Transfer from Message RAM to OBF |
| 8 | r/w | VIEW | View OBF Shadow, swap OBF Shadow and OBF |
| 5 ... 0 | r/w | OBRS[5:0] | OBF Shadow, number of message buffer for next request |

5.11.2 FlexRay Protocol Controllers<->Message RAM

The two Transient Buffer RAMs are used to buffer the data for transfer between the two FlexRay Protocol Controllers and the Message RAM.

Each Transient Buffer RAM is build up as a double buffer able to store two complete FlexRay messages. There is always one buffer assigned to the corresponding Protocol Controller while the other one is accessible by the Message Handler.

If e.g. the Message Handler writes the next message to be send to Transient Buffer β, the FlexRay Protocol Controller can access Transient Buffer α to store the message it is actually receiving. After reception has completed the Message Handler swaps the two buffers. Now the FlexRay Protocol Controller can load its shift register from Transient Buffer β and transmit the new message loaded by the Message Handler while the Message Handler has access to Transient Buffer α. During transmission of the message stored in Transient Buffer β the Message Handler transfers the last received message stored in Transient Buffer α to the Message RAM (if it passes acceptance filtering) and updates the respective message buffer.

Data transfers between the Transient Buffer RAMs and the shift registers of the FlexRay Protocol Controllers are done in portions of 32 bit. This enables the use of a 32 bit shift register independent of the length of the FlexRay messages.

FIG. 17: Access to Transient Buffer RAMs 5.12 Message RAM

To avoid conflicts between Host access to the Message RAM and FlexRay message reception/transmission, the Host CPU cannot directly access the message buffers in the Message RAM. These accesses are handled via the Input and Output Buffers. The Message RAM is able to store up to 64 message buffers.

The Message RAM is organized 1152×33=38,016 bit. Each 32-bit word is protected by a parity bit. To achieve the required flexibility with respect to different numbers of data bytes per FlexRay frame (0..254), the Message RAM has a structure as shown in FIG. 18.

FIG. 18: Structure of Message RAM
Header Section
Stores header segments of FlexRay frames:
supports a maximum of 64 message buffers
each message buffer has a header of four 32-bit words
11-bit pointer to data section
Data Section
Flexible storage of payload segments with different length.
Some maximum values are:
16 message buffers with 254 byte data each
or 32 message buffers with 128 byte data each
or 64 message buffers with 56 byte data each
Restriction: header section+data section may not occupy more than 1,152 32-bit words.

5.12.1 Header Section

The header of each message buffer occupies four 32-bit words in the header section of the Message RAM. The header of message buffer 0 starts with the first word in the Message RAM.

For transmit buffers the Header CRC has to be calculated by the Host CPU. The Data Pointer has to be calculated by the programmer to define the starting point of the data section for the respective message buffer in the data section of the Message RAM.

Receive Cycle Count, Received on Channel Indication (RCI), Startup Frame Indication bit (SFI), Sync bit (SYN), Null Frame Indication bit (NFI), Payload Preamble Indication bit (PPI), and Reserved bit (RES) are only updated from received valid frames.

The elements used for configuration of a message buffer are stored in the header section of the Message RAM as listed in table 20 below. For static message buffers and FIFO Buffers (re)configuration is possible in CONFIG state only.

TABLE 20

Header section of a message buffer in the Message RAM

| Bit Word | 32 | 31 30 29 28 27 26 25 24 23 22 | 21 20 19 18 17 16 15 14 13 12 11 | 10 9 8 7 6 5 4 3 2 1 0 |
|---|---|---|---|---|
| 1 | P | MBI TXM NMF CCFH CCHA | Cycle Code | Frame ID |
| 2 | P | Payload Length Received | Payload Length Configured | TX: Header CRC Configured RX: Header CRC Received |
| 3 | P | REPS PFI NSYN SFY RCFI | Receive Cycle Count | Data Pointer |
| 4 | P | | | MLSET PLLRE VFRB VFRB TCIO SCVB SCVB CEOB SEOB SEOB |
| ... | P | | ... | |
| ... | P | | ... | |

TABLE 20-continued

Header section of a message buffer in the Message RAM

- Frame Configuration
- Filter Configuration
- Message Buffer Control
- Message RAM Configuration
- Updated from received Frame
- Transmit/Receive Status
- Parity Bit
- reserved Header 1
Frame ID—slot counter filtering configuration
Cycle Code—cycle counter filtering configuration
CHA, CHA—channel filtering configuration
CFG—message buffer configuration: receive/transmit
NME—Network Management/Message ID enable
TXM—transmit mode configuration: single-shot/continous
MBI—message buffer receive/transmit interrupt enable
Header 2
Header CRC—Transmit Buffer: Updated by the Host (calculated from frame header segment)
  Receive Buffer: Updated from received frame
Payload Length Configured—length of data field (number of 2-byte words) as configured by the Host
Payload Length Received—length of data field (number of 2-byte words) from received frame
Header 3
Data Pointer—pointer to the beginning of the corresponding data field in the data section
Only valid for receive buffers, updated from received frames:
  Receive Cycle Count—cycle count for received frame
  RCI—Received on Channel Indication
  SFI—Startup frame indication bit
  SYN—Sync frame indication bit
  NFI—Null Frame indication bit
  PPI—Payload Preamble Indicator
  RES—Reserved Bit Status
Header 4
Transmit and Receive Buffers:
  SEOA—Syntax Error observed on channel A
  SEOB—Syntax Error observed on channel B
  CEOA—Content Error observed on channel A
  CEOB—Content Error observed on channel B
  SVOA—Slot Boundary Violation observed on channel A
  SVOB—Slot Boundary Violation observed on channel B
  DCE—Data Consistency Error
Transmit Buffers:
  TCIA—Transmission Conflict Indication channel A
  TCIB—Transmission Conflict Indication channel B
  VFRA—Valid Frame Received on channel A
  VFRB—Valid Frame Received on channel B
Receive Buffers:
  PLE—Payload Length Error
  MLST—Message Lost 5.12.2 Data Section The data section of the Message RAM stores the data fields of the message buffers configured for reception/transmission as defined in the header section. The number of data bytes for each message buffer can vary from 0 to 254. To optimize the data transfer between the shift registers of the two FlexRay Protocol Controllers and the Message RAM as well as between the Host interface and the Message RAM, the physical width of the Message RAM is set to 4 bytes plus one parity bit.

The data field of message buffer 0 starts after the last word of the header section. The data fields of the configured message buffers are stored in the Message RAM as shown in table 21 below.

The begin of the data field attached to a message buffer configured in the header section is referenced by a pointer DP[10:0] to the start address in the Message RAM. This enables a flexible usage of the available RAM space for storage of message buffers with different data length. If a message buffer uses only 16 bit of a 32-bit data word, the remaining 16 bits are unused.

When configuring the message buffers in the Message RAM the programmer has to assure that the data section does not overwrite parts of the header section. The programmer also has to ensure that the data fields of the configured message buffers are located on different addresses in the Message RAM.

TABLE 21

Storage of data section of the message buffers in Message RAM

| | | | | | | | Bit | | | | | | | | | | |
|---|---|---|---|---|---|---|---|---|---|---|---|---|---|---|---|---|---|
| Word | 32 | 31 | 30 | 29 | 28 | 27 | 26 | 25 | 24 | 23 | 22 | 21 | 20 | 19 | 18 | 17 | 16 |
| ... | | P | | | MB0 Data2 | | | | | | | | MB0 Data2 | | | | |
| ... | | P | | | unused | | | | | | | | unused | | | | |
| ... | | P | | | MB1 Data3 | | | | | | | | MB1 Data2 | | | | |
| ... | | P | | | ... | | | | | | | | ... | | | | |
| ... | | P | | | MB1 Data(k) | | | | | | | | MB1 Data(k-1) | | | | |
| ... | | P | | | ... | | | | | | | | ... | | | | |
| ... | | P | | | ... | | | | | | | | ... | | | | |
| ... | | P | | | ... | | | | | | | | ... | | | | |
| ... | | P | | | MBn Data2 | | | | | | | | MBn Data2 | | | | |
| ... | | P | | | ... | | | | | | | | ... | | | | |

TABLE 21-continued

Storage of data section of the message buffers in Message RAM

| | | | | | | | | | | | | | | | | | |
|---|---|---|---|---|---|---|---|---|---|---|---|---|---|---|---|---|---|
| 1151 | P | | | | ... | | | | | | | ... | | | | | |
| 1152 | P | | | MBn Data(m) | | | | | | | MBn Data(m-1) | | | | | | |

| | Bit |
|---|---|

| Word | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| ... | | | | MB0 Data1 | | | | | | | | MB0 Data0 | | | | |
| ... | | | | MB0 Data5 | | | | | | | | MB0 Data4 | | | | |
| ... | | | | MB1 Data1 | | | | | | | | MB1 Data0 | | | | |
| ... | | | | ... | | | | | | | | ... | | | | |
| ... | | | | MB1 Data(k-2) | | | | | | | | MB1 Data(k-3) | | | | |
| ... | | | | ... | | | | | | | | ... | | | | |
| ... | | | | ... | | | | | | | | ... | | | | |
| ... | | | | ... | | | | | | | | ... | | | | |
| ... | | | | MBn Data1 | | | | | | | | MBn Data0 | | | | |
| ... | | | | ... | | | | | | | | ... | | | | |
| 1151 | | | | ... | | | | | | | | ... | | | | |
| 1152 | | | | MBn Data(m-2) | | | | | | | | MBn Data(m-3) | | | | |

TX: Host RD/WR
RX: Host RD

5.12.3 Parity Check

There is a parity checking mechanism implemented in the E-Ray module to assure the integrity of the data stored in the seven RAM blocks of the module. The RAM blocks have a parity generator/checker attached as shown in FIG. 19. When data is written to a RAM block, the local parity generator generates the parity bit. The E-Ray module uses an even parity (with an even number of one's in the 32-bit data word a zero parity bit is generated). The parity bit is stored together with the respective data word. The parity is checked each time a data word is read from any of the RAM blocks. The module internal data busses have a width of 32 bits.

If a parity error is detected, the respective error flag is set in the Message Handler Status register. There is one additional error flag located in the Error Interrupt Register that combines these single error flags.

FIG. 19 shows the data paths between the RAM blocks and the parity generators/checkers.

FIG. 19: Parity Generation and Check

Note: Parity generator & checker are not part of the RAM blocks, but of the RAM access hardware which is part of the E-Ray core.

In case a parity error has been detected the following actions will be performed:

In all Cases
  The respective parity error flag in the Message Handler Status register is set
  The parity error flag in the Error Interrupt Register is set, and, if enabled the module interrupt to the CPU will be generated.
Additionally in Specific Cases
  Parity error in data transfer from Input Buffer RAM 1,2 Message RAM
    DCE bit of the respective message buffer set
    PIBF bit is set
    FMB[5:0] indicates the number of the faulty message buffer
    Transmission Request for the respective message buffer is not set
  Parity error during scan of header sections in Message RAM
    DCE bit of the respective message buffer set
    PMR bit is set
    FMB[5:0] indicates the number of the faulty message buffer
    skip message buffer
  Parity error in data transfer from Message RAM Transient Buffer RAM 1, 2
    DCE bit of the respective message buffer set
    PMR bit is set
    FMB[5:0] indicates the number of the faulty message buffer
    protocol controller sends a Null Frame
  Parity error in data transfer from Transient Buffer RAM 1, 2=Protocol Controller 1, 2
    transmission of the corrupted message is stopped
    PTBF1,2 bit is set
  Parity error in data transfer from Transient Buffer RAM 1, 2=Message RAM
    DCE bit of the respective message buffer set
    PTBF1,2 bit is set
    FMB[5:0] indicates the number of the faulty message buffer
  Parity error in data transfer from Message RAM Output Buffer RAM
    DCE bit of the respective message buffer set
    PMR bit is set
    FMB[5:0] indicates the number of the faulty message buffer
  Parity error in data transfer from Output Buffer RAM Host CPU
    POBF bit is set The Data Consistency Error bit DCE is located in the Message Buffer Status and Error Information field of the respective message buffer, while the Parity Error bits (PIBF, POBF, PMR, PTBF1,2) and the Faulty Message Buffer indicator FMB[5:0] are located in the Message Handler Status register.

5.13 Module Interrupt

In general, interrupts provide a close link to the protocol timing as they are triggered almost immediately when an error is detected by the controller, a frame is received or transmitted, or a configured timer interrupt is activated. This enables the Host to react very quickly on specific error conditions, timers and events. On the other hand too many interrupts can cause the Host to miss deadlines required for the application. Therefore the CC supports disable/enable controls for each individual interrupt, separately.

An interrupt may be triggered when
An error was detected
A status bit is set
A timer reaches a preconfigured value
A message transfer from Input Buffer to Message RAM or from Message RAM to Output Buffer has completed Tracking status and generating interrupts when a status change or an error occurs are two independent tasks. Regardless of whether an interrupt is enabled, or not, the corresponding status is tracked and indicated by the CC. The Host has access to the actual status and error information by reading the Error Interrupt Register and the Status Interrupt Register.

TABLE 22

Modul interrupt flags and interrupt line enable

| Register | Bit | Function |
|---|---|---|
| EIR | PEMC | Protocol Error Mode Changed |
| | CNV | Command Not Valid |
| | NSF | No Sync Frame Received |
| | MSF | Maximum Number of Sync Frames Exeeded |
| | CCF | Clock Correction Failure |
| | PERR | Parity Error |
| | BCEA | Bit Coding/CRC Error Channel A |
| | SMA | Slot Mismatch Channel A |
| | CCMA | Cycle Counter Mismatch Channel A |
| | LMA | Length Mismatch Channel A |
| | USA | Unaccepted Symbol Channel A |
| | SVA | Silence Violation Channel A |
| | SMEA | BG Schedule Monitoring Error Channel A |
| | WSCA | Wakeup Symbol Collision Indicator Channel A |
| | BCEB | Bit Coding/CRC Error Channel B |
| | SMB | Slot Mismatch Channel B |
| | CCMB | Cycle Counter Mismatch Channel B |
| | LMB | Length Mismatch Channel B |
| | USB | Unaccepted Symbol Channel B |
| | SVB | Silence Violation Channel B |
| | SMEB | BG Schedule Monitoring Error Channel B |
| | WSCB | Wakeup Symbol Collision Indicator Channel B |

TABLE 22-continued

Modul interrupt flags and interrupt line enable

| Register | Bit | Function |
|---|---|---|
| SIR | WST | Wakeup Status |
| | CAS | Collision Avoidance Symbol |
| | CYCS | Cycle Start Interrupt |
| | TXI | Transmit Interrupt |
| | RXI | Receive Interrupt |
| | RFNE | Receive FIFO not Empty |
| | RFO | Receive FIFO Overrun |
| | NMVC | Network Management Vector Changed |
| | WUS | Wakeup Symbol |
| | MTS | Media Access Test Symbol |
| | SUS | Startup Status |
| | TI0 | Timer Interrupt 0 |
| | TI1 | Timer Interrupt 1 |
| | TIBC | Transfer Input Buffer Completed |
| | TOBC | Transfer Output Buffer Completed |
| | SWE | Stop Watch Event |
| | WUSA | Wakeup Symbol Channel A |
| | MTSA | MTS Received onl Channel A |
| | WUSB | Wakeup Symbol Channel B |
| | MTSB | MTS Received onl Channel B |
| ILE | EINT0 | Enable Interrupt Line 0 |
| | EINT1 | Enable Interrupt Line 1 |

The interrupt lines to the Host, eray_int0 and eray_int1, are controlled by the enabled interrupts. In addition each of the two interrupt lines to the Host CPU can be enable/disabled separately by programming bit EINT0 and EINT1 in the Interrupt Line Enable register.

The two timer interrupts generated by interrupt timer 0 and 1 are available on pins eray_tint0 and eray_tint1. They can be configured via the Timer 0 and Timer 1 Configuration register.

The status of the data transfer between Input Buffer and Message RAM and between Message RAM and Output Buffer is signalled on pins eray_ibusy and eray_obusy.

6. APPENDIX 6.1 Register Bit Overview

| TEST1 | Test Register 1 | | | | | | | | | | | | | | | |
|---|---|---|---|---|---|---|---|---|---|---|---|---|---|---|---|---|
| 0x0010 | 31 | 30 | 29 | 28 | 27 | 26 | 25 | 24 | 23 | 22 | 21 | 20 | 19 | 18 | 17 | 16 |
| R | 0 | 0 | 0 | 0 | 0 | MT | BGT | ARM | BGEB | BGEA | TXENB | TXENA | TXB | TXA | RXB | RXA |
| W | | | | | | | | | | | | | | | | |
| p28 | 15 | 14 | 13 | 12 | 11 | 10 | 9 | 8 | 7 | 6 | 5 | 4 | 3 | 2 | 1 | 0 |
| R | 0 | 0 | 0 | 0 | 0 | 0 | 0 | 0 | 0 | TMC2 | TMC1 | TMC0 | 0 | 0 | 0 | WRTEN |
| W | | | | | | | | | | | | | | | | |
| TEST2 | Test Register 2 | | | | | | | | | | | | | | | |
| 0x0014 | 31 | 30 | 29 | 28 | 27 | 26 | 25 | 24 | 23 | 22 | 21 | 20 | 19 | 18 | 17 | 16 |
| R | | | | | | | | | | | | | | | | |
| W | | | | | | | | | | | | | | | | |
| p31 | 15 | 14 | 13 | 12 | 11 | 10 | 9 | 8 | 7 | 6 | 5 | 4 | 3 | 2 | 1 | 0 |
| R | RDPB | WRPB | 0 | 0 | 0 | 0 | 0 | 0 | 0 | SSEL2 | SSEL1 | SSEL0 | 0 | RS2 | RS1 | RS0 |
| W | | | | | | | | | | | | | | | | |

-continued

| LCK | Lock Register | | | | | | | | | | | | | | | |
|---|---|---|---|---|---|---|---|---|---|---|---|---|---|---|---|---|
| 0x001C | 31 | 30 | 29 | 28 | 27 | 26 | 25 | 24 | 23 | 22 | 21 | 20 | 19 | 18 | 17 | 16 |
| R | 0 | 0 | 0 | 0 | 0 | 0 | 0 | 0 | 0 | 0 | 0 | 0 | 0 | 0 | 0 | 0 |
| W | | | | | | | | | | | | | | | | |
| p33 | 15 | 14 | 13 | 12 | 11 | 10 | 9 | 8 | 7 | 6 | 5 | 4 | 3 | 2 | 1 | 0 |
| R | 0 | 0 | 0 | 0 | 0 | 0 | 0 | 0 | 0 | 0 | 0 | 0 | 0 | 0 | 0 | 0 |
| W | TMK7 | TMK6 | TMK5 | TMK4 | TMK3 | TMK2 | TMK1 | TMK0 | CLK7 | CLK6 | CLK5 | CLK4 | CLK3 | CLK2 | CLK1 | CLK0 |
| EIR | Error Interrupt Register | | | | | | | | | | | | | | | |
| 0x0020 | 31 | 30 | 29 | 28 | 27 | 26 | 25 | 24 | 23 | 22 | 21 | 20 | 19 | 18 | 17 | 16 |
| R | WSCB | SMEB | SVB | USB | LMB | CCMB | SMB | BCEB | WSCA | SMEA | SVA | USA | LMA | CCMA | SMA | BCEA |
| W | | | | | | | | | | | | | | | | |
| p34 | 15 | 14 | 13 | 12 | 11 | 10 | 9 | 8 | 7 | 6 | 5 | 4 | 3 | 2 | 1 | 0 |
| R | 0 | 0 | 0 | 0 | 0 | 0 | 0 | 0 | | PERR | SCE | CCF | MSF | NSF | CNV | PEMC |
| W | | | | | | | | | | | | | | | | |

| SIR | Status Interrupt Register | | | | | | | | | | | | | | | |
|---|---|---|---|---|---|---|---|---|---|---|---|---|---|---|---|---|
| 0x0024 | 31 | 30 | 29 | 28 | 27 | 26 | 25 | 24 | 23 | 22 | 21 | 20 | 19 | 18 | 17 | 16 |
| R | 0 | 0 | 0 | 0 | 0 | 0 | MTSB | WUSB | 0 | 0 | 0 | 0 | 0 | 0 | MTSA | WUSA |
| W | | | | | | | | | | | | | | | | |
| p37 | 15 | 14 | 13 | 12 | 11 | 10 | 9 | 8 | 7 | 6 | 5 | 4 | 3 | 2 | 1 | 0 |
| R | 0 | 0 | 0 | SWE | TOBC | TIBC | T11 | T10 | NMVC | RFO | RFNE | RX1 | TX1 | CYCS | CAS | WST |
| W | | | | | | | | | | | | | | | | |
| EILS | Error Interrupt Line Select | | | | | | | | | | | | | | | |
| 0x0028 | 31 | 30 | 29 | 28 | 27 | 26 | 25 | 24 | 23 | 22 | 21 | 20 | 19 | 18 | 17 | 16 |
| R | WSCBL | SMEBL | SVBL | USBL | LMBL | CCMBL | SMBL | BCEBL | WSCAL | SMEAL | SVAL | USAL | LMAL | CCMAL | SMAL | BCEAL |
| W | | | | | | | | | | | | | | | | |
| p40 | 15 | 14 | 13 | 12 | 11 | 10 | 9 | 8 | 7 | 6 | 5 | 4 | 3 | 2 | 1 | 0 |
| R | 0 | 0 | 0 | 0 | 0 | 0 | 0 | 0 | | PERRL | SCEL | CCFL | MSFL | NSFL | CNVL | PEMCL |
| W | | | | | | | | | | | | | | | | |

| SILS | Status Interrupt Line Select | | | | | | | | | | | | | | | |
|---|---|---|---|---|---|---|---|---|---|---|---|---|---|---|---|---|
| 0x002C | 31 | 30 | 29 | 28 | 27 | 26 | 25 | 24 | 23 | 22 | 21 | 20 | 19 | 18 | 17 | 16 |
| R | 0 | 0 | 0 | 0 | 0 | 0 | MTSBL | WUSBL | 0 | 0 | 0 | 0 | 0 | 0 | MTSAL | WUSAL |
| W | | | | | | | | | | | | | | | | |
| p42 | 15 | 14 | 13 | 12 | 11 | 10 | 9 | 8 | 7 | 6 | 5 | 4 | 3 | 2 | 1 | 0 |
| R | 0 | 0 | 0 | SWEL | TOBCL | TIBCL | T11L | T10L | NMVCL | RFOL | RFNEL | RXIL | TXIL | CYCSL | CASL | WSTL |
| W | | | | | | | | | | | | | | | | |

| EIES | Error Interrupt Enable Set | | | | | | | | | | | | | | | |
|---|---|---|---|---|---|---|---|---|---|---|---|---|---|---|---|---|
| EIER | Error Interrupt Enable Reset | | | | | | | | | | | | | | | |
| 0x0030 0x0034 | 31 | 30 | 29 | 28 | 27 | 26 | 25 | 24 | 23 | 22 | 21 | 20 | 19 | 18 | 17 | 16 |
| R | WSCBE | SMEBE | SVBE | USBE | LMBE | CCMBE | SMBE | BCEBE | WSCAE | SMEAE | SVAE | USAE | LMAE | CCMAE | SMAE | BCEAE |
| W | | | | | | | | | | | | | | | | |
| p44 | 15 | 14 | 13 | 12 | 11 | 10 | 9 | 8 | 7 | 6 | 5 | 4 | 3 | 2 | 1 | 0 |
| R | 0 | 0 | 0 | 0 | 0 | 0 | 0 | 0 | | PERRE | SCEE | CCFE | MSFE | CNVE | PEMCE | WST |
| W | | | | | | | | | | | | | | | | |

| SIES | Status Interrupt Enable Set | | | | | | | | | | | | | | | |
|---|---|---|---|---|---|---|---|---|---|---|---|---|---|---|---|---|
| SIER | Status Interrupt Enable Reset | | | | | | | | | | | | | | | |
| 0x0038 0x003C | 31 | 30 | 29 | 28 | 27 | 26 | 25 | 24 | 23 | 22 | 21 | 20 | 19 | 18 | 17 | 16 |
| R | 0 | 0 | 0 | 0 | 0 | 0 | MTSBE | WUSBE | 0 | 0 | 0 | 0 | 0 | 0 | MTSAE | WUSAE |
| W | | | | | | | | | | | | | | | | |
| p46 | 15 | 14 | 13 | 12 | 11 | 10 | 9 | 8 | 7 | 6 | 5 | 4 | 3 | 2 | 1 | 0 |
| R | 0 | 0 | 0 | SWEE | TOBCE | TIBCE | T11E | T10E | NMVCE | RFOE | RFNEE | RXIE | TXIE | CYCSE | CASE | WSTE |
| W | | | | | | | | | | | | | | | | |

| ILE | Interrupt Line Enable | | | | | | | | | | | | | | | |
|---|---|---|---|---|---|---|---|---|---|---|---|---|---|---|---|---|
| 0x0040 | 31 | 30 | 29 | 28 | 27 | 26 | 25 | 24 | 23 | 22 | 21 | 20 | 19 | 18 | 17 | 16 |
| R | 0 | 0 | 0 | 0 | 0 | 0 | 0 | 0 | 0 | 0 | 0 | 0 | 0 | 0 | 0 | 0 |
| W | | | | | | | | | | | | | | | | |
| p47 | 15 | 14 | 13 | 12 | 11 | 10 | 9 | 8 | 7 | 6 | 5 | 4 | 3 | 2 | 1 | 0 |
| R | 0 | 0 | 0 | 0 | 0 | 0 | 0 | 0 | 0 | 0 | 0 | 0 | 0 | 0 | EINT1 | EINT0 |
| W | | | | | | | | | | | | | | | | |

| T0C | Timer 0 Configuration | | | | | | | | | | | | | | | |
|---|---|---|---|---|---|---|---|---|---|---|---|---|---|---|---|---|
| 0x0044 | 31 | 30 | 29 | 28 | 27 | 26 | 25 | 24 | 23 | 22 | 21 | 20 | 19 | 18 | 17 | 16 |
| R | 0 | 0 | T0MO13 | T0MO12 | T0MO11 | T0MO10 | T0MO9 | T0MO8 | T0MO7 | T0MO6 | T0MO5 | T0MO4 | T0MO3 | T0MO2 | T0MO1 | T0MO0 |
| W | | | | | | | | | | | | | | | | |
| p48 | 15 | 14 | 13 | 12 | 11 | 10 | 9 | 8 | 7 | 6 | 5 | 4 | 3 | 2 | 1 | 0 |
| R | 0 | T0CC6 | T0CC5 | T0CC4 | T0CC3 | T0CC2 | T0CC1 | T0CC0 | 0 | 0 | 0 | 0 | 0 | 0 | T0MS | T0RC |
| W | | | | | | | | | | | | | | | | |

| T1C | Timer 1 Configuration | | | | | | | | | | | | | | | |
|---|---|---|---|---|---|---|---|---|---|---|---|---|---|---|---|---|
| 0x0048 | 31 | 30 | 29 | 28 | 27 | 26 | 25 | 24 | 23 | 22 | 21 | 20 | 19 | 18 | 17 | 16 |
| R | 0 | 0 | T1MC13 | T1MC12 | T1MC11 | T1MC10 | T1MC9 | T1MC8 | T1MC7 | T1MC6 | T1MC5 | T1MC4 | T1MC3 | T1MC2 | T1MC1 | T1MC0 |
| W | | | | | | | | | | | | | | | | |
| p49 | 15 | 14 | 13 | 12 | 11 | 10 | 9 | 8 | 7 | 6 | 5 | 4 | 3 | 2 | 1 | 0 |
| R | 0 | 0 | 0 | 0 | 0 | 0 | 0 | 0 | 0 | 0 | 0 | 0 | 0 | 0 | T1MS | T1RC |
| W | | | | | | | | | | | | | | | | |

| STPW | Stop Watch Register | | | | | | | | | | | | | | | |
|---|---|---|---|---|---|---|---|---|---|---|---|---|---|---|---|---|
| 0x004C | 31 | 30 | 29 | 28 | 27 | 26 | 25 | 24 | 23 | 22 | 21 | 20 | 19 | 18 | 17 | 16 |
| R | 0 | 0 | SMTV13 | SMTV12 | SMTV11 | SMTV10 | SMTV9 | SMTV8 | SMTV7 | SMTV6 | SMTV5 | SMTV4 | SMTV3 | SMTV2 | SMTV1 | SMTV0 |
| W | | | | | | | | | | | | | | | | |
| p50 | 15 | 14 | 13 | 12 | 11 | 10 | 9 | 8 | 7 | 6 | 5 | 4 | 3 | 2 | 1 | 0 |
| R | 0 | 0 | SCCV5 | SCCV4 | SCCV3 | SCCV2 | SCCV1 | SCCV0 | 0 | 0 | 0 | 0 | SWT | EDGE | SWMS | ESW |
| W | | | | | | | | | | | | | | | | |

| SUCC1 | SUC Configuration Register 1 | | | | | | | | | | | | | | | |
|---|---|---|---|---|---|---|---|---|---|---|---|---|---|---|---|---|
| 0x0080 | 31 | 30 | 29 | 28 | 27 | 26 | 25 | 24 | 23 | 22 | 21 | 20 | 19 | 18 | 17 | 16 |
| R | 0 | 0 | 0 | CCHB* | CCHA* | MTSB* | MTSA* | CF* | HCSE* | TSM* | WUCS* | PTA4* | PTA3* | PTA2* | PTA1* | PTA0* |
| W | | | | | | | | | | | | | | | | |
| p51 | 15 | 14 | 13 | 12 | 11 | 10 | 9 | 8 | 7 | 6 | 5 | 4 | 3 | 2 | 1 | 0 |
| R | CSA4* | CSA3* | CSA2* | CSA1* | CSA0* | CS1* | TXSY* | TXSU* | 0 | 0 | 0 | 0 | CMD3 | CMD2 | CMD1 | CMD0 |
| W | | | | | | | | | | | | | | | | |

| SUCC2 | SUC Configuration Register 2 | | | | | | | | | | | | | | | |
|---|---|---|---|---|---|---|---|---|---|---|---|---|---|---|---|---|
| 0x0084 | 31 | 30 | 29 | 28 | 27 | 26 | 25 | 24 | 23 | 22 | 21 | 20 | 19 | 18 | 17 | 16 |
| R | 0 | 0 | 0 | 0 | LTN3* | LTN2* | LTN1* | LTN0* | 0 | 0 | 0 | LT20* | LT19* | LT18* | LT17* | LT16* |
| W | | | | | | | | | | | | | | | | |
| p54 | 15 | 14 | 13 | 12 | 11 | 10 | 9 | 8 | 7 | 6 | 5 | 4 | 3 | 2 | 1 | 0 |
| R | LT15* | LT14* | LT13* | LT12* | LT11* | LT10* | LT9* | LT8* | LT7* | LT6* | LT5* | LT4* | LT3* | LT2* | LT1* | LT0* |
| W | | | | | | | | | | | | | | | | |

| PRTC1 | PRT Coniguration Register 1 | | | | | | | | | | | | | | | |
|---|---|---|---|---|---|---|---|---|---|---|---|---|---|---|---|---|
| 0x0088 | 31 | 30 | 29 | 28 | 27 | 26 | 25 | 24 | 23 | 22 | 21 | 20 | 19 | 18 | 17 | 16 |
| R/W | RWP5* | RWP4* | RWP3* | RWP2* | RWP1* | RWP0* | 0 | RXW8* | RXW7* | RXW6* | RXW5* | RXW4* | RXW3* | RXW2* | RXW1* | RXW0* |
| p55 | 15 | 14 | 13 | 12 | 11 | 10 | 9 | 8 | 7 | 6 | 5 | 4 | 3 | 2 | 1 | 0 |
| R | BRP1* | BRP0* | 0 | 0 | 0 | 0 | 0 | 0 | 0 | 0 | 0 | 0 | TSST3* | TSST2* | TSST1* | TSST0* |
| W | | | | | | | | | | | | | | | | |

| PRTC2 | PRT Configuration Register 2 | | | | | | | | | | | | | | | |
|---|---|---|---|---|---|---|---|---|---|---|---|---|---|---|---|---|
| 0x008C | 31 | 30 | 29 | 28 | 27 | 26 | 25 | 24 | 23 | 22 | 21 | 20 | 19 | 18 | 17 | 16 |
| R | 0 | 0 | TXL5* | TXL4* | TXL3* | TXL2* | TXL1* | TXL0* | TX17* | TX16* | TX15* | TX14* | TX13* | TX12* | TX11* | TX10* |
| W | | | | | | | | | | | | | | | | |
| p56 | 15 | 14 | 13 | 12 | 11 | 10 | 9 | 8 | 7 | 6 | 5 | 4 | 3 | 2 | 1 | 0 |
| R | 0 | 0 | RXL5* | RXL4* | RXL3* | RXL2* | RXL1* | RXL0* | 0 | 0 | RX15* | RX14* | RX13* | RX12* | RX11* | RX10* |
| W | | | | | | | | | | | | | | | | |
| MHDC1 | MHD Configuration Register 1 | | | | | | | | | | | | | | | |
| 0x0090 | 31 | 30 | 29 | 28 | 27 | 26 | 25 | 24 | 23 | 22 | 21 | 20 | 19 | 18 | 17 | 16 |
| R | 0 | 0 | 0 | SLT12* | SLT11* | SLT10* | SLT9* | SLT8* | SLT7* | SLT6* | SLT5* | SLT4* | SLT3* | SLT2* | SLT1* | SLT0* |
| W | | | | | | | | | | | | | | | | |
| p57 | 15 | 14 | 13 | 12 | 11 | 10 | 9 | 8 | 7 | 6 | 5 | 4 | 3 | 2 | 1 | 0 |
| R | 0 | 0 | 0 | 0 | 0 | 0 | 0 | 0 | 0 | SFDL6* | SFDL5* | SFDL4* | SFDL3* | SFDL2* | SFDL1* | SFDL0* |
| W | | | | | | | | | | | | | | | | |

| MHDC2 | MHD Configuration Register 2 | | | | | | | | | | | | | | | |
|---|---|---|---|---|---|---|---|---|---|---|---|---|---|---|---|---|
| 0x0094 | 31 | 30 | 29 | 28 | 27 | 26 | 25 | 24 | 23 | 22 | 21 | 20 | 19 | 18 | 17 | 16 |
| R | 0 | 0 | 0 | 0 | 0 | 0 | 0 | 0 | 0 | 0 | 0 | 0 | 0 | 0 | 0 | 0 |
| W | | | | | | | | | | | | | | | | |
| p57 | 15 | 14 | 13 | 12 | 11 | 10 | 9 | 8 | 7 | 6 | 5 | 4 | 3 | 2 | 1 | 0 |
| R | 0 | 0 | RXL5* | RXL4* | RXL3* | RXL2* | RXL1* | RXL0* | 0 | 0 | RX15* | RX14* | RX13* | RX12* | RX11* | RX10* |
| W | | | | | | | | | | | | | | | | |
| NEMC | NEM Configuration Register | | | | | | | | | | | | | | | |
| 0x0090 | 31 | 30 | 29 | 28 | 27 | 26 | 25 | 24 | 23 | 22 | 21 | 20 | 19 | 18 | 17 | 16 |
| R | 0 | 0 | 0 | 0 | 0 | 0 | DSE* | BGD* | 0 | 0 | BGT5* | BGT4* | BGT3* | BGT2* | BGT1* | BGT0* |
| W | | | | | | | | | | | | | | | | |
| p58 | 15 | 14 | 13 | 12 | 11 | 10 | 9 | 8 | 7 | 6 | 5 | 4 | 3 | 2 | 1 | 0 |
| R | 0 | 0 | 0 | 0 | NML3* | NML2* | NML1* | NML0* | WCF3* | WCF2* | WCF1* | WCF0* | WCP3* | WCP2* | WCP1* | WCP0* |
| W | | | | | | | | | | | | | | | | |

| CTUC1 | CTU Configuration Register 1 | | | | | | | | | | | | | | | |
|---|---|---|---|---|---|---|---|---|---|---|---|---|---|---|---|---|
| 0x00A0 | 31 | 30 | 29 | 28 | 27 | 26 | 25 | 24 | 23 | 22 | 21 | 20 | 19 | 18 | 17 | 16 |
| R | 0 | 0 | 0 | 0 | 0 | 0 | 0 | 0 | 0 | 0 | 0 | 0 | UT19* | UT18* | UT17* | UT16* |
| W | | | | | | | | | | | | | | | | |
| p59 | 15 | 14 | 13 | 12 | 11 | 10 | 9 | 8 | 7 | 6 | 5 | 4 | 3 | 2 | 1 | 0 |
| R | UT15* | UT14* | UT13* | UT12* | UT11* | UT10* | UT9* | UT8* | UT7* | UT6* | UT5* | UT4* | UT3* | UT2* | UT1* | UT0* |
| W | | | | | | | | | | | | | | | | |

| GTUC2 | GTU Configuration Register 2 | | | | | | | | | | | | | | | |
|---|---|---|---|---|---|---|---|---|---|---|---|---|---|---|---|---|
| 0x00A4 | 31 | 30 | 29 | 28 | 27 | 26 | 25 | 24 | 23 | 22 | 21 | 20 | 19 | 18 | 17 | 16 |
| R | 0 | 0 | 0 | 0 | 0 | 0 | 0 | 0 | 0 | 0 | 0 | 0 | SNM3* | SNM2* | SNM1* | SNM0* |
| W | | | | | | | | | | | | | | | | |
| p59 | 15 | 14 | 13 | 12 | 11 | 10 | 9 | 8 | 7 | 6 | 5 | 4 | 3 | 2 | 1 | 0 |
| R | 0 | 0 | MPC13* | MPC12* | MPC11* | MPC10* | MPC9* | MPC8* | MPC7* | MPC6* | MPC5* | MPC4* | MPC3* | MPC2* | MPC1* | MPC0* |
| W | | | | | | | | | | | | | | | | |
| GTUC3 | GTU Configuration Register 3 | | | | | | | | | | | | | | | |
| 0x00A8 | 31 | 30 | 29 | 28 | 27 | 26 | 25 | 24 | 23 | 22 | 21 | 20 | 19 | 18 | 17 | 16 |
| R | 0 | 0 | 0 | 0 | 0 | 0 | 0 | 0 | 0 | 0 | MTIO5* | MTIO4* | MTIO3* | MTIO2* | MTIO1* | MTIO0* |
| W | | | | | | | | | | | | | | | | |
| p60 | 15 | 14 | 13 | 12 | 11 | 10 | 9 | 8 | 7 | 6 | 5 | 4 | 3 | 2 | 1 | 0 |
| R | UIOB7* | UIOB6* | UIOB5* | UIOB4* | UIOB3* | UIOB2* | UIOB1* | UIOB0* | UIOA7* | UIOA6* | UIOA5* | UIOA4* | UIOA3* | UIOA2* | UIOA1* | UIOA0* |
| W | | | | | | | | | | | | | | | | |

| GTUC4 | GTU Configuration Register 4 | | | | | | | | | | | | | | | |
|---|---|---|---|---|---|---|---|---|---|---|---|---|---|---|---|---|
| 0x00AC | 31 | 30 | 29 | 28 | 27 | 26 | 25 | 24 | 23 | 22 | 21 | 20 | 19 | 18 | 17 | 16 |
| R | 0 | 0 | OCS13* | OCS12* | OCS11* | OCS10* | OCS9* | OCS8* | OCS7* | OCS6* | OCS5* | OCS4* | OCS3* | OCS2* | OCS1* | OCS0* |
| W | | | | | | | | | | | | | | | | |
| p60 | 15 | 14 | 13 | 12 | 11 | 10 | 9 | 8 | 7 | 6 | 5 | 4 | 3 | 2 | 1 | 0 |
| R | 0 | 0 | NIT13* | NIT12* | NIT11* | NIT10* | NIT9* | NIT8* | NIT7* | NIT6* | NIT5* | NIT4* | NIT3* | NIT2* | NIT1* | NIT0* |
| W | | | | | | | | | | | | | | | | |
| GTUC5 | GTU Configuration Register 5 | | | | | | | | | | | | | | | |
| 0x00B0 | 31 | 30 | 29 | 28 | 27 | 26 | 25 | 24 | 23 | 22 | 21 | 20 | 19 | 18 | 17 | 16 |
| R | 0 | 0 | 0 | 0 | 0 | 0 | 0 | 0 | 0 | 0 | 0 | CDD4* | CDD3* | CDD2* | CDD1* | CDD0* |
| W | | | | | | | | | | | | | | | | |
| p61 | 15 | 14 | 13 | 12 | 11 | 10 | 9 | 8 | 7 | 6 | 5 | 4 | 3 | 2 | 1 | 0 |
| R | DCB7* | DCB6* | DCB5* | DCB4* | DCB3* | DCB2* | DCB1* | DCB0* | DCA7* | DCA6* | DCA5* | DCA4* | DCA3* | DCA2* | DCA1* | DCA0* |
| W | | | | | | | | | | | | | | | | |

| GTUC6 | GTU Configuration Register 6 | | | | | | | | | | | | | | | |
|---|---|---|---|---|---|---|---|---|---|---|---|---|---|---|---|---|
| 0x00B4 | 31 | 30 | 29 | 28 | 27 | 26 | 25 | 24 | 23 | 22 | 21 | 20 | 19 | 18 | 17 | 16 |
| R | 0 | 0 | 0 | 0 | 0 | MOD10* | MOD9* | MOD8* | MOD7* | MOD6* | MOD5* | MOD4* | MOD3* | MOD2* | MOD1* | MOD0* |
| W | | | | | | | | | | | | | | | | |
| p61 | 15 | 14 | 13 | 12 | 11 | 10 | 9 | 8 | 7 | 6 | 5 | 4 | 3 | 2 | 1 | 0 |
| R | 0 | 0 | 0 | 0 | 0 | ASR10* | ASR9* | ASR8* | ASR7* | ASR6* | ASR5* | ASR4* | ASR3* | ASR2* | ASR1* | ASR0* |
| W | | | | | | | | | | | | | | | | |
| GTUC7 | GTU Configuration Register 7 | | | | | | | | | | | | | | | |
| 0x00B8 | 31 | 30 | 29 | 28 | 27 | 26 | 25 | 24 | 23 | 22 | 21 | 20 | 19 | 18 | 17 | 16 |
| R | 0 | 0 | 0 | 0 | 0 | 0 | NSS9* | NSS8* | NSS7* | NSS6* | NSS5* | NSS4* | NSS3* | NSS2* | NSS1* | NSS0* |
| W | | | | | | | | | | | | | | | | |
| p62 | 15 | 14 | 13 | 12 | 11 | 10 | 9 | 8 | 7 | 6 | 5 | 4 | 3 | 2 | 1 | 0 |
| R | 0 | 0 | 0 | 0 | 0 | SSL10* | SSL9* | SSL8* | SSL7* | SSL6* | SSL5* | SSL4* | SSL3* | SSL2* | SSL1* | SSL0* |
| W | | | | | | | | | | | | | | | | |

| GTUC8 | GTU Configuration Register 8 | | | | | | | | | | | | | | | |
|---|---|---|---|---|---|---|---|---|---|---|---|---|---|---|---|---|
| 0x00BC | 31 | 30 | 29 | 28 | 27 | 26 | 25 | 24 | 23 | 22 | 21 | 20 | 19 | 18 | 17 | 16 |
| R | 0 | 0 | 0 | NMS12* | NMS11* | NMS10* | NMS9* | NMS8* | NMS7* | NMS6* | NMS5* | NMS4* | NMS3* | NMS2* | NMS1* | NMS0* |
| W | | | | | | | | | | | | | | | | |
| p62 | 15 | 14 | 13 | 12 | 11 | 10 | 9 | 8 | 7 | 6 | 5 | 4 | 3 | 2 | 1 | 0 |
| R | 0 | 0 | 0 | 0 | 0 | 0 | 0 | 0 | 0 | 0 | MSL5* | MSL4* | MSL3* | MSL2* | MSL1* | MSL0* |
| W | | | | | | | | | | | | | | | | |

| GTUC9 | GTU Configuration Register 9 | | | | | | | | | | | | | | | |
|---|---|---|---|---|---|---|---|---|---|---|---|---|---|---|---|---|
| 0x00C0 | 31 | 30 | 29 | 28 | 27 | 26 | 25 | 24 | 23 | 22 | 21 | 20 | 19 | 18 | 17 | 16 |
| R | 0 | 0 | 0 | 0 | 0 | 0 | 0 | 0 | 0 | 0 | 0 | 0 | 0 | 0 | DS11* | DS10 |
| W | | | | | | | | | | | | | | | | |
| p63 | 15 | 14 | 13 | 12 | 11 | 10 | 9 | 8 | 7 | 6 | 5 | 4 | 3 | 2 | 1 | 0 |
| R | 0 | 0 | 0 | MAPO4* | MAPO3* | MAPO2* | MAPO1* | MAPO0* | 0 | 0 | 0 | APO4* | APO3* | APO2* | APO1* | APO0* |
| W | | | | | | | | | | | | | | | | |
| GTUC10 | GTU Configuration Register 10 | | | | | | | | | | | | | | | |
| 0x00C4 | 31 | 30 | 29 | 28 | 27 | 26 | 25 | 24 | 23 | 22 | 21 | 20 | 19 | 18 | 17 | 16 |
| R | 0 | 0 | 0 | 0 | 0 | MRC10* | MRC9* | MRC8* | MRC7* | MRC6* | MRC5* | MRC4* | MRC3* | MRC2* | MRC1* | MRC0* |
| W | | | | | | | | | | | | | | | | |
| p63 | 15 | 14 | 13 | 12 | 11 | 10 | 9 | 8 | 7 | 6 | 5 | 4 | 3 | 2 | 1 | 0 |
| R | 0 | 0 | 0 | MOC12* | MOC11* | MOC10* | MOC9* | MOC8* | MOC7* | MOC6* | MOC5* | MOC4* | MOC3* | MOC2* | MOC1* | MOC0* |
| W | | | | | | | | | | | | | | | | |

| GTUC11 | GTU Configuration Register 11 | | | | | | | | | | | | | | | |
|---|---|---|---|---|---|---|---|---|---|---|---|---|---|---|---|---|
| 0x00C8 | 31 | 30 | 29 | 28 | 27 | 26 | 25 | 24 | 23 | 22 | 21 | 20 | 19 | 18 | 17 | 16 |
| R | 0 | 0 | 0 | 0 | 0 | ERC2* | ERC1* | ERC0* | 0 | 0 | 0 | 0 | 0 | EOC2* | EOC1* | EOC0* |
| W | | | | | | | | | | | | | | | | |
| p64 | 15 | 14 | 13 | 12 | 11 | 10 | 9 | 8 | 7 | 6 | 5 | 4 | 3 | 2 | 1 | 0 |
| R | 0 | 0 | 0 | 0 | 0 | 0 | 0 | 0 | 0 | 0 | 0 | 0 | 0 | 0 | ECC1 | ECC0 |
| W | | | | | | | | | | | | | | | | |

| CCSEV | CC Status and Error Vector | | | | | | | | | | | | | | | |
|---|---|---|---|---|---|---|---|---|---|---|---|---|---|---|---|---|
| 0x0100 | 31 | 30 | 29 | 28 | 27 | 26 | 25 | 24 | 23 | 22 | 21 | 20 | 19 | 18 | 17 | 16 |
| R | 0 | 0 | 0 | PTAC4 | PTAC3 | PTAC2 | PTAC1 | PTAC0 | RCA4 | RCA3 | RCA2 | RCA1 | RCA0 | WSV2 | WSV1 | WSV0 |
| W | | | | | | | | | | | | | | | | |
| p65 | 15 | 14 | 13 | 12 | 11 | 10 | 9 | 8 | 7 | 6 | 5 | 4 | 3 | 2 | 1 | 0 |
| R | DCREQ | SMRI | CSAI | CSNI | ERRM1 | ERRM0 | SLM1 | SLM0 | HRQ | FSI | POCS5 | POCS4 | POCS3 | POCS2 | POCS1 | POCS0 |
| W | | | | | | | | | | | | | | | | |

| SCV | Slot Counter Value | | | | | | | | | | | | | | | |
|---|---|---|---|---|---|---|---|---|---|---|---|---|---|---|---|---|
| 0x0110 | 31 | 30 | 29 | 28 | 27 | 26 | 25 | 24 | 23 | 22 | 21 | 20 | 19 | 18 | 17 | 16 |
| R | 0 | 0 | 0 | 0 | 0 | SCCA10 | SCCA9 | SCCA8 | SCCA7 | SCCA6 | SCCA5 | SCCA4 | SCCA3 | SCCA2 | SCCA1 | SCCA0 |
| W | | | | | | | | | | | | | | | | |
| p67 | 15 | 14 | 13 | 12 | 11 | 10 | 9 | 8 | 7 | 6 | 5 | 4 | 3 | 2 | 1 | 0 |
| R | 0 | 0 | 0 | 0 | 0 | SCCB10 | SCCB9 | SCCB8 | SCCB7 | SCCB6 | SCCB5 | SCCB4 | SCCB3 | SCCB2 | SCCB1 | SCCB0 |
| W | | | | | | | | | | | | | | | | |

| MTCCV | Macrotick and Cycle Counter Value | | | | | | | | | | | | | | | |
|---|---|---|---|---|---|---|---|---|---|---|---|---|---|---|---|---|
| 0x0114 | 31 | 30 | 29 | 28 | 27 | 26 | 25 | 24 | 23 | 22 | 21 | 20 | 19 | 18 | 17 | 16 |
| R | 0 | 0 | 0 | 0 | 0 | 0 | 0 | 0 | 0 | 0 | CCV5 | CCV4 | CCV3 | CCV2 | CCV1 | CCV0 |
| W | | | | | | | | | | | | | | | | |
| p67 | 15 | 14 | 13 | 12 | 11 | 10 | 9 | 8 | 7 | 6 | 5 | 4 | 3 | 2 | 1 | 0 |
| R | 0 | 0 | MTV13 | MTV12 | MTV11 | MTV10 | MTV9 | MTV8 | MTV7 | MTV6 | MTV5 | MTV4 | MTV3 | MTV2 | MTV1 | MTV0 |
| W | | | | | | | | | | | | | | | | |

| CCS1 | Clock Correction Status 1 | | | | | | | | | | | | | | | |
|---|---|---|---|---|---|---|---|---|---|---|---|---|---|---|---|---|
| 0x0118 | 31 | 30 | 29 | 28 | 27 | 26 | 25 | 24 | 23 | 22 | 21 | 20 | 19 | 18 | 17 | 16 |
| R | 0 | 0 | 0 | 0 | 0 | 0 | 0 | 0 | 0 | 0 | 0 | 0 | 0 | 0 | 0 | 0 |
| W | | | | | | | | | | | | | | | | |
| p68 | 15 | 14 | 13 | 12 | 11 | 10 | 9 | 8 | 7 | 6 | 5 | 4 | 3 | 2 | 1 | 0 |
| R | 0 | 0 | 0 | 0 | 0 | 0 | 0 | 0 | CCFC3 | CCFC2 | CCFC1 | CCFC0 | 0 | MOCS | MRCS | CCLR |
| W | | | | | | | | | | | | | | | | |

| CCS2 | Clock Correction Status 2 | | | | | | | | | | | | | | | |
|---|---|---|---|---|---|---|---|---|---|---|---|---|---|---|---|---|
| 0x011C | 31 | 30 | 29 | 28 | 27 | 26 | 25 | 24 | 23 | 22 | 21 | 20 | 19 | 18 | 17 | 16 |
| R | 0 | 0 | 0 | 0 | RCV11 | RCV10 | RCV9 | RCV8 | RCV7 | RCV6 | RCV5 | RCV4 | RCV3 | RCV2 | RCV1 | RCV0 |
| W | | | | | | | | | | | | | | | | |
| p69 | 15 | 14 | 13 | 12 | 11 | 10 | 9 | 8 | 7 | 6 | 5 | 4 | 3 | 2 | 1 | 0 |
| R | 0 | 0 | OCV13 | OCV12 | OCV11 | OCV10 | OCV9 | OCV8 | OCV7 | OCV6 | OCV5 | OCV4 | OCV3 | OCV2 | OCV1 | OCV0 |
| W | | | | | | | | | | | | | | | | |

| SFS | Sync Frame Status | | | | | | | | | | | | | | | |
|---|---|---|---|---|---|---|---|---|---|---|---|---|---|---|---|---|
| 0x0120 | 31 | 30 | 29 | 28 | 27 | 26 | 25 | 24 | 23 | 22 | 21 | 20 | 19 | 18 | 17 | 16 |
| R | 0 | 0 | 0 | 0 | 0 | 0 | 0 | 0 | 0 | 0 | 0 | 0 | 0 | 0 | 0 | SFO |
| W | | | | | | | | | | | | | | | | |
| p69 | 15 | 14 | 13 | 12 | 11 | 10 | 9 | 8 | 7 | 6 | 5 | 4 | 3 | 2 | 1 | 0 |
| R | VSBO3 | VSBO2 | VSBO1 | VSBO0 | VSBE3 | VSBE2 | VSBE1 | VSBE0 | VSAO3 | VSAO2 | VSAO1 | VSAO0 | VSAE3 | VSAE2 | VSAE1 | VSAE0 |
| W | | | | | | | | | | | | | | | | |

| SWNIT | Symbol Window and NIT Status | | | | | | | | | | | | | | | |
|---|---|---|---|---|---|---|---|---|---|---|---|---|---|---|---|---|
| 0x0124 | 31 | 30 | 29 | 28 | 27 | 26 | 25 | 24 | 23 | 22 | 21 | 20 | 19 | 18 | 17 | 16 |
| R | 0 | 0 | 0 | 0 | 0 | 0 | 0 | 0 | 0 | 0 | 0 | 0 | 0 | 0 | 0 | 0 |
| W | | | | | | | | | | | | | | | | |
| p70 | 15 | 14 | 13 | 12 | 11 | 10 | 9 | 8 | 7 | 6 | 5 | 4 | 3 | 2 | 1 | 0 |
| R | 0 | 0 | 0 | 0 | SBNB | SENB | SBNA | SENA | 0 | 0 | TCSB | SBSB | SESB | TCSA | SBSA | SESA |
| W | | | | | | | | | | | | | | | | |

| ACS | Aggregated Channel Status | | | | | | | | | | | | | | | |
|---|---|---|---|---|---|---|---|---|---|---|---|---|---|---|---|---|
| 0x0128 | 31 | 30 | 29 | 28 | 27 | 26 | 25 | 24 | 23 | 22 | 21 | 20 | 19 | 18 | 17 | 16 |
| R | 0 | 0 | 0 | 0 | 0 | 0 | 0 | 0 | 0 | 0 | 0 | 0 | 0 | 0 | 0 | 0 |
| W | | | | | | | | | | | | | | | | |
| p71 | 15 | 14 | 13 | 12 | 11 | 10 | 9 | 8 | 7 | 6 | 5 | 4 | 3 | 2 | 1 | 0 |
| R | 0 | 0 | 0 | SBVB | CIB | CEDB | SEDB | VFRB | 0 | 0 | 0 | SBVA | CIA | CEDA | SEDA | VFRA |
| W | | | | | | | | | | | | | | | | |

| ESIDn | Even Sync ID [0 ... 15] | | | | | | | | | | | | | | | |
|---|---|---|---|---|---|---|---|---|---|---|---|---|---|---|---|---|
| 0x0130 to | | | | | | | | | | | | | | | | |
| 0x016C | 31 | 30 | 29 | 28 | 27 | 26 | 25 | 24 | 23 | 22 | 21 | 20 | 19 | 18 | 17 | 16 |
| R | 0 | 0 | 0 | 0 | 0 | 0 | 0 | 0 | 0 | 0 | 0 | 0 | 0 | 0 | 0 | 0 |
| W | | | | | | | | | | | | | | | | |
| p72 | 15 | 14 | 13 | 12 | 11 | 10 | 9 | 8 | 7 | 6 | 5 | 4 | 3 | 2 | 1 | 0 |
| R | RXEB | RXES | 0 | 0 | 0 | 0 | ESID9 | ESID8 | ESID7 | ESID6 | ESID5 | ESID4 | ESID3 | ESID2 | ESID1 | ESID0 |
| W | | | | | | | | | | | | | | | | |

| OSIDn | Odd Sync ID [0 ... 15] | | | | | | | | | | | | | | | |
|---|---|---|---|---|---|---|---|---|---|---|---|---|---|---|---|---|
| 0x0170 to | | | | | | | | | | | | | | | | |
| 0x01AC | 31 | 30 | 29 | 28 | 27 | 26 | 25 | 24 | 23 | 22 | 21 | 20 | 19 | 18 | 17 | 16 |
| R | 0 | 0 | 0 | 0 | 0 | 0 | 0 | 0 | 0 | 0 | 0 | 0 | 0 | 0 | 0 | 0 |
| W | | | | | | | | | | | | | | | | |
| p73 | 15 | 14 | 13 | 12 | 11 | 10 | 9 | 8 | 7 | 6 | 5 | 4 | 3 | 2 | 1 | 0 |
| R | RXOB | RXOA | 0 | 0 | 0 | 0 | OSID9 | OSID8 | OSID7 | OSID6 | OSID5 | OSID4 | OSID3 | OSID2 | OSID1 | OSID0 |
| W | | | | | | | | | | | | | | | | |

| EAABn | Even Arrival Channel A,B [0 ... 15] | | | | | | | | | | | | | | | |
|---|---|---|---|---|---|---|---|---|---|---|---|---|---|---|---|---|
| 0x01B0 to | | | | | | | | | | | | | | | | |
| 0x01EC | 31 | 30 | 29 | 28 | 27 | 26 | 25 | 24 | 23 | 22 | 21 | 20 | 19 | 18 | 17 | 16 |
| R | 0 | 0 | 0 | 0 | EAB11 | EAB10 | EAB9 | EAB8 | EAB7 | EAB6 | EAB5 | EAB4 | EAB3 | EAB2 | EAB1 | EAB0 |
| W | | | | | | | | | | | | | | | | |
| p73 | 15 | 14 | 13 | 12 | 11 | 10 | 9 | 8 | 7 | 6 | 5 | 4 | 3 | 2 | 1 | 0 |
| R | 0 | 0 | 0 | 0 | EAA11 | EAA10 | EAA9 | EAA8 | EAA7 | EAA6 | EAA5 | EAA4 | EAA3 | EAA2 | EAA1 | EAA0 |
| W | | | | | | | | | | | | | | | | |

| OAABn | Odd Arrival Channel A,B [0 ... 15] | | | | | | | | | | | | | | | |
|---|---|---|---|---|---|---|---|---|---|---|---|---|---|---|---|---|
| 0x01F0 to | | | | | | | | | | | | | | | | |
| 0x022C | 31 | 30 | 29 | 28 | 27 | 26 | 25 | 24 | 23 | 22 | 21 | 20 | 19 | 18 | 17 | 16 |
| R | 0 | 0 | 0 | 0 | OAB11 | OAB10 | OAB9 | OAB8 | OAB7 | OAB6 | OAB5 | OAB4 | OAB3 | OAB2 | OAB1 | OAB0 |
| W | | | | | | | | | | | | | | | | |
| p74 | 15 | 14 | 13 | 12 | 11 | 10 | 9 | 8 | 7 | 6 | 5 | 4 | 3 | 2 | 1 | 0 |
| R | 0 | 0 | 0 | 0 | OAA11 | OAA10 | OAA9 | OAA8 | OAA7 | OAA6 | OAA5 | OAA4 | OAA3 | OAA2 | OAA1 | OAA0 |
| W | | | | | | | | | | | | | | | | |

| NMVn | Network Management Vector [1 ... 3] | | | | | | | | | | | | | | | |
|---|---|---|---|---|---|---|---|---|---|---|---|---|---|---|---|---|
| 0x0230 to | | | | | | | | | | | | | | | | |
| 0x0238 | 31 | 30 | 29 | 28 | 27 | 26 | 25 | 24 | 23 | 22 | 21 | 20 | 19 | 18 | 17 | 16 |
| R | NM31 | NM30 | NM29 | NM28 | NM27 | NM26 | NM25 | NM24 | NM23 | NM22 | NM21 | NM20 | NM19 | NM18 | NM17 | NM16 |
| W | | | | | | | | | | | | | | | | |
| p74 | 15 | 14 | 13 | 12 | 11 | 10 | 9 | 8 | 7 | 6 | 5 | 4 | 3 | 2 | 1 | 0 |
| R | NM15 | NM14 | NM13 | NM12 | NM11 | NM10 | NM9 | NM8 | NM7 | NM6 | NM5 | NM4 | NM3 | NM2 | NM1 | NM0 |
| W | | | | | | | | | | | | | | | | |

| MRC | Message RAM Configuration | | | | | | | | | | | | | | | |
|---|---|---|---|---|---|---|---|---|---|---|---|---|---|---|---|---|
| 0x0300 | 31 | 30 | 29 | 28 | 27 | 26 | 25 | 24 | 23 | 22 | 21 | 20 | 19 | 18 | 17 | 16 |
| R | 0 | DLF6* | DLF5* | DLF4* | DLF3* | DLF2* | DLF1* | DLF0* | 0 | 0 | LCB5* | LCB4* | LCB3* | LCB2* | LCB1* | LCB0* |
| W | | | | | | | | | | | | | | | | |
| p75 | 15 | 14 | 13 | 12 | 11 | 10 | 9 | 8 | 7 | 6 | 5 | 4 | 3 | 2 | 1 | 0 |
| R | 0 | FFB6* | FFB5* | FFB4* | FFB3* | FFB2* | FFB1* | FFB0* | 0 | FDB6* | FDB5* | FDB4* | FDB3* | FDB2* | FDB1* | FDB0* |
| W | | | | | | | | | | | | | | | | |
| FRF | FIFO Rejection Filter | | | | | | | | | | | | | | | |
| 0x0304 | 31 | 30 | 29 | 28 | 27 | 26 | 25 | 24 | 23 | 22 | 21 | 20 | 19 | 18 | 17 | 16 |
| R | 0 | 0 | 0 | 0 | 0 | 0 | 0 | 0 | RSS* | EAB6 | EAB5 | EAB4 | EAB3 | EAB2 | EAB1 | EAB0 |
| W | | | | | | | | | | | | | | | | |
| p76 | 15 | 14 | 13 | 12 | 11 | 10 | 9 | 8 | 7 | 6 | 5 | 4 | 3 | 2 | 1 | 0 |
| R | 0 | 0 | 0 | FID10* | FID9* | FID8* | FID7* | FID6* | FID5* | FID4* | FID3* | FID2* | FID1* | FID0* | CH1* | CH0* |
| W | | | | | | | | | | | | | | | | |

| FRFM | FIFO Rejection Filter Mask | | | | | | | | | | | | | | | |
|---|---|---|---|---|---|---|---|---|---|---|---|---|---|---|---|---|
| 0x0308 | 31 | 30 | 29 | 28 | 27 | 26 | 25 | 24 | 23 | 22 | 21 | 20 | 19 | 18 | 17 | 16 |
| R | 0 | 0 | 0 | 0 | 0 | 0 | 0 | 0 | 0 | 0 | 0 | 0 | 0 | 0 | 0 | 0 |
| W | | | | | | | | | | | | | | | | |
| p76 | 15 | 14 | 13 | 12 | 11 | 10 | 9 | 8 | 7 | 6 | 5 | 4 | 3 | 2 | 1 | 0 |
| R | 0 | 0 | 0 | MFID10* | MFID9* | MFID8* | MFID7* | MFID6* | MFID5* | MFID4* | MFID3* | MFID2* | MFID1* | MFID0* | 0 | 0 |
| W | | | | | | | | | | | | | | | | |
| TXRQ1 | Transmission Request Register 1 | | | | | | | | | | | | | | | |
| 0x0310 | 31 | 30 | 29 | 28 | 27 | 26 | 25 | 24 | 23 | 22 | 21 | 20 | 19 | 18 | 17 | 16 |
| R | TXR31 | TXR30 | TXR29 | TXR28 | TXR27 | TXR26 | TXR25 | TXR24 | TXR23 | TXR22 | TXR21 | TXR20 | TXR19 | TXR18 | TXR17 | TXR16 |
| W | | | | | | | | | | | | | | | | |
| p77 | 15 | 14 | 13 | 12 | 11 | 10 | 9 | 8 | 7 | 6 | 5 | 4 | 3 | 2 | 1 | 0 |
| R | TXR15 | TXR14 | TXR13 | TXR12 | TXR11 | TXR10 | TXR9 | TXR8 | TXR7 | TXR6 | TXR5 | TXR4 | TXR3 | TXR2 | TXR1 | TXR0 |
| W | | | | | | | | | | | | | | | | |

| TXRQ2 | Transmission Request Register 2 | | | | | | | | | | | | | | | |
|---|---|---|---|---|---|---|---|---|---|---|---|---|---|---|---|---|
| 0x0314 | 31 | 30 | 29 | 28 | 27 | 26 | 25 | 24 | 23 | 22 | 21 | 20 | 19 | 18 | 17 | 16 |
| R | TXR63 | TXR62 | TXR61 | TXR60 | TXR59 | TXR58 | TXR57 | TXR56 | TXR55 | TXR54 | TXR53 | TXR52 | TXR51 | TXR50 | TXR49 | TXR48 |
| W | | | | | | | | | | | | | | | | |
| p77 | 15 | 14 | 13 | 12 | 11 | 10 | 9 | 8 | 7 | 6 | 5 | 4 | 3 | 2 | 1 | 0 |
| R | TXR47 | TXR46 | TXR45 | TXR44 | TXR43 | TXR42 | TXR41 | TXR40 | TXR39 | TXR38 | TXR37 | TXR36 | TXR35 | TXR34 | TXR33 | TXR32 |
| W | | | | | | | | | | | | | | | | |

| NDAT1 | New Data Register 1 | | | | | | | | | | | | | | | |
|---|---|---|---|---|---|---|---|---|---|---|---|---|---|---|---|---|
| 0x0320 | 31 | 30 | 29 | 28 | 27 | 26 | 25 | 24 | 23 | 22 | 21 | 20 | 19 | 18 | 17 | 16 |
| R | ND31 | ND30 | ND29 | ND28 | ND27 | ND26 | ND25 | ND24 | ND23 | ND22 | ND21 | ND20 | ND19 | ND18 | ND17 | ND16 |
| W | | | | | | | | | | | | | | | | |
| p78 | 15 | 14 | 13 | 12 | 11 | 10 | 9 | 8 | 7 | 6 | 5 | 4 | 3 | 2 | 1 | 0 |
| R | ND15 | ND14 | ND13 | ND12 | ND11 | ND10 | ND9 | ND8 | ND7 | ND6 | ND5 | ND4 | ND3 | ND2 | ND1 | ND0 |
| W | | | | | | | | | | | | | | | | |
| NDAT2 | New Data Register 2 | | | | | | | | | | | | | | | |
| 0x0324 | 31 | 30 | 29 | 28 | 27 | 26 | 25 | 24 | 23 | 22 | 21 | 20 | 19 | 18 | 17 | 16 |
| R | ND63 | ND62 | ND61 | ND60 | ND59 | ND58 | ND57 | ND56 | ND55 | ND54 | ND53 | ND52 | ND51 | ND50 | ND49 | ND48 |
| W | | | | | | | | | | | | | | | | |
| p78 | 15 | 14 | 13 | 12 | 11 | 10 | 9 | 8 | 7 | 6 | 5 | 4 | 3 | 2 | 1 | 0 |
| R | ND47 | ND46 | ND45 | ND44 | ND43 | ND42 | ND41 | ND40 | ND39 | ND38 | ND37 | ND36 | ND35 | ND34 | ND33 | ND32 |
| W | | | | | | | | | | | | | | | | |

| MHDS | Message Handlers Status | | | | | | | | | | | | | | | |
|---|---|---|---|---|---|---|---|---|---|---|---|---|---|---|---|---|
| 0x0330 | 31 | 30 | 29 | 28 | 27 | 26 | 25 | 24 | 23 | 22 | 21 | 20 | 19 | 18 | 17 | 16 |
| R | 0 | 0 | MBU5 | MBU4 | MBU3 | MBU2 | MBU1 | MBU0 | 0 | 0 | MBT5 | MBT4 | MBT3 | MBT2 | MBT1 | MBT0 |
| W | | | | | | | | | | | | | | | | |
| p79 | 15 | 14 | 13 | 12 | 11 | 10 | 9 | 8 | 7 | 6 | 5 | 4 | 3 | 2 | 1 | 0 |
| R | 0 | 0 | FMB5 | FMB4 | FMB3 | FMB2 | FMB1 | FMB0 | 0 | 0 | 0 | PTBF2 | PTBF1 | PMR | POBF | PIBF |
| W | | | | | | | | | | | | | | | | |
| WRDSn | Write Data Section [1 … 64] | | | | | | | | | | | | | | | |
| 0x0400 to 0x04FC | 31 | 30 | 29 | 28 | 27 | 26 | 25 | 24 | 23 | 22 | 21 | 20 | 19 | 18 | 17 | 16 |
| R | MD31 | MD30 | MD29 | MD28 | MD27 | MD26 | MD25 | MD24 | MD23 | MD22 | MD21 | MD20 | MD19 | MD18 | MD17 | MD16 |
| W | | | | | | | | | | | | | | | | |
| p80 | 15 | 14 | 13 | 12 | 11 | 10 | 9 | 8 | 7 | 6 | 5 | 4 | 3 | 2 | 1 | 0 |
| R | MD15 | MD14 | MD13 | MD12 | MD11 | MD10 | MD9 | MD8 | MD7 | MD6 | MD5 | MD4 | MD3 | MD2 | MD1 | MD0 |
| W | | | | | | | | | | | | | | | | |

| WRHS1 | Write Header Section 1 | | | | | | | | | | | | | | | |
|---|---|---|---|---|---|---|---|---|---|---|---|---|---|---|---|---|
| 0x0500 | 31 | 30 | 29 | 28 | 27 | 26 | 25 | 24 | 23 | 22 | 21 | 20 | 19 | 18 | 17 | 16 |
| R | 0 | 0 | MB1 | TXM | NME | CFG | CHB | CHA | 0 | CYC6 | CYC5 | CYC4 | CYC3 | CYC2 | CYC1 | CYC0 |
| W | | | | | | | | | | | | | | | | |
| p81 | 15 | 14 | 13 | 12 | 11 | 10 | 9 | 8 | 7 | 6 | 5 | 4 | 3 | 2 | 1 | 0 |
| R | 0 | 0 | 0 | 0 | 0 | FID10 | FID9 | FID8 | FID7 | FID6 | FID5 | FID4 | FID3 | FID2 | FID1 | FID0 |
| W | | | | | | | | | | | | | | | | |
| WRHS2 | Write Header Section 2 | | | | | | | | | | | | | | | |
| 0x0504 | 31 | 30 | 29 | 28 | 27 | 26 | 25 | 24 | 23 | 22 | 21 | 20 | 19 | 18 | 17 | 16 |
| R | 0 | 0 | 0 | 0 | 0 | 0 | 0 | 0 | 0 | PL6 | PL5 | PL4 | PL3 | PL2 | PL1 | PL0 |
| W | | | | | | | | | | | | | | | | |
| p82 | 15 | 14 | 13 | 12 | 11 | 10 | 9 | 8 | 7 | 6 | 5 | 4 | 3 | 2 | 1 | 0 |
| R | 0 | 0 | 0 | 0 | 0 | CRC10 | CRC9 | CRC8 | CRC7 | CRC6 | CRC5 | CRC4 | CRC3 | CRC2 | CRC1 | CRC0 |
| W | | | | | | | | | | | | | | | | |

| WRHS3 | Write Header Section 3 | | | | | | | | | | | | | | | |
|---|---|---|---|---|---|---|---|---|---|---|---|---|---|---|---|---|
| 0x0508 | 31 | 30 | 29 | 28 | 27 | 26 | 25 | 24 | 23 | 22 | 21 | 20 | 19 | 18 | 17 | 16 |
| R | 0 | 0 | 0 | 0 | 0 | 0 | 0 | 0 | 0 | 0 | 0 | 0 | 0 | 0 | 0 | 0 |
| W | | | | | | | | | | | | | | | | |
| p82 | 15 | 14 | 13 | 12 | 11 | 10 | 9 | 8 | 7 | 6 | 5 | 4 | 3 | 2 | 1 | 0 |
| R | 0 | 0 | 0 | 0 | 0 | DP10* | DP9* | DP8* | DP7* | DP6* | DP5* | DP4* | DP3* | DP2* | DP1* | DP0* |
| W | | | | | | | | | | | | | | | | |

| IBCR | Input Buffer Command Request | | | | | | | | | | | | | | | |
|---|---|---|---|---|---|---|---|---|---|---|---|---|---|---|---|---|
| 0x0510 | 31 | 30 | 29 | 28 | 27 | 26 | 25 | 24 | 23 | 22 | 21 | 20 | 19 | 18 | 17 | 16 |
| R | IBSYS | 0 | 0 | 0 | 0 | 0 | 0 | 0 | 0 | 0 | 0 | IBRS5 | IBRS4 | IBRS3 | IBRS2 | IBRS1 | IBRS0 |
| W | | | | | | | | | | | | | | | | |
| p83 | 15 | 14 | 13 | 12 | 11 | 10 | 9 | 8 | 7 | 6 | 5 | 4 | 3 | 2 | 1 | 0 |
| R | IBSYH | 0 | 0 | 0 | 0 | 0 | 0 | 0 | 0 | 0 | 0 | IBRH5 | IBRH4 | IBRH3 | IBRH2 | IBRH1 | IBRH0 |
| W | | | | | | | | | | | | | | | | |
| IBCM | Input Buffer Command Mask | | | | | | | | | | | | | | | |
| 0x0514 | 31 | 30 | 29 | 28 | 27 | 26 | 25 | 24 | 23 | 22 | 21 | 20 | 19 | 18 | 17 | 16 |
| R | 0 | 0 | 0 | 0 | 0 | 0 | 0 | 0 | 0 | 0 | 0 | 0 | 0 | STXRS | LDSS | LHSS |
| W | | | | | | | | | | | | | | | | |
| p84 | 15 | 14 | 13 | 12 | 11 | 10 | 9 | 8 | 7 | 6 | 5 | 4 | 3 | 2 | 1 | 0 |
| R | 0 | 0 | 0 | 0 | 0 | 0 | 0 | 0 | 0 | 0 | 0 | 0 | 0 | STXRH | LDSH | LHSH |
| W | | | | | | | | | | | | | | | | |

| RDDSn | Read Data Section [1 ... 64] | | | | | | | | | | | | | | | |
|---|---|---|---|---|---|---|---|---|---|---|---|---|---|---|---|---|
| 0x0510 | 31 | 30 | 29 | 28 | 27 | 26 | 25 | 24 | 23 | 22 | 21 | 20 | 19 | 18 | 17 | 16 |
| R | MD31 | MD30 | MD29 | MD28 | MD27 | MD26 | MD25 | MD24 | MD23 | MD22 | MD21 | MD20 | MD19 | MD18 | MD17 | MD16 |
| W | | | | | | | | | | | | | | | | |
| p83 | 15 | 14 | 13 | 12 | 11 | 10 | 9 | 8 | 7 | 6 | 5 | 4 | 3 | 2 | 1 | 0 |
| R | MD15 | MD14 | MD13 | MD12 | MD11 | MD10 | MD9 | MD8 | MD7 | MD6 | MD5 | MD4 | MD3 | MD2 | MD1 | MD0 |
| W | | | | | | | | | | | | | | | | |

| RDHS1 | Read Header Section 1 | | | | | | | | | | | | | | | |
|---|---|---|---|---|---|---|---|---|---|---|---|---|---|---|---|---|
| 0x0700 | 31 | 30 | 29 | 28 | 27 | 26 | 25 | 24 | 23 | 22 | 21 | 20 | 19 | 18 | 17 | 16 |
| R | 0 | 0 | MBI | TXM | NME | CFG | CHB | CHA | 0 | CYC6 | CYC5 | CYC4 | CYC3 | CYC2 | CYC1 | CYC0 |
| W | | | | | | | | | | | | | | | | |
| p84 | 15 | 14 | 13 | 12 | 11 | 10 | 9 | 8 | 7 | 6 | 5 | 4 | 3 | 2 | 1 | 0 |
| R | 0 | 0 | 0 | 0 | 0 | FID10 | FID9 | FID8 | FID7 | FID6 | FID5 | FID4 | FID3 | FID2 | FID1 | FID0 |
| W | | | | | | | | | | | | | | | | |

| RDHS2 | Read Header Section 2 | | | | | | | | | | | | | | | |
|---|---|---|---|---|---|---|---|---|---|---|---|---|---|---|---|---|
| 0x0704 | 31 | 30 | 29 | 28 | 27 | 26 | 25 | 24 | 23 | 22 | 21 | 20 | 19 | 18 | 17 | 16 |
| R | 0 | PLR6 | PLR5 | PLR4 | PLR3 | PLR2 | PLR1 | PLR0 | 0 | PLC6 | PLC5 | PLC4 | PLC3 | PLC2 | PLC1 | PLC0 |
| W | | | | | | | | | | | | | | | | |
| p87 | 15 | 14 | 13 | 12 | 11 | 10 | 9 | 8 | 7 | 6 | 5 | 4 | 3 | 2 | 1 | 0 |
| R | 0 | 0 | 0 | 0 | 0 | CRC10 | CRC9 | CRC8 | CRC7 | CRC6 | CRC5 | CRC4 | CRC3 | CRC2 | CRC1 | CRC0 |
| W | | | | | | | | | | | | | | | | |

| RDHS3 | Read Header Section 3 | | | | | | | | | | | | | | | |
|---|---|---|---|---|---|---|---|---|---|---|---|---|---|---|---|---|
| 0x0708 | 31 | 30 | 29 | 28 | 27 | 26 | 25 | 24 | 23 | 22 | 21 | 20 | 19 | 18 | 17 | 16 |
| R | 0 | 0 | RES | PPI | NFI | SYN | SFI | RCI | 0 | 0 | RCC5 | RCC4 | RCC3 | RCC2 | RCC1 | RCC0 |
| W | | | | | | | | | | | | | | | | |
| p87 | 15 | 14 | 13 | 12 | 11 | 10 | 9 | 8 | 7 | 6 | 5 | 4 | 3 | 2 | 1 | 0 |
| R | 0 | 0 | 0 | 0 | 0 | DP10 | DP9 | DP8 | DP7 | DP6 | DP5 | DP4 | DP3 | DP2 | DP1 | DP0 |
| W | | | | | | | | | | | | | | | | |

| MBS | Message Buffer Status | | | | | | | | | | | | | | | |
|---|---|---|---|---|---|---|---|---|---|---|---|---|---|---|---|---|
| 0x070C | 31 | 30 | 29 | 28 | 27 | 26 | 25 | 24 | 23 | 22 | 21 | 20 | 19 | 18 | 17 | 16 |
| R | 0 | 0 | 0 | 0 | 0 | 0 | 0 | 0 | 0 | 0 | 0 | 0 | 0 | 0 | 0 | 0 |
| W | | | | | | | | | | | | | | | | |
| p88 | 15 | 14 | 13 | 12 | 11 | 10 | 9 | 8 | 7 | 6 | 5 | 4 | 3 | 2 | 1 | 0 |
| R | 0 | 0 | 0 | MLST | PLE | VFRB | VFRA | TCIB | TCIA | DCE | SVOB | SVOA | CEOB | CEOA | SEOB | SEOA |
| W | | | | | | | | | | | | | | | | |

| OBCR | Output Buffer Command Request | | | | | | | | | | | | | | | |
|---|---|---|---|---|---|---|---|---|---|---|---|---|---|---|---|---|
| 0x0710 | 31 | 30 | 29 | 28 | 27 | 26 | 25 | 24 | 23 | 22 | 21 | 20 | 19 | 18 | 17 | 16 |
| R | 0 | 0 | 0 | 0 | 0 | 0 | 0 | 0 | 0 | 0 | OBRH5 | OBRH4 | OBRH3 | OBRH2 | OBRH1 | OBRH0 |
| W | | | | | | | | | | | | | | | | |
| p90 | 15 | 14 | 13 | 12 | 11 | 10 | 9 | 8 | 7 | 6 | 5 | 4 | 3 | 2 | 1 | 0 |
| R | 0 | 0 | 0 | 0 | 0 | 0 | REQ | VIEW | | | OBRS5 | OBRS4 | OBRS3 | OBRS2 | OBRS1 | OBRS0 |
| W | | | | | | | | | | | | | | | | |

| OBCM | Output Buffer Command Mask | | | | | | | | | | | | | | | |
|---|---|---|---|---|---|---|---|---|---|---|---|---|---|---|---|---|
| 0x0714 | 31 | 30 | 29 | 28 | 27 | 26 | 25 | 24 | 23 | 22 | 21 | 20 | 19 | 18 | 17 | 16 |
| R | 0 | 0 | 0 | 0 | 0 | 0 | 0 | 0 | 0 | 0 | 0 | 0 | 0 | 0 | RDSH | RHSH |
| W | | | | | | | | | | | | | | | | |
| p91 | 15 | 14 | 13 | 12 | 11 | 10 | 9 | 8 | 7 | 6 | 5 | 4 | 3 | 2 | 1 | 0 |
| R | | | | | | | | | | | | | | | RDSS | RHSS |
| W | | | | | | | | | | | | | | | | |

LIST OF FIGURES

FIG. 1: E-Ray block diagram . . . 13
FIG. 2: Generic interface of E-Ray core . . . 16
FIG. 3: Write access to E-Ray registers and Input/Output Buffer RAM . . . 18
FIG. 4: Read access to E-Ray registers and Input/Output Buffer RAM . . . 18

FIG. 5: Data transfer from Input Buffer RAM to Message RAM and Message RAM to Output Buffer RAM . . . 18
FIG. 6: Synchronous read/write access to embedded RAM blocks . . . 22
FIG. 7: Test mode access to E-Ray RAM blocks . . . 32
FIG. 8: Structure of communication cycle . . . 92
FIG. 9: Overall state diagram of E-Ray communication controller . . . 99
FIG. 10: Structure of POC state WAKEUP . . . 101
FIG. 11: Timing of wakeup pattern . . . 103
FIG. 12: State diagram time-triggered startup . . . 104
FIG. 13: FIFO buffer status: empty, not empty, overrun . . . 119
FIG. 14: CPU access to Message Buffers . . . 122
FIG. 15: Double buffer structure Input Buffer . . . 123
FIG. 16: Double buffer structure Output Buffer . . . 124
FIG. 17: Access to Transient Buffer RAMs . . . 126
FIG. 18: Structure of Message RAM . . . 127
FIG. 19: Parity generation and check . . . 132

LIST OF TABLES

Table 1: Generic Host interface . . . 17
Table 2: Physical layer interface . . . 19
Table 3: Interface to Input Buffer RAM 1 . . . 20
Table 4: Interface to Input Buffer RAM 2 . . . 20
Table 5: Interface to Output Buffer RAM 1 . . . 20
Table 6: Interface to Output Buffer RAM 2 . . . 21
Table 7: Interface to Message RAM . . . 21
Table 8: Interface to Transient Buffer RAM A . . . 21
Table 9: Interface to Transient Buffer RAM B . . . 22
Table 10: Assignment of message buffers . . . 23
Table 11: E-Ray register map . . . 26
Table 12: Error modes of the POC (degradation model) . . . 97
Table 13: State transitions of E-Ray overall state machine . . . 99
Table 14: State transitions WAKEUP . . . 101
Table 15: Channel filtering configuration . . . 112
Table 16: Definition of cycle set . . . 113
Table 17: Examples for valid cycle sets . . . 113
Table 18: Assignment of Input Command Request register bits . . . 123
Table 19: Assignment of Input Command Request register bits . . . 125
Table 20: Header section of a message buffer in the Message RAM . . . 128
Table 21: Storage of data section of the message buffers in Message RAM . . . 131
Table 22: Module interrupt flags and interrupt line enable . . . 136

The invention claimed is:

1. A FlexRay communication controller few connecting a FlexRay communication line to a FlexRay network member assigned to the FlexRay communication controller, comprising:
 a message handler;
 a plurality of registers;
 a message memory connected to the message handler;
 an interface configured to be connected to the network member, wherein the network member is a host processor external to the FlexRay communication controller;
 a network protocol controller configured to be connected to the FlexRay communication line;
 a first buffer memory connecting the message memory to the network protocol controller, wherein the first buffer memory is separate from the message memory; and
 a second buffer memory connecting the message memory to the interface, wherein the second buffer memory is separate from the message memory;
 wherein the connecting of the FlexRay communication controller is controlled by contents of the plurality of registers.

2. The FlexRay communication controller of claim 1, wherein at least one of the registers is a Test register, which holds control bits of at least one test mode of the FlexRay communication controller.

3. The FlexRay communication controller of claim 1, wherein at least one of the registers is a Lock register, which is a write-only register for which a reading of the lock register will return a zero.

4. The FlexRay communication controller of claim 1, wherein at least one of the registers is a first Interrupt register, in which a flag is set if a listed error or a corresponding event is detected.

5. The FlexRay communication controller of claim 1, wherein at least one of the registers is a second Interrupt register, which assigns an interrupt generated by a specific flag to one of two interrupt lines of the FlexRay communication controller.

6. The FlexRay communication controller of claim 4, wherein at least one of the registers is a third Interrupt register, which includes settings that determine which status changes in the first Interrupt register result in an interrupt.

7. The FlexRay communication controller of claim 1, wherein at least one of the registers is a fourth Interrupt register, which specifies in terms of cycle count and macro-ticks a point in time when a timer value interrupt occurs.

8. The FlexRay communication controller of claim 1, wherein at least one of the registers is a fifth Interrupt register, in which for a stop watch event an actual cycle counter and macro-tick value are stored in the fifth Interrupt register.

9. The FlexRay communication controller of claim 1, wherein at least one of the registers is a communication controller control register, which is supplied by the FlexRay communication controller to allow the FlexRay network member to control the operation of the FlexRay communication controller.

10. The FlexRay communication controller of claim 1, wherein at least one of the registers is a communication controller status register, in which during byte access to at least one status variable coded with more than eight bits, the at least one status variable is updated by the FlexRay communication controller between two accesses.

11. The FlexRay communication controller of claim 1, wherein at least one of the registers is a Message Status Control register which control the message buffer via a Message Buffer Control register.

12. The FlexRay communication controller of claim 1, wherein at least one of the registers is a Message Buffer Status register which assigns a message buffer status.

13. The FlexRay communication controller of claim 1, wherein the first buffer memory structure includes first double buffers configured to store two complete messages, and wherein the message handler is configured to swap the access to the double buffers.

14. The FlexRay communication controller of claim 13, wherein the first buffer memory structure includes second double buffers for connecting the message memory to a second network protocol controller.

15. The FlexRay communication controller of claim 1, wherein data transfers are performed in portions of a fixed word size, independent of an actual message size.

16. The FlexRay communication controller of claim 1, wherein the second buffer memory structure includes a double input buffer and a double output buffer.

17. The FlexRay communication controller of claim 16, wherein the double input buffer includes a main input buffer and a shadow input buffer, and the double output buffer includes a main output buffer and a shadow output buffer,
   wherein the double output buffer is configured to receive data transfers at the shadow output buffer, wherein the message handler is configured to swap the main output buffer and the shadow output buffer such that the main output buffer is accessible via the interface while the message handler writes new data to the shadow output buffer,
   wherein the double input buffer is configured to receive data via the interface at the main input buffer, wherein the message handler is configured to swap the main input buffer and the shadow input buffer such that the main output buffer is accessible for an additional data transfer via the interface while the message handler reads the data from the shadow input buffer.

* * * * *

UNITED STATES PATENT AND TRADEMARK OFFICE
CERTIFICATE OF CORRECTION

PATENT NO. : 8,484,383 B2  Page 1 of 1
APPLICATION NO. : 11/659259
DATED : July 9, 2013
INVENTOR(S) : Hartwich et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1603 days.

Signed and Sealed this
Eighth Day of September, 2015

Michelle K. Lee
*Director of the United States Patent and Trademark Office*